(12) United States Patent
Okamoto et al.

(10) Patent No.: US 9,023,906 B2
(45) Date of Patent: May 5, 2015

(54) PROPYLENE-BASED COPOLYMER, PROPYLENE-BASED COPOLYMER COMPOSITION, MOLDED PRODUCT THEREOF AND FOAMED PRODUCT THEREOF, AND PRODUCTION PROCESS THEREFOR

(75) Inventors: Masahiko Okamoto, Chiba (JP); Mayumi Yasuda, Ichihara (JP); Tetsuji Kasai, Shunan (JP); Kazuyoshi Kaneko, Ichihara (JP); Kyoko Kobayashi, Chiba (JP); Kotaro Ichino, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 14/116,100

(22) PCT Filed: May 17, 2012

(86) PCT No.: PCT/JP2012/062677
§ 371 (c)(1),
(2), (4) Date: Nov. 6, 2013

(87) PCT Pub. No.: WO2012/157709
PCT Pub. Date: Nov. 22, 2012

(65) Prior Publication Data
US 2014/0088214 A1   Mar. 27, 2014

(30) Foreign Application Priority Data

May 18, 2011 (JP) .................................. 2011-111207
Feb. 10, 2012 (JP) .................................. 2012-027431
Apr. 27, 2012 (JP) .................................. 2012-102590

(51) Int. Cl.
| | | |
|---|---|---|
| C08F 210/06 | (2006.01) | |
| C08L 23/08 | (2006.01) | |
| C08F 32/04 | (2006.01) | |
| C08L 23/14 | (2006.01) | |
| C08F 210/16 | (2006.01) | |
| C08L 23/26 | (2006.01) | |
| C08F 210/18 | (2006.01) | |

(52) U.S. Cl.
CPC ............... *C08F 32/04* (2013.01); *C08F 210/06* (2013.01); *C08F 210/16* (2013.01); *C08L 23/142* (2013.01); *C08L 23/145* (2013.01); *C08L 2203/14* (2013.01); *C08L 23/08* (2013.01); *C08L 23/14* (2013.01); *C08L 23/26* (2013.01); *C08F 210/18* (2013.01); *C08F 2500/12* (2013.01); *C08F 2500/17* (2013.01); *C08F 2500/25* (2013.01); *C08L 2205/03* (2013.01)

(58) Field of Classification Search
CPC ..... C08L 210/06; C08L 23/08; C08L 23/142; C08L 23/145; C08L 23/14; C08L 23/26; C08L 23/10; C08L 23/04; C08L 23/18; C08L 23/20; C08L 23/16; C08L 23/22; C08F 210/16; C08F 32/04; C08F 210/18
USPC ................... 521/140, 150; 525/232; 526/336
See application file for complete search history.

(56) References Cited

U.S. PATENT DOCUMENTS

| | | |
|---|---|---|
| 4,960,878 A | 10/1990 | Crapo et al. |
| 4,990,640 A | 2/1991 | Tsutsui et al. |
| 5,041,584 A | 8/1991 | Crapo et al. |
| 5,321,106 A | 6/1994 | LaPointe |
| 5,561,092 A | 10/1996 | Ewen et al. |
| 5,614,457 A | 3/1997 | Ewen et al. |
| 5,663,249 A | 9/1997 | Ewen et al. |
| 6,121,395 A | 9/2000 | Turner |
| 6,939,928 B1 | 9/2005 | Kawai et al. |
| 7,449,533 B2 | 11/2008 | Kawai et al. |
| 7,579,408 B2 * | 8/2009 | Walton et al. .............. 525/191 |
| 8,329,848 B2 * | 12/2012 | Kajihara et al. ........... 526/348.6 |
| 2007/0129493 A1 | 6/2007 | Sahnoune et al. |
| 2009/0209672 A1 | 8/2009 | Ebata et al. |
| 2009/0239014 A1 | 9/2009 | Noguchi et al. |

(Continued)

FOREIGN PATENT DOCUMENTS

| | | |
|---|---|---|
| JP | 01-501950 A | 7/1989 |
| JP | 01-502036 A | 7/1989 |

(Continued)

OTHER PUBLICATIONS

International Search Report received in PCT/JP2012/062677 dated Jul. 31, 2012.

(Continued)

*Primary Examiner* — Nathan M Nutter
(74) *Attorney, Agent, or Firm* — Foley & Lardner LLP

(57) ABSTRACT

To provide a propylene-based copolymer and a propylene-based copolymer composition, each of which has a high melt tension because it has a long-chain branched structure, exhibits excellent molding processability during molding, such as inflation molding, extrusion molding, blow molding, injection molding or vacuum forming, and is capable of favorably providing a foamed product having an excellent expansion ratio and excellent cell uniformity in the foaming stage. The propylene-based copolymer (A) of the present invention comprises 50 to 95% by mol of constituent units [i] derived from propylene, 4.9 to 49.9% by mol of constituent units [ii] derived from an α-olefin of 2 to 10 carbon atoms other than propylene and 0.1 to 10% by mol of constituent units [iii] derived from a non-conjugated polyene (with the proviso that the total amount of the constituent units [i], [ii] and [iii] is 100% by mol), and is characterized by satisfying specific requirements (a) and (c).

22 Claims, 5 Drawing Sheets

(56) References Cited

U.S. PATENT DOCUMENTS

| | | |
|---|---|---|
| 2009/0249645 A1 | 10/2009 | Kajihara et al. |
| 2011/0233448 A1 | 9/2011 | Ebata et al. |

FOREIGN PATENT DOCUMENTS

| | | |
|---|---|---|
| JP | 02-078687 A | 3/1990 |
| JP | 03-179005 A | 8/1991 |
| JP | 03-179006 A | 8/1991 |
| JP | 03-207703 A | 9/1991 |
| JP | 03-207704 A | 9/1991 |
| JP | H06-306121 A | 11/1994 |
| JP | H08-239412 A | 9/1996 |
| JP | 2002-053625 A | 2/2002 |
| JP | 2002-097228 A | 4/2002 |
| JP | 2002-097284 A | 4/2002 |
| JP | 2003-128851 A | 5/2003 |
| JP | 2004-051676 A | 2/2004 |
| JP | 2005-075964 A | 3/2005 |
| JP | 2009-242667 A | 10/2009 |
| JP | 2011-016907 A | 1/2011 |
| WO | WO-98/49212 A1 | 11/1998 |
| WO | WO-00/26268 A1 | 5/2000 |
| WO | WO-01/27124 A1 | 4/2001 |
| WO | WO-2008/152935 A1 | 12/2008 |
| WO | WO-2009/072503 A1 | 6/2009 |
| WO | WO-2010/064574 A1 | 6/2010 |

OTHER PUBLICATIONS

Extended European Search Report issued in European Application No. 12785020.4 dated Oct. 6, 2014.

Office Action issued in Japanese Application No. 2013-515195 dated Nov. 11, 2014.

* cited by examiner

Die (Ø100)

PROPYLENE-BASED COPOLYMER, PROPYLENE-BASED COPOLYMER COMPOSITION, MOLDED PRODUCT THEREOF AND FOAMED PRODUCT THEREOF, AND PRODUCTION PROCESS THEREFOR

CROSS REFERENCE TO RELATED APPLICATIONS

The present application is a U.S. National Stage of International Application No. PCT/JP2012/062677, filed May 17, 2012, which claims priority to Japanese Application No. 2011-111207, filed May 18, 2011, Japanese Application No. 2012-027431, filed Feb. 10, 2012, and Japanese Application No. 2012-102590, filed Apr. 27, 2012, the disclosures of which are hereby incorporated by reference in their entirety.

TECHNICAL FIELD

The present invention relates to a propylene-based copolymer, a propylene-based copolymer composition, a molded product thereof, a foamed product thereof and a production process therefor.

More particularly, the present invention relates to a propylene-based copolymer and a propylene-based copolymer composition, each of which has excellent molding or forming processability during molding or forming, such as inflation molding, extrusion molding, blow molding, injection molding or vacuum forming, and is capable of providing a foamed product having an excellent expansion ratio and excellent cell uniformity in the foaming stage, and also relates to a molded product thereof, a foamed product thereof, and a production process for them.

BACKGROUND ART

Olefin-based resins, such as polyethylene, polypropylene and polybutene-1, have ease of manufacturing, are inexpensive and are excellent in lightweight properties, moldability, insulating properties, water resistance, chemical resistance and mechanical strength, and therefore, they have been used in an extremely wide variety of fields.

Specifically, these olefin-based resins have been used in almost all the surrounding fields, such as fields of various packaging films, electric wire coating materials, pipes, sheets, bottles, automotive interior or exterior trim and general merchandise.

In the industrial world, recently, weight lightening of members has been required from the viewpoints of energy saving and ecology, and foamed products of various materials and foaming techniques have been paid attention. As for the foamed products, not only weight lightening but also impartation of functions, such as cushioning properties, heat insulation/heat retaining properties and sound absorption properties, can be achieved by combining resin functions with porous structure (foaming), so that because of their high functional characteristics, adoption of the foamed products has been expected in a wide variety of fields.

In the field of foaming, however, the olefin-based resins have been only used limitedly as compared with urethane and polystyrene. This is caused by the influence of difficult processing in various molding processes because of low melt viscosity. Therefore, it has become an industrial problem to increase melt viscosity of the olefin-based resins during molding, specifically, melt tension thereof.

For example, in patent literatures 1 to 4, ethylene/α-olefin/non-conjugated polyene copolymers having a long-chain branched structure have been disclosed. However, when these copolymers are added to olefin-based resins, such as polyethylene, polypropylene and polybutene, phase separation takes place during molding, and a clear sea-island structure is exhibited. Therefore, the melt tension hardly increases as the whole system. On that account, the effect of improving processability in extrusion molding, blow molding or the like is not found so greatly, and there is room for improvement particularly in expansion ratio and cell uniformity in the foam molding.

Further, a method to increase melt tension by adding ultra-high molecular weight compounds has been attempted, but this method has problems that the production process is complicated, it can be utilized limitedly only in a specific molding process because the fluidity is lowered, the melt tension improvement effect is not found so greatly, etc.

On the other hand, a method to increase melt tension by partially crosslinking molecular chains using electron rays or a peroxide and thereby increasing long-chain branched structures has been also attempted. In α-olefin-based copolymers such as polypropylene, however, the main chain scission reaction by radicals precedes the crosslinking reaction rate, and therefore, it is necessary to use a polyfunctional monomer as a crosslinking aid. In this case, it is difficult to control a molecular weight or the degree of branching, and it is difficult to obtain desired properties. Further, addition of a polyfunctional monomer brings about problems, such as bleed out of a low molecular weight component, lowering of weathering resistance and lowering of mechanical strength. Moreover, such a crosslinked resin is liable to form a gel component in the thermoforming process, and this is a cause of bad appearance such as fish eye during inflation molding or sheet forming.

In a patent literature 5, there is description of a syndiotactic propylene-based copolymer composed of propylene/α-olefin/non-conjugated polyene and/or conjugated polyene, but this copolymer does not have a long-chain branched structure, and still has a problem of moldability.

CITATION LIST

Patent Literature

Patent literature 1: International Publication No. 1998/49212 Pamphlet
Patent literature 2: International Publication No. 2000/26268 Pamphlet
Patent literature 3: International Publication No. 2009/72503 Pamphlet
Patent literature 4: International Publication No. 2010/64574 Pamphlet
Patent literature 5: Japanese Patent Laid-Open Publication No. 2002-97228

SUMMARY OF INVENTION

Technical Problem

The present invention has been made in view of the above circumstances, and provides a propylene-based copolymer and a propylene-based copolymer composition, each of which has a high melt tension because it has a long-chain branched structure, exhibits excellent molding processability during molding, such as inflation molding, extrusion molding, blow molding, injection molding or vacuum forming, and is capable of favorably providing a foamed product having an excellent expansion ratio and excellent cell uniformity in the foaming stage, a molded product thereof, a foamed product thereof, and a production process for them.

Solution to Problem

The present inventors have earnestly studied, and as a result, they have accomplished the present invention.

That is to say, the propylene-based copolymer (A) of the present invention comprises 50 to 95% by mol of constituent units [i] derived from propylene, 4.9 to 49.9% by mol of constituent units [ii] derived from an α-olefin of 2 to 10 carbon atoms other than propylene and 0.1 to 10% by mol of constituent units [iii] derived from a non-conjugated polyene (with the proviso that the total amount of the constituent units [i], [ii] and [iii] is 100% by mol), and is characterized by satisfying the following requirements (a) and (c), preferably further satisfying any one of the following requirements (b) and (d), more preferably satisfying the following requirements (a) to (d):

(a) the intrinsic viscosity [η], as measured in decalin at 135° C., is 0.1 to 5.0 (dL/g.), (b) the ratio (Mz/Mw) of a z-average molecular weight (Mz), as measured by gel permeation chromatography (GPC), to a weight-average molecular weight (Mw), as measured by the same, is 3.0 to 20.0, (c) the ratio ($MFR_{10}/MFR_{2.16}$) of $MFR_{10}$, as obtained at 230° C. under a load of 10 kg in accordance with JIS K-6721, to $MFR_{2.16}$, as obtained at 230° C. under a load of 2.16 kg in accordance with JIS K-6721, is 8.0 to 150.0, and (d) the ratio ($\eta^*_{(\omega=0.1)}/\eta^*_{(\omega=100)}$) of a complex viscosity $\eta^*_{(\omega=0.1)}$ at a frequency (ω=0.1 rad/s), as obtained by a linear viscoelasticity measurement (190° C.) using a rheometer, to a complex viscosity $\eta^*_{(\omega=100)}$ at a frequency (ω=100 rad/s), as obtained by the same, is 5 to 100.

The propylene-based copolymer composition (X) of the present invention comprises 5 to 95 parts by weight of the propylene-based copolymer (A) and 5 to 95 parts by weight of a crystalline olefin resin (B) (with the proviso that the total amount of the components (A) and (B) is 100 parts by weight).

The crystalline olefin resin (B) is preferably at least one substance selected from polypropylene, poly-4-methyl-1-pentene, polyethylene and polybutene-1.

The propylene-based copolymer composition (X1) of the present invention comprises 5 to 80 parts by weight of a propylene-based copolymer (A1), which satisfies the following requirements (a) to (d) and comprises 50 to 95% by mol of constituent units [i] derived from propylene, 4.9 to 49.9% by mol of constituent units [ii] derived from at least one α-olefin selected from ethylene, 1-butene, 4-methylpentene-1,1-hexene and 1-octene and 0.1 to 10% by mol of constituent units [iii] derived from 5-vinyl-2-norbornene (with the proviso that the total amount of the constituent units [i], [ii] and [iii] is 100% by mol), and 95 to 20 parts by weight of polypropylene (B1) (with the proviso that the total amount of the components (A1) and (B1) is 100 parts by weight), said composition satisfying the following requirement (xa), (a) the intrinsic viscosity [η], as measured in decalin at 135° C., is 0.1 to 5.0 (dL/g.), (b) the ratio (Mz/Mw) of a z-average molecular weight (Mz), as measured by gel permeation chromatography (GPC), to a weight-average molecular weight (Mw), as measured by the same, is 3.0 to 20.0, (c) the ratio ($MFR_{10}/MFR_{2.16}$) of $MFR_{10}$, as obtained at 230° C. under a load of 10 kg in accordance with JIS K-6721, to $MFR_{2.16}$, as obtained at 230° C. under a load of 2.16 kg in accordance with JIS K-6721, is 8.0 to 150.0, (d) the ratio ($\eta^*_{(\omega=0.1)}/\eta^*_{(\omega=100)}$) of a complex viscosity $\eta^*_{(\omega=0.1)}$ at a frequency (ω=0.1 rad/s), as obtained by a linear viscoelasticity measurement (190° C.) using a rheometer, to a complex viscosity $\eta^*_{(\omega=100)}$ at a frequency (ω=100 rad/s), as obtained by the same, is 5 to 100, and (xa) the ratio ($MT_{(X1)}/MT_{(B1)}$) of a melt tension $MT_{(X1)}$ of the propylene-based copolymer composition (X1) at 230° C. to a melt tension $MT_{(B1)}$ of the polypropylene (B1) at 230° C. is 2.0 to 10.0.

The foamed product of the present invention is obtained by foaming or crosslinking-foaming the propylene-based copolymer (A), the propylene-based copolymer composition (X) or the propylene-based copolymer composition (X1).

The molded product of the present invention comprises the propylene-based copolymer (A), the propylene-based copolymer composition (X) or the propylene-based copolymer composition (X1).

The production process for a molded product of the present invention comprises a step of molding the propylene-based copolymer (A), the propylene-based copolymer composition (X) or the propylene-based copolymer composition (X1).

The production process for a foamed product of the present invention comprises a step of foaming or crosslinking-foaming the propylene-based copolymer (A), the propylene-based copolymer composition (X) or the propylene-based copolymer composition (X1).

The propylene-based copolymer composition (Y) of the present invention comprises the propylene-based copolymer (A) of the present invention, an ethylene-based copolymer (C) having an ethylene content of more than 50% by mol and a crystalline propylene-based polymer (D), is obtained by dynamically crosslinking at least the copolymer (A), the copolymer (C) and the polymer (D), and is preferably obtained through a step [I] of dynamically crosslinking the copolymer (C) and the polymer (D).

The composition (Y) is preferably a dynamically heat-treated product obtained through a step [I-a] of dynamically heat-treating the copolymer (C), the polymer (D), the copolymer (A) and a crosslinking agent (E), The composition (Y) is preferably obtained through a step [I-b] of dynamically heat-treating the copolymer (C), the polymer (D) and the crosslinking agent (E) and a step of further adding the copolymer (A) to a dynamically heat-treated product obtained in the step [I-b].

The composition (Y) preferably further comprises a blowing agent.

Advantageous Effects of Invention

According to the present invention, a propylene-based copolymer and a propylene-based copolymer composition, each of which increases melt tension of an olefin resin such as polypropylene, exhibits excellent molding processability during molding, such as inflation molding, extrusion molding, blow molding, injection molding or vacuum forming, and is capable of favorably providing a foamed product having an excellent expansion ratio and excellent cell uniformity because the resin is readily expanded in the foaming stage, can be provided. According to the present invention, further, a foamed product having an excellent expansion ratio and excellent cell uniformity can be provided.

The reason for this is not clear, but when an ethylene/α-olefin/non-conjugated polyene copolymer is added to an olefin-based resin, such as polyethylene, polypropylene or polybutene, phase separation takes place during molding and a clear sea-island structure is exhibited. However, because the copolymer of the present invention has a long-chain branched structure and additionally it has high compatibility with an olefin resin such as polypropylene, phase separation before crystallization is inhibited, and the copolymer can be finely dispersed or uniformly dispersed. On that account, even in the case of a composition of the copolymer and polypropylene, the melt tension tends to increase as the whole system, and the effect of improving processability in extrusion molding, blow molding or the like is excellent. It is presumed that the expansion ratio and the cell uniformity during foam molding are particularly excellent.

According to the present invention, therefore, molded products, such as sheets and hollow containers, having good mechanical properties and heat resistance can be favorably obtained. Further, foamed cells are held, and the cells are hardly broken, so that foamed products having excellent cell uniformity, good appearance and high expansion ratio can be obtained.

According to the propylene-based copolymer composition (Y) of the present invention, breakage of cells and degassing during foam molding are inhibited because the melt tension of the composition is improved, so that foamed products having good extrusion appearance are obtained. In addition, foaming properties are improved, and this is advantageous also from the viewpoint of lowering of specific gravity, and besides, rubber elasticity also becomes excellent. As a result, foamed products having low specific gravity, excellent appearance and excellent balance between specific gravity, appearance and mechanical properties can be produced.

DESCRIPTION OF EMBODIMENTS

<Propylene-Based Copolymer>

Figure 1:
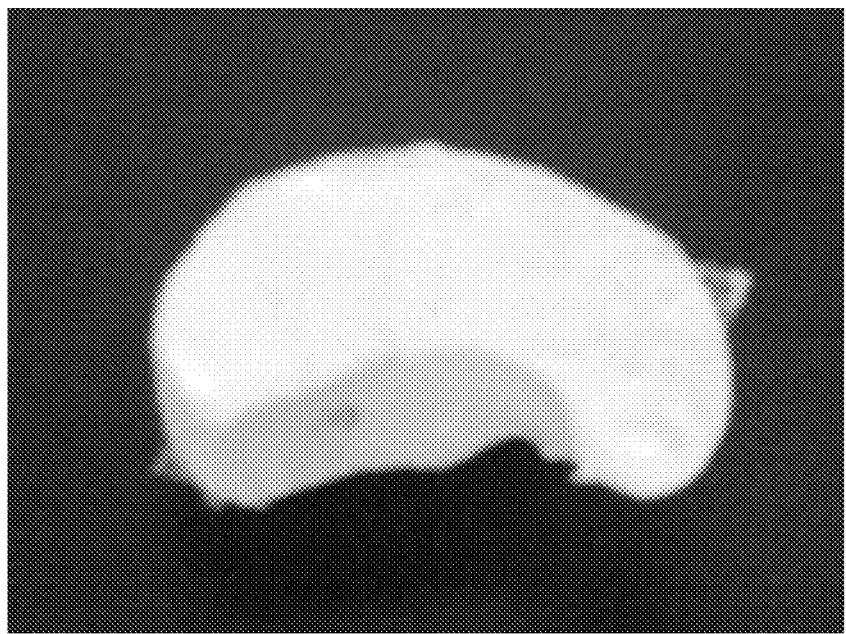
FIG. 1 is a digital image of a foamed product obtained in Example 19.

The propylene-based copolymer (A) of the present invention is a copolymer satisfying the following requirements (a) and (c), preferably further satisfying any one of the following requirements (b) and (d), more preferably satisfying the requirements (a) to (d), and comprising 50 to 95% by mol of constituent units [i] derived from propylene, 4.9 to 49.9% by mol of constituent units [ii] derived from an α-olefin of 2 to 10 carbon atoms other than propylene and 0.1 to 10% by mol of constituent units [iii] derived from a non-conjugated polyene (with the proviso that the total amount of the constituent units [i], [ii] and [iii] is 100% by mol), preferably comprising the constituent units [i] in amounts of 55 to 95% by mol, more preferably 60 to 90% by mol, still more preferably 70 to 90% by mol, particularly preferably 75 to 90% by mol, the constituent units [ii] in amounts of 4.9 to 44.9% by mol, more preferably 9.8 to 39.9% by mol, still more preferably 9.9 to 29.9% by mol, particularly preferably 9.9 to 24.8% by mol, and the constituent units [iii] in amounts of 0.1 to 7.0% by mol, more preferably 0.1 to 5.0% by mol, still more preferably 0.1 to 3.0% by mol, particularly preferably 0.2 to 3.0% by mol, with the proviso that the total amount of the constituent units [i], [ii] and [iii] is 100% by mol. When the amounts of the constituent units [i], [ii] and [iii] are in the above ranges, a copolymer (A) having more excellent molding processability can be obtained, so that such amounts are preferable.

When the "α-olefin of 2 to 10 carbon atoms" is referred to in the present invention, the α-olefin does not include propylene unless otherwise noted.

When the copolymer (A) is used for the later-described copolymer composition (X or X1), the propylene-based copolymer (A or A1) of the present invention is preferably a copolymer constituted of the constituent units [i] in amounts of 55 to 95% by mol, more preferably 60 to 90% by mol, still more preferably 70 to 90% by mol, particularly preferably 75 to 90% by mol, the constituent units [ii] in amounts of 4.9 to 44.9% by mol, more preferably 9.8 to 39.9% by mol, still more preferably 9.9 to 29.9% by mol, particularly preferably 9.9 to 24.8% by mol, and the constituent units [iii] in amounts of 0.1 to 7.0% by mol, more preferably 0.1 to 5.0% by mol, still more preferably 0.1 to 3.0% by mol, particularly preferably 0.2 to 3.0% by mol, with the proviso that the total amount of the constituent units [i], [ii] and [iii] is 100% by mol, from the viewpoints of compatibility with polypropylene and formation of no gel component during manufacturing.

The copolymer (A) may contain other copolymerization components within limits not detrimental to the object of the present invention, and these are also included in the scope of the present invention.

(α-Olefin)

The α-olefin of 2 to 10 carbon atoms other than propylene may be any of straight-chain, branched and cyclic α-olefins, and examples thereof include straight-chain or branched α-olefins, such as ethylene, 1-butene, 2-butene, 1-pentene, 3-methyl-1-butene, 1-hexene, 4-methyl-1-pentene, 3-methyl-1-pentene, 1-octene, 1-nonene and 1-decene; and cyclic olefins, such as cyclopentene, cyclohexene and cycloheptene. These α-olefins may be used singly, or may be used in combination of two or more kinds.

Of these, ethylene, 1-butene, 4-methyl-1-pentene, 1-hexene and 1-octene are preferable. Especially when the copolymer (A) is used for the later-described copolymer composition (X1), the copolymer (A) as the copolymer (A1) preferably contains at least one kind of constituent units derived from these α-olefins, from the viewpoints of compatibility, polymerization properties and molecular weight.

(Non-Conjugated Polyene)

Specific examples of the non-conjugated polyenes include non-conjugated dienes, such as dicyclopentadiene, 1,4-hexadiene, cyclooctadiene, methylene norbornene, ethylidene norbornene, 4-methyl-1,4-hexadiene, 5-methyl-1,4-hexadiene, 4-ethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 7-methyl-1,6-decadiene, 6-ethyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene and 9-methyl-1,8-undecadiene; and non-conjugated trienes, such as
6,10-dimethyl-1,5,9-undecatriene, 4,8-dimethyl-1,4,8-decatriene (DMDT), 5,9-dimethyl-1,4,8-decatriene, 6,9-dimethyl-1,5,8-decatriene, 6,8,9-trimethyl-1,5,8-decatriene, 6-ethyl-10-methyl-1,5,9-undecatriene, 4-ethylidene-1,6-octadiene, 7-methyl-4-ethylidene-1,6-octadiene, 4-ethylidene-8-methyl-1,7-nonadiene (EMND), 7-methyl-4-ethylidene-1,6-nonadiene, 7-ethyl-4-ethylidene-1,6-nonadiene, 6,7-dimethyl-4-ethylidene-1,6-octadiene, 6,7-dimethyl-4-ethylidene-1,6-nonadiene, 4-ethylidene-1,6-decadiene, 7-methyl-4-ethylidene-1,6-decadiene, 7-methyl-6-propyl-4-ethylidene-1,6-octadiene, 4-ethylidene-1,7-nonadiene, 8-methyl-4-ethylidene-1,7-nonadiene and 4-ethylidene-1,7-undecadiene. These non-conjugated polyenes can be used singly or in combination of two or more kinds.

Of these, 5-ethylidene-2-norbornene (ENB), 5-vinyl-2-norbornene, dicyclopentadiene, 4,8-dimethyl-1,4,8-decatriene (DMDT) and 4-ethylidene-8-methyl-1,7-nonadiene (EMND) are preferable, and 5-vinyl-2-norbornene (VNB) is more preferable. Especially when the copolymer (A) is used for the copolymer composition (X1), the composition preferably contains 5-vinyl-2-norbornene (VNB) as the copolymer (A1), from the viewpoints of formation and control of long-chain branches.

(Conjugated Polyene)

In the present invention, for example, a conjugated polyene may be contained as another polymerization component, within limits not detrimental to the object of the present invention.

Examples of the conjugated polyenes include conjugated dienes, such as 1,3-butadiene, 1,3-pentadiene, 1,3-hexadiene, 1,3-heptadiene, 1,3-octadiene, 1-phenyl-1,3-butadiene, 1-phenyl-2,4-pentadiene, isoprene, 2-ethyl-1,3-butadiene, 2-propyl-1,3-butadiene, 2-butyl-1,3-butadiene, 2-pentyl-1,3-butadiene, 2-hexyl-1,3-butadiene, 2-heptyl-1,3-butadiene, 2-octyl-1,3-butadiene and 2-phenyl-1,3-butadiene; and conjugated trienes, such as 1,3,5-hexatriene.

Next, the requirements (a) to (d) are described.

Requirement (a): [Intrinsic Viscosity [η]]

The propylene-based copolymer of the present invention usually has an intrinsic viscosity, as measured in decalin at 135° C., of 0.1 to 5.0 (dL/g), preferably 0.2 to 4.5 (dL/g), more preferably 0.5 to 4.0 (dL/g), still more preferably 0.5 to 3.0 (dL/g), particularly preferably 0.5 to 2.5 (dL/g). When the intrinsic viscosity is in this range, the resin has an excellent balance between fluidity and melt tension.

In the present invention, the propylene-based copolymer (A) used for the later-described propylene-based copolymer composition (Y) preferably has an intrinsic viscosity [η] of 0.1 to 3.0 dl/g, more preferably 0.5 to 2.0 dl/g.

Requirement (b): [Molecular Weight Distribution [Mz/Mw]]

The ratio (Mz/Mw) of a z-average molecular weight (Mz) of the propylene-based copolymer of the present invention, as measured by gel permeation chromatography (GPC), to a weight-average molecular weight (Mw) thereof, as measured by the same, is usually 3.0 to 20.0, preferably 3.0 to 15.0, more preferably 3.0 to 13.0, still more preferably 3.0 to 10.0. If the value of Mz/Mw is large, the quantity of long-chain branches is large, and the melt tension becomes high.

The weight-average molecular weight (Mw) of the copolymer, as determined by gel permeation chromatography (GPC), is preferably 50,000 to 1,000,000, more preferably 100,000 to 800,000, in terms of polystyrene. When the weight-average molecular weight is in the above range, the copolymer has an excellent balance between fluidity and the quantity of long-chain branches, and therefore, in the case where the copolymer is mixed with polypropylene or the like, melt tension is improved, so that such a weight-average molecular weight is preferable.

Requirement (c): [Ratio (MFR$_{10}$/MFR$_{2.16}$)]

The ratio (MFR$_{10}$/MFR$_{2.16}$) of MFR$_{10}$ of the propylene-based copolymer of the present invention, as obtained at 230° C. under a load of 10 kg in accordance with JIS K-6721, to MFR$_{2.16}$ thereof, as obtained at 230° C. under a load of 2.16 kg in accordance with JIS K-6721, is usually 8.0 to 150.0, preferably 8.0 to 110.0, more preferably 8.0 to 50.0, still more preferably 8.0 to 30.0, most preferably 10.0 to 20.0. When the ratio (MFR$_{10}$/MFR$_{2.16}$) is in the above range, fluidity of the resin under the two loads is apt to vary, and the change ratio of the viscosity to the shear rate is low. On that account, when the ratio is in the above range, viscosity change of the resin within the specific shear rate range is small, and the resin exhibits excellent processability. In the foaming process, foamed cells are held, and the cells are hardly broken, so that a foamed product having uniform cells and a high expansion ratio is obtained. If the ratio is less than 8.0, viscosity change of the resin is large and there is a fear of difficult processing, so that such a ratio is undesirable.

The MFR$_{2.16}$ is usually in the range of 0.05 to 100 (g/10 min), preferably 0.1 to 50 (g/10 min), more preferably 0.5 to 10 (g/10 min).

Requirement (d): [Ratio ($\eta^*_{(\omega=0.1)}/\eta^*_{(\omega=100)}$)]

The ratio ($\eta^*_{(\omega=0.1)}/\eta^*_{(\omega=100)}$) of a complex viscosity $\eta^*_{(\omega=0.1)}$ at a frequency ($\omega$=0.1 rad/s), as obtained by a linear viscoelasticity measurement (190° C.) using a rheometer, to a complex viscosity $\eta^*_{(\omega=100)}$ at a frequency ($\omega$=100 rad/s), as obtained by the same, is usually 5 to 100, preferably 5 to 80, more preferably 5 to 60. By the ratio ($\eta^*_{(\omega=0.1)}/\eta^*_{(\omega=100)}$) in the above range, it is meant that the copolymer has a long-chain branched structure and is excellent in melt tension. On that account, melt viscosity of the resin is modified, and during foaming, the resin is readily expanded. If the ratio is less than 5, the copolymer rarely has a branched structure, and desired effects are not obtained. If the ratio exceeds 100, a gel component is formed, so that such ratios are undesirable.

The copolymer of the present invention preferably further satisfies any one of the following requirements (e), (f) and (g), more preferably further satisfies the requirements (e) and (f), and still more preferably satisfies all the requirements (e) to (g), in addition to the above requirements.

Requirement (e): [Glass Transition Point [Tg]]

The glass transition point of the propylene-based copolymer of the present invention, as measured by a differential scanning calorimeter (DSC), is preferably −60 to 0° C., more preferably −55 to −10° C., still more preferably −50 to −10°

C. When the glass transition point is in this range, the resulting material has excellent low-temperature properties.

Requirement (f): [Melting Point [Tm]]

The melting point (Tm) of the propylene-based copolymer of the present invention, as measured by DSC, is preferably not higher than 100° C. or is not observed, because the resulting composition has excellent flexibility. The expression "the melting point is not observed" means that a crystal melting peak at which the quantity of heat of crystal fusion is not less than 1 J/g is not observed in the range of −150 to 200° C. The measuring method is the same as that in the later-described working examples.

Requirement (g): [molecular weight distribution [Mw/Mn]]

The ratio (Mw/Mn) of a weight-average molecular weight (Mw) of the propylene-based copolymer of the present invention, as measured by gel permeation chromatography (GPC), to a number-average molecular weight (Mn) thereof, as measured by the same, is usually 3.5 to 20.0, preferably 3.5 to 15.0, more preferably 3.5 to 13.0, still more preferably 4.5 to 10.0, much more preferably 5.5 to 10.0. If the value of Mw/Mn is large, the quantity of long-chain branches is large, and the melt tension tends to become high.

Requirement (h): [Branching Index]

In the present invention, the propylene-based copolymer (A) for use in the later-described propylene-based copolymer composition (Y) preferably has a branching index, as represented by the following formula (h), of 2 to 20, more preferably 3 to 15, particularly preferably 4 to 10.

$$\text{Branching index} = [\text{Log}(\eta_{0.01}) - \text{Log}(0.116 \times \eta_8)^{1.2367}] \times 10 \quad \text{(h)}$$

wherein $\eta_{0.01}$ is a viscosity (Pa·sec) at 190° C. and 0.01 rad/sec, and $\eta_8$ is a viscosity (Pa·sec) at 8 rad/sec.

The branching index is an indication of the quantity of long-chain branches of the copolymer (A), and as the branching index is increased, the quantity of long-chain branches tends to become larger. When the branching index is in the above range, the composition is excellent in molding properties, such as extrudability, press moldability and injection moldability, and roll processability, and besides, a molded product obtained from the composition is also excellent in strength and flexibility, so that such a branching index is preferable.

The branching index used as an indication of the quantity of long-chain branched structures indicates a degree of branching formed in a terpolymer containing a non-conjugated diene that is a third component, on the basis of a polymer structure of a bipolymer containing no non-conjugated diene.

For determining the branching index, a complex viscosity on the lower frequency side (0.01 rad/sec) having a greatest influence on the polymer structure by virtue of the long-chain branched structure and a melt viscosity corresponding to the frequency (8 rad/sec) for measuring a Mooney viscosity that is an indication of a rubber (copolymer) are measured, and their ratio is calculated.

A larger calculated value (ratio) indicates that the change of melt viscosity between at a low frequency and at a high frequency is larger, and this change exhibits a molecular structure of the polymer. A large change of the melt viscosity means that the number of main chains is small and many branches are present in the molecular structure, and in this case, the polymer reacts to external stress sensitively and exhibits large behavior (influence of branches is great). On the other hand, in the case where many main chains and few branches exist, the molecular chains are relatively uniform, the molecular chains are strongly entangled, and the polymer is insensitive to external stress and exhibits small behavior (influence of main chains is great).

In a polymer having a long-chain branched structure, therefore, a large number of branches are present for the main chains, and the value calculated from the branching index formula becomes large, and this means that a large number of branches have been introduced into the polymer. However, if a large number of branched structures are introduced into the polymer, strength of the polymer is lowered because of decrease of main chain structures, though the processing properties are improved as a whole. On that account, it cannot be said that the larger the number of the long-chain branched structures is, the better the polymer is, and a polymer having a good balance between processability and strength is optimum.

By the use of the copolymer (A) having a specific branching index, that is, the copolymer (A) having a controlled long-chain branched structure, the rubber composition has an excellent balance between processability and strength.

By preparing the copolymer (A) using a metallocene catalyst (preferably catalyst having a structure represented by the formula (iii) in Japanese Patent Laid-Open Publication No. 2011-16907), an olefin-based rubber having the aforesaid branching index can be obtained. In general, by raising the polymerization temperature in the preparation of a copolymer, the branching index tends to increase, and by lowering the polymerization pressure, the branching index tends to increase.

The branching index can be calculated using a viscosity (Pa·sec) at 190° C. and 0.01 rad/sec and a viscosity (Pa·sec) at 190° C. and 8 rad/sec, which are determined by the use of a viscoelasticity tester while changing the frequency.

[Preparation Process for Propylene-Based Copolymer]

Next, the preparation process for the propylene-based copolymer of the present invention is described. The preparation process for the copolymer of the present invention is not specifically restricted, but the copolymer is preferably synthesized by the following process.

The copolymer of the present invention can be prepared by, for example, subjecting propylene and one or more monomers selected from α-olefins to solution polymerization usually at a temperature of 50 to 300° C. in the presence of a solvent (sometimes referred to as "high-temperature solution polymerization" in the following description) in the presence of an olefin polymerization catalyst comprising (A) a crosslinking type metallocene compound represented by the following general formula [I] and (B) at least one compound (sometimes referred to as a "cocatalyst") selected from (b-1) an organoaluminum oxy-compound, (b-2) a compound which reacts with the metallocene compound (A) to form an ion pair and (b-3) an organoaluminum compound. In the preparation process for the copolymer in the present invention, a metallocene catalyst having a structure different from the general formula (I) may be used, or a cocatalyst different from the component (B) may be used, or two or more kinds of copolymers publicly known may be prepared by means of reactor blending or physical blending, as far as the above requirements are satisfied.

[Chem. 1]

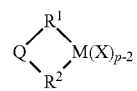

[I]

In the general formula [I], M is a transition metal, p is a valence of the transition metal, each X may be the same or different and is a hydrogen atom, a halogen atom or a hydrocarbon group, $R_1$ and $R_2$ may be the same or different and is a π-electron conjugated ligand coordinated to M, and Q is a divalent group that crosslinks the two π-electron conjugated ligands $R_1$ and $R_2$ to each other.

Examples of the transition metals represented by M in the general formula (I) include Zr, Ti, Hf, V, Nb, Ta and Cr. A preferred transition metal is Zr, Ti or Hf, and a more preferred transition metal is Zr or Hf.

Examples of the π-electron conjugated ligands represented by $R^1$ and $R^2$ in the general formula [I] include ligands having η-cyclopentadienyl structure, η-benzene structure, η-cycloheptatrienyl structure and η-cyclooctatetraene structure. A particularly preferred ligand is a ligand having η-cyclopentadienyl structure. Examples of the ligands having cyclopentadienyl structure include cyclopentadienyl group, indenyl group, hydrogenated indenyl group and fluorenyl group. These groups may be further substituted by halogen atoms, hydrocarbon groups, such as alkyl, aryl, aralkyl, alkoxy and aryloxy, hydrocarbon group-containing silyl groups, such as trialkylsilyl group, chain or cyclic alkylene groups, etc.

The group that is represented by Q and crosslinks $R^1$ and $R^2$ to each other in the formula [I] is not specifically restricted provided that it is a divalent group, and examples thereof include straight-chain or branched chain alkylene group, non-substituted or substituted cycloalkylene group, alkylidene group, non-substituted or substituted cycloalkylidene group, non-substituted or substituted phenylene group, silylene group, dialkyl-substituted silylene group, germyl group and dialkyl-substituted germyl group.

As the metallocene compound satisfying the general formula [I], di(p-tolyl)methylene(cyclopentadienyl)(octamethyloctahydrodibenzofluorenyl)zirconium dichloride, di(p-chlorophenyl)methyelne(cyclopentadienyl)(octamethyloctahydrodibenzofluorenyl)zirconium dichloride or (t-butylamido)-dimethyl(η5-2-methyl-s-indacen-1-yl)silane titanium(II) 1,3-pentadiene is preferable in the present invention, but the metallocene compound is not limited thereto.

Next, a preferred embodiment wherein the metallocene compound (A) is used as a polymerization catalyst component for preparing the copolymer of the present invention is described.

When a metallocene catalyst containing the metallocene compound (A) is used as an olefin polymerization catalyst for preparing the propylene-based copolymer, the polymerization catalyst is preferably constituted of (A) the crosslinking type metallocene compound represented by the general formula [I] and (B) at least one compound selected from (b-1) an organoaluminum oxy-compound, (b-2) a compound which reacts with the metallocene compound (A) to form an ion pair and (b-3) an organoaluminum compound, as previously described. As the catalyst component (B), any one of the following [c1] to [c4] is preferably used from the viewpoints of polymerization activity and properties of the propylene-based copolymer prepared;

[c1] only the compound (b-1),
[c2] a mixture of the compound (b-1) and the compound (b-3),
[c3] a mixture of the compound (b-2) and the compound (b-3), and
[c4] a mixture of the compound (b-1) and the compound (b-2).

However, when a metallocene compound wherein Q in the formula [I] of the component (A) is a silylene group is used, the compound (b-2) is not used as the component (B), and therefore, [c1] or [c2] is adopted.

The components capable of forming the component (B) are specifically described.

(b-1) Organoaluminum Oxy-Compound

As the organoaluminum oxy-compound (b-1), aluminoxane hitherto publicly known can be used as it is. As examples of the aluminoxanes, aluminoxanes of the following general formula [II] and/or general formula [III] can be given.

[Chem. 2]

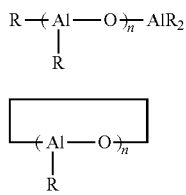

[II]

[III]

In the formula [II] or [III], R is a hydrocarbon group of 1 to 10 carbon atoms, and n is an integer of 2 or more.

In particular, methylaluminoxane wherein R is a methyl group and n is 3 or more, preferably 10 or more, is utilized (organoaluminum oxy-compound wherein R in the general formula [II] or [III] is a methyl group is sometimes referred to as "methylaluminoxane" hereinafter).

Methylaluminoxane is an organoaluminum oxy-compound that is frequently used in the polyolefin industry from the viewpoints of ease of obtaining and high polymerization activity, but it is sparingly soluble in saturated hydrocarbons, and therefore, it has been compelled to be used in the form of a solution thereof in an aromatic hydrocarbon of large environmental burden, such as toluene or benzene. Under such circumstances, methylaluminoxane analogues that are soluble in saturated hydrocarbons have been developed. As an example of such an analogue, modified methylaluminoxane of the following general formula [IV] can be given. In the present invention, such modified methylaluminoxane is also included in the organoaluminum oxy-compound (b-1)

[Chem. 3]

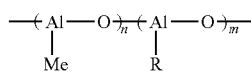

[IV]

In the formula [IV], R is a hydrocarbon group of 2 to 20 carbon atoms, and m and n are each an integer of 2 or more.

The modified methylaluminoxane represented by the general formula [IV] is prepared using trimethylaluminum and an alkylaluminum other than trimethylaluminum (as the preparation process, for example, U.S. Pat. No. 4,960,878 or U.S. Pat. No. 5,041,584 can be referred to). Further, modified methylaluminoxane having an isobutyl group as R, which is prepared using trimethylaluminum and triisobutylaluminum, has been commercially produced by Tosoh Finechem Corporation under the trade name of MMAO or TMAO™ (see, for example, "Toso kenkyu•gijutsu hokoku (Tosoh research & technology review)", Vol. 47, 55 (2003)). However, it has been confirmed by the present applicant that even if MMAO or TMAO™ in the form of a saturated hydrocarbon solution is polymerized by technology out of the technical range of the high-temperature solution polymerization process of the present invention, activity exceeding that of methylaluminoxane cannot be attained. According to the high-temperature solution polymerization process of the present invention, high polymerization activity is exhibited even when a saturated hydrocarbon solution of modified aluminoxane represented by the general formula [IV] is used.

In the high-temperature solution polymerization concerned with the present invention, a benzene-insoluble organoaluminum oxy-compound that is given as an example in Japanese Patent Laid-Open Publication No. 1990-78687 can be also applied to the organoaluminum oxy-compound (b-1).

Moreover, an organoaluminum oxy-compound containing boron, which is represented by the following general formula [V], can be also mentioned as the organoaluminum oxy-compound (b-1) for use in the present invention.

[Chem. 4]

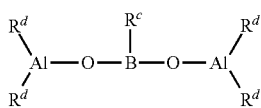

[V]

In the formula [V], $R^c$ is a hydrocarbon group of 1 to 10 carbon atoms. Each $R^d$ may be the same or different and is a hydrogen atom, a halogen atom or a hydrocarbon group of 1 to 10 carbon atoms.

In the organoaluminum oxy-compound (b-1), some quantity of an organoaluminum compound may be contained.

(b-2) Compound which Reacts with the Metallocene Compound (A) to Form Ion Pair

As the compounds (b-2) which react with the metallocene compound (A) to form an ion pair (sometimes called "ionic compounds" for short hereinafter), there can be mentioned Lewis acid, ionic compounds, borane compounds and carborane compounds, which are described in Japanese Patent Laid-Open Publication No. 1989-501950, Japanese Patent Laid-Open Publication No. 1989-502036, Japanese Patent Laid-Open Publication No. 1991-179005, Japanese Patent Laid-Open Publication No. 3-179006, Japanese Patent Laid-Open Publication No. 1991-207703, Japanese Patent Laid-Open Publication No. 1991-207704, U.S. Pat. No. 5,321,106, etc. Further, heteropoly compounds and isopoly compounds can be also mentioned as the ionic compounds (b-2).

The ionic compound (b-2) preferably adopted in the present invention is a compound represented by the following general formula [VI].

[Chem. 5]

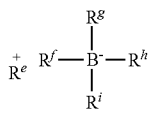

[VI]

In the formula [VI], $R^{e+}$ is $H^+$, carbenium cation, oxonium cation, ammonium cation, phosphonium cation, cycloheptyltrienyl cation, ferrocenium cation having a transition metal, or the like. $R^f$ to $R^i$ may be the same as or different from one another and are each an organic group, preferably an aryl group.

Specific examples of the carbenium cations include tri-substituted carbenium cations, such as triphenylcarbenium cation, tris(methylphenyl)carbenium cation and tris(dimethylphenyl)carbenium cation.

Specific examples of the ammonium cations include trialkylammonium cations, such as trimethylammonium cation, triethylammonium cation, tri(n-propyl)ammonium cation, triisopropylammonium cation, tri(n-butyl)ammonium cation and triisobutylammonium cation, N,N-dialkylanilinium cations, such as N,N-dimethylanilinium cation, N,N-diethylanilinium cation and N,N-2,4,6-pentamethylanilinium cation, and dialkylammonium cations, such as diisopropylammonium cation and dicyclohexylammonium cation.

Specific examples of the phosphonium cations include triarylphosphonium cations, such as triphenylphosphonium cation, tris(methylphenyl)phosphonium cation and tris(dimethylphenyl)phosphonium cation.

Of the above cations, carbenium cations and ammonium cations are preferable as $R^{e+}$, and in particular, triphenylcarbenium cation, N,N-dimethylanilinium cation and N,N-diethylanilinium cation are preferable.

Specific examples of the ionic compounds (b-2) that are carbenium salts include triphenylcarbenium tetraphenylborate, triphenylcarbenium tetrakis(pentafluorophenyl)borate, triphenylcarbenium tetrakis(3,5-ditrifluoromethylphenyl)borate, tris(4-methylphenyl)carbenium tetrakis(pentafluorophenyl)borate and tris(3,5-dimethylphenyl)carbenium tetrakis(pentafluorophenyl)borate.

As the ionic compounds (b-2) that are ammonium salts, there can be mentioned trialkyl-substituted ammonium salts, N,N-dialkylanilinium salts, dialkylammonium salts, etc.

Specific examples of the ionic compounds (b-2) that are trialkyl-substituted ammonium salts include triethylammonium tetraphenylborate, tripropylammonium tetraphenylborate, tri(n-butyl)ammonium tetraphenylborate, trimethylammonium tetrakis(p-tolyl)borate, trimethylammonium tetrakis(o-tolyl)borate, tri(n-butyl)ammonium tetrakis(pentafluorophenyl)borate, triethylammonium tetrakis(pentafluorophenyl)borate, tripropylammonium tetrakis(pentafluorophenyl)borate, tripropylammonium tetrakis(2,4-dimethylphenyl)borate, tri(n-butyl)ammonium tetrakis(3,5-dimethylphenyl)borate, tri(n-butyl)ammonium tetrakis(4-trifluoromethylphenyl)borate, tri(n-butyl)ammonium tetrakis(3,5-ditrifluoromethylphenyl)borate, tri(n-butyl)ammonium tetrakis(o-tolyl)borate, dioctadecylmethylammonium tetraphenylborate, dioctadecylmethylammonium tetrakis(p-tolyl)borate, dioctadecylmethylammonium tetrakis(o-tolyl)borate, dioctadecylmethylammonium tetrakis(pentafluorophenyl)borate, dioctadecylmethylammonium tetrakis(2,4-dimethylphenyl)borate, dioctadecylmethylammonium tetrakis(3,5-dimethylphenyl)borate, dioctadecylmethylammonium tetrakis(4-trifluoromethylphenyl)borate, dioctadecylmethylammonium tetrakis(3,5-ditrifluoromethylphenyl)borate and dioctadecylmethylammonium.

Specific examples of the ionic compounds (b-2) that are N,N-dialkylanilinium salts include N,N-dimethylanilinium tetraphenylborate, N,N-dimethylanilinium tetrakis(pentafluorophenyl)borate, N,N-dimethylanilinium tetrakis(3,5-ditrifluoromethylphenyl)borate, N,N-diethylanilinium tetraphenylborate, N,N-diethylanilinium tetrakis(pentafluorophenyl)borate, N,N-diethylanilinium tetrakis(3,5-ditrifluoromethylphenyl)borate, N,N-2,4,6-pentamethylanilinium tetraphenylborate and N,N-2,4,6-pentamethylanilinium tetrakis(pentafluorophenyl)borate.

Specific examples of the dialkylammonium salts include di(1-propyl)ammonium tetrakis(pentafluorophenyl)borate and dicyclohexylammonium tetraphenylborate.

As other ionic compounds (b-2), ionic compounds described in Japanese Patent Laid-Open Publication No. 2004-51676 are also employable without any restriction.

The above ionic compounds (b-2) may be used singly, or may be used by mixing two or more kinds.

(b-3) Organoaluminum Compound

As the organoaluminum compound (b-3) to form the olefin polymerization catalyst, for example, an organoaluminum compound represented by the following general formula [VII], a complex alkylated compound of a Group 1 metal and aluminum, which is represented by the following general formula [VIII], or the like can be mentioned.

$$R^a{}_m Al(OR^b)_n H_p X_q \qquad [VII]$$

In the formula [VII], $R^a$ and $R^b$ may be the same as or different from each other and is a hydrocarbon group of 1 to 15 carbon atoms, preferably 1 to 4 carbon atoms, X is a halogen atom, m is a number of 0<m≤3, n is a number of 0≤n<3, p is a number of 0≤p<3, q is a number of 0≤q<3, and m+n+p+q=3.

Specific examples of the organoaluminum compounds represented by the general formula [VII] include:

tri-n-alkylaluminums, such as trimethylaluminum, triethylaluminum, tri-n-butylaluminum, trihexylaluminum and trioctylaluminum;

branched chain alkylaluminums, such as triisopropylaluminum, triisobutylaluminum, tri-sec-butylaluminum, tri-tert-butylaluminum, tri-2-methylbutylaluminum, tri-3-methylhexylaluminum and tri-2-ethylhexylaluminum;

tricycloalkylaluminums, such as tricyclohexylaluminum and tricyclooctylaluminum;

triarylaluminums, such as triphenylaluminum and tritolylaluminum;

dialkylaluminum hydrides, such as diisopropylaluminum hydride and diisobutylaluminum hydride;

alkenylaluminums represented by the general formula $(i-C_4H_9)_x Al_y (C_5H_{10})_z$ (in the formula, x, y and z are each a positive number, and z≤2x) or the like, such as isoprenylaluminum;

alkylaluminum alkoxides, such as isobutylaluminum methoxide and isobutylaluminum ethoxide;

dialkylaluminumalkoxides, such as dimethylaluminummethoxide, diethylaluminum ethoxide and dibutylaluminum butoxide; alkylaluminum sesquialkoxides, such as ethylaluminum sesquiethoxide and butylaluminum sesquibutoxide;

partially alkoxylated alkylaluminums having average composition represented by the general formula $R^a{}_{2.5}Al(OR^b)_{0.5}$ or the like;

alkylaluminum aryloxides, such as diethylaluminum phenoxide and diethylaluminum (2,6-di-t-butyl-4-methylphenoxide);

dialkylaluminum halides, such as dimethylaluminum chloride, diethylaluminum chloride, dibutylaluminum chloride, diethylaluminum bromide and diisobutylaluminum chloride;

alkylaluminum sesquihalides, such as ethylaluminum sesquichloride, butylaluminum sesquichloride and ethylaluminum sesquibromide;

partially halogenated alkylaluminums, e.g., alkylaluminum dihalides, such as ethylaluminum dichloride;

dialkylaluminum hydrides, such as diethylaluminum hydride and dibutylaluminum hydride;

other partially hydrogenated alkylaluminums, e.g., alkylaluminum dihydrides, such as ethylaluminum dihydride and propylaluminum dihydride; and partially alkoxylated and halogenated alkylaluminums, such as ethylaluminum ethoxychloride, butylaluminum butoxychloride and ethylaluminum ethoxybromide.

$$M^2 AlR^a{}_4 \qquad [VIII]$$

In the formula [VIII], $M^2$ is Li, Na or K, and $R^a$ is a hydrocarbon group of 1 to 15 carbon atoms, preferably 1 to 4 carbon atoms. Examples of the complex alkylated compounds of a periodic table Group 1 metal and aluminum include $LiAl(C_2H_5)_4$ and $LiAl(C_7H_{15})_4$.

A compound analogous to the compound represented by the general formula [VII] can be also used, and for example, an organoaluminum compound wherein two or more aluminum compounds are bonded through a nitrogen atom can be mentioned. A specific example of such a compound is $(C_2H_5)_2AlN(C_2H_5)Al(C_2H_5)_2$.

From the viewpoint of ease of obtaining, trimethylaluminum or triisobutylaluminum is preferably used as the organoaluminum compound (b-3).

In the polymerization, the way of use of each component and the order of addition of the components are arbitrarily selected, and as an example, a method of introducing the catalyst component (A) and the catalyst component (B) to the polymerizer in an arbitrary order can be given.

In the above method, two or more kinds of the catalyst components may have been brought into contact with each other in advance.

The reaction temperature can be raised up to 100° C. because the catalyst is not deactivated even at a high temperature. The polymerization pressure is usually more than 0 MPa but not more than 8 MPa (gauge pressure), preferably more than 0 MPa but not more than 5 MPa (gauge pressure). The reaction time (average residence time in the case where copolymerization is carried out by continuous process) is usually 0.5 minute to 5 hours, preferably 10 minutes to 3 hours, though it varies depending upon the conditions such as catalytic concentration and polymerization temperature. Further, a molecular weight modifier such as hydrogen can be also used.

The molar ratio (charge ratio) ([A]/[B]) of propylene [A] to the α-olefin [B] of 2 to 10 carbon atoms other than propylene is usually 40/60 to 95/5, preferably 50/50 to 95/5.

The molar ratio (charge ratio) ([A]/[C]) of propylene [A] to the non-conjugated polyene [C] is usually 99.9/0.1 to 90/10, preferably 99.5/0.5 to 90/10.

By carrying out polymerization using the above catalyst, a proper amount of long-chain branches can be introduced into the propylene-based copolymer, so that use of such a catalyst is preferable.

It is also preferable to use a metallocene catalyst comprising (i) a transition metal compound represented by the following general formula (I) or (II) and (ii) at least one compound selected from (b-1) a compound (also referred to as an "ionizing ionic compound") which reacts with a transition metal M in the transition metal compound (i) to form an ionic complex, (b-2) an organoaluminum compound and (b-3) aluminoxane, as the polymerization catalyst for preparing the copolymer of the present invention.

[Chem. 6]

-continued

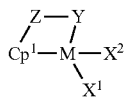
(II)

In the formulas (I) and (II), M is Ti, Zr, Hf, Rn, Nd, Sm or Ru, $Cp^1$ and $Cp^2$ are each a cyclopentadienyl group, an indenyl group, a fluorenyl group or a derivative group thereof, which is n-bonded to M, X1 and X2 are each an anionic ligand or a neutral Lewis base ligand, Y is a ligand containing a nitrogen atom, an oxygen atom, a phosphorus atom or a sulfur atom, and Z is an atom of C, O, B, S, Ge, Si or Sn, or a group containing any of these atoms.

In the general formula (I) of the transition metal compound, M is Ti, Zr, Hf, Rn, Nd, Sm or Ru, and is preferably Ti, Zr or Hf. $Cp^1$ and $Cp^2$ are each a cyclopentadienyl group, an indenyl group, a fluorenyl group or a derivative group thereof, which is n-bonded to M. Describing in more detail, $Cp^1$ and $Cp^2$ are each a ligand coordinated to the transition metal, and is a ligand having a cyclopentadienyl skeleton, such as cyclopentadienyl group, indenyl group, 4,5,6,7-tetrahydroindenyl group or fluorenyl group. This ligand having a cyclopentadienyl skeleton may have substituents, such as alkyl group, cycloalkyl group, trialkylsilyl group and halogen atom.

X1 and X2 are each an anionic ligand or a neutral Lewis base ligand, and specifically, there can be mentioned a hydrocarbon group of 1 to 12 carbon atoms, an alkoxy group, an aryloxy group, a sulfonic acid-containing group ($-SO_3R^a$ wherein $R^a$ is an alkyl group, an alkyl group substituted by a halogen atom, an aryl group, an aryl group substituted by a halogen atom, or an aryl group substituted by an alkyl group), a halogen atom, a hydrogen atom, etc.

Z is C, O, B, S, Ge, Si or Sn, or a group containing any of these atoms, and is, for example, a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, $-CO-$, $-SO-$, $-SO_2-$ or $-BR^5-$ ($R^5$ is a hydrogen atom, a halogen atom, a hydrocarbon group of 1 to 20 carbon atoms or a halogenated hydrocarbon group of 1 to 20 carbon atoms).

Specific examples of the transition metal compounds represented by the general formula (I) include compounds in the paragraphs [0050] and [0051] of Japanese Patent Laid-Open Publication No. 2002-97228.

In the general formula (II) of the transition metal compound, M is a transition metal of the periodic table Group 4 or lanthanide series, and is specifically Ti, Zr, Hf, Rn, Nd, Sm or Ru, preferably Ti, Zr or Hf. $Cp^1$ is a cyclopentadienyl group, an indenyl group, a fluorenyl group or a derivative group thereof, which is n-bonded to M. Describing in more detail, $Cp^1$ is a ligand coordinated to the transition metal, and is a ligand having a cyclopentadienyl skeleton, such as cyclopentadienyl group, indenyl group, fluorenyl group or derivative group thereof. This ligand having a cyclopentadienyl skeleton may have substituents, such as alkyl group, cycloalkyl group, trialkylsilyl group and halogen atom.

X1 and X2 are each an anionic ligand or a neutral Lewis base ligand, may be the same as or different from each other, and are each a hydrogen atom, a halogen atom, a hydrocarbon group containing 20 or less carbon atoms, a silyl group containing 20 or less silicon atoms, or a germyl group containing 20 or less germanium atoms. Y is a ligand containing a nitrogen atom, an oxygen atom, a phosphorus atom or a sulfur atom.

Z is carbon, oxygen, sulfur, boron or an element of the periodic table Group 14 (e.g., silicon, germanium or tin), preferably any one of carbon, oxygen and silicon, and Z may have substituents, such as alkyl group and alkoxy group. These substituents may be bonded to each other to form a ring. Z and Y may together form a condensed ring.

Specific examples of the transition metal compounds represented by the general formula (II) include compounds in the paragraph [0056] of Japanese Patent Laid-Open Publication No. 2002-97228. Of these, (1,1,4,4,7,7,10,10-octamethyl-1, 2,3,4,7,8,9,10-octahydrodibenzo(b,h)fluorenyl)zirconium dichloride is preferable in the present invention.

The transition metal compounds (i) can be used singly or in combination of two or more kinds. Such a transition metal compound (i) as above may be used by allowing a particulate carrier to support it thereon. Examples of the particulate carries include inorganic carriers, such as $SiO_2$, $Al_2O_2$, $B_2O_3$, MgO, $ZrO_2$, CaO, $TiO_2$, ZnO, $SnO_2$, BaO and ThO, and organic carries, such as polyethylene, polypropylene, poly-1-butene, poly-4-methyl-1-pentene and styrene/divinylbenzene copolymer. These particulate carries can be used singly or in combination of two or more kinds.

Specific examples of the at least one compound (ii) selected from (b-1) a compound which reacts with a transition metal M in the transition metal compound (i) to form an ionic complex, (b-2) an organoaluminum compound and (b-3) aluminoxane include compounds hitherto publicly known in the field of olefin polymerization, such as the compounds described above and the specific examples described in International Publication No. 01/027124 Pamphlet.

In the present invention, these metallocene catalysts can be used singly or in combination of two or more kinds.

In the present invention, the copolymer can be also prepared by copolymerizing propylene, an α-olefin of 2 to 10 carbon atoms other than propylene and a non-conjugated polyene in the presence of a metallocene catalyst comprising the component (i) and the component (ii) usually in a liquid phase. In this process, a hydrocarbon solvent is generally used, but an α-olefin such as propylene or 1-butene may be used as a solvent. Copolymerization can be carried out by any of a batch process and a continuous process.

When the copolymerization is carried out by a patch process using such a metallocene catalyst as above, the transition metal compound (i) is used in the polymerization system usually in an amount of 0.00005 to 1 mmol, preferably 0.0001 to 0.5 mmol, based on 1 liter of the polymerization volume.

When the ionizing ionic compound (b-1) is used as the component (ii), it is desirably used in such an amount that the molar ratio ((b-1)/(i)) of the ionizing ionic compound (b-1) to the transition metal compound (i) usually becomes 0.5 to 20, preferably 1 to 10. When the organoaluminum compound (b-2) is used as the component (ii), it is desirably used usually in an amount of about 0 to 5 mmol, preferably about 0 to 2 mmol, based on 1 liter of the polymerization volume.

When the aluminoxane (b-3) is used as the component (ii), it is desirably used in such an amount that the molar ratio (Al/M) of aluminum atom (Al) in the organoaluminoxane (b-3) to the transition metal atom (M) in the transition metal compound (i) usually becomes 1 to 10000, preferably 10 to 5000. The copolymerization reaction is carried out usually at a temperature of −20 to 150° C., preferably 0 to 120° C., more preferably 0 to 100° C., and at a pressure of more than 0 but not more than 80 kg/cm², preferably more than 0 but not more than 50 kg/cm².

The reaction time (average residence time in the case where the polymerization is carried out by continuous process) is usually 5 minutes to 3 hours, preferably 10 minutes to 1.5 hours, though it varies depending upon the conditions such as catalytic concentration and polymerization temperature. In the copolymerization, a molecular weight modifier such as hydrogen can be also used.

In the present invention, propylene, an α-olefin of 2 to 10 carbon atoms other than propylene and a non-conjugated polyene are polymerized in the presence of a metallocene catalyst so that the resulting copolymer may finely have the aforesaid properties. The polymerization can be carried out by a liquid phase polymerization process, such as suspension polymerization or solution polymerization, or a vapor phase polymerization process.

When such polymerization is carried out by a liquid phase polymerization process, there can be used, as the polymerization media, inert hydrocarbon solvents, e.g., aliphatic hydrocarbons, such as propane, butane, pentane, hexane, heptane, octane, decane, dodecane and kerosine; alicyclic hydrocarbons, such as cyclopentane, cyclohexane, methylcyclopentane; aromatic hydrocarbons, such as benzene, toluene and xylene; halogenated hydrocarbons, such as ethylene chloride, chlorobenzene and dichloromethane; and mixtures of these hydrocarbons, propylene may be used as the media.

When such polymerization is carried out by a suspension polymerization process, the polymerization is desirably carried out usually at a temperature −50 to 100° C., preferably 0 to 90° C. When the polymerization is carried out by a solution polymerization process, the polymerization is desirably carried out usually at a temperature of 0 to 250° C., preferably 20 to 200° C. When the polymerization is carried out by a vapor phase polymerization process, the polymerization is desirably carried out usually at a temperature of 0 to 120° C., preferably 20 to 100° C. The polymerization is carried out usually at a pressure of normal pressure to 100 kg/cm$^2$, preferably normal pressure to 50 kg/cm$^2$.

The polymerization can be carried out by any of a batch process, a semi-continuous process and a continuous process. It is also possible to carry out the polymerization in two or more stages that are different in reaction conditions. The molecular weight of the propylene-based copolymer of the present invention obtained as above can be controlled by allowing hydrogen to exist in the polymerization system or by changing the polymerization temperature or the polymerization pressure.

<Propylene-Based Copolymer Composition>

The propylene-based copolymer composition (X) of the present invention comprises the propylene-based copolymer of the present invention in an amount of 5 to 95 parts by weight, preferably 10 to 80 parts by weight, more preferably 10 to 50 parts by weight, and the later-described crystalline olefin resin (B) in an amount of 95 to 5 parts by weight, preferably 90 to 20 parts by weight, more preferably 90 to 50 parts by weight, with the proviso that the total amount of the components (A) and (B) is 100 parts by weight. When the amounts of the components are in the above ranges, a composition having excellent material strength and an excellent balance between molding processability and melt tension is obtained.

The propylene-based copolymer composition (X1) of the present invention comprises the propylene-based copolymer (A1) of the present invention in an amount of 5 to 80 parts by weight, preferably 10 to 80 parts by weight, more preferably 10 to 50 parts by weight, and polypropylene (B1) as the crystalline olefin resin (B) in an amount of 95 to 20 parts by weight, preferably 20 to 90 parts by weight, more preferably 50 to 90 parts by weight, with the proviso that the total amount of the components (A1) and (B1) is 100 parts by weight, and satisfies the following requirement (xa). Such a copolymer composition (X1) is preferable because it is excellent not only in material strength but also in balance between molding processability and melt tension.

When the copolymer composition (X) of the present invention comprises the propylene-based copolymer of the present invention in an amount of 5 to 50 parts by weight, preferably 10 to 50 parts by weight, and the later-described crystalline olefin resin (B) in an amount of 95 to 50 parts by weight, preferably 90 to 50 parts by weight, with the proviso that the total amount of the components (A) and (B) is 100 parts by weight, the composition is excellent particularly in heat resistance, rigidity and material strength, so that such a composition is preferable.

When the propylene-based copolymer composition (X) of the present invention comprises the propylene-based copolymer of the present invention in an amount of more than 50 parts by weight but not more than 95 parts by weight, preferably 51 to 95 parts by weight, more preferably 51 to 80 parts by weight, and the later-described crystalline olefin resin (B) in an amount of less than 50 part by weight but not less than 5 parts by weight, preferably 49 to 5 parts by weight, more preferably 49 to 20 parts by weight, with the proviso that the total amount of the components (A) and (B) is 100 parts by weight, the composition is excellent particularly in flexibility and impact resistance, so that such a composition is preferable.

Requirement (xa): [Ratio ($MT_{(X1)}/MT_{(B1)}$)]

The ratio ($MT_{(X1)}/MT_{(B1)}$) of a melt tension $MT_{(X1)}$ of the copolymer composition (X or X1) of the present invention at 230° C. to a melt tension $MT_{(B1)}$ of the polypropylene (B1) at 230° C. is usually 2.0 to 10.0, preferably 2.0 to 8.0, more preferably 2.0 to 6.0. By the ratio ($MT_{(X1)}/MT_{(B1)}$) in the above range, it is meant that the copolymer composition (X) and the copolymer composition (X1) have been improved in melt properties as compared with the crystalline olefin resin (B) and the polypropylene (B1), respectively, and such compositions are excellent in molding processability. If the ratio is less than 2.0, desired molding processability is not obtained because modification of melt properties is low, and if the ratio exceeds 10.0, molding failure is liable to occur because melt viscosity is too high, so that such ratios are undesirable.

The melt tension $MT_{(X1)}$ of the copolymer composition (X or X1) at 230° C. is usually 1 to 200 (mN), preferably 1 to 100 (mN). If the melt tension exceeds the upper limit of the above range, the resin itself rarely extends during melt molding, and when the resin is deformed at a high speed, there is a fear of breakage of the resin itself. On the other hand, if the melt tension is less than the lower limit of the above range, the resin itself is liable to be deformed during melt molding, and there is a fear of difficult molding.

The copolymer composition (X or X1) usually has $MFR_{2.16}$, as obtained at 230° C. under a load of 2.16 kg in accordance with JIS K-6721, of 0.05 to 100 (g/10 min), preferably 0.1 to 50 (g/10 min), more preferably 0.5 to 10 (g/10 min). When the $MFR_{2.16}$ is in the above range, the composition is excellent in molding processability during melt molding, and properties of a molded product are also excellent. Further, the melt viscosity during foaming is in a proper range, and the composition exhibits excellent foaming properties, so that such a range is preferable.

[Crystalline Olefin Resin (B)]

The crystalline olefin resin (B) is a resin usually having a melting point, as measured by DSC, of not lower than 70° C., preferably 110 to 250° C., differently from the copolymer of the present invention.

The density of the resin (B) is not specifically restricted, but the density, as measured in accordance with ASTM D 1505, is preferably not less than 0.830 g/cm³, more preferably not less than 0.855 g/cm³, still more preferably 0.870 to 0.980 g/cm³.

The weight-average molecular weight (Mw) of the resin (B), as determined by gel permeation chromatography (GPC), is usually not more than 1,000,000, preferably not more than 800,000, more preferably not more than 500,000. Although the lower limit is not specifically restricted, Mw is not less than 50,000. The Mw is a value measured by GPC (gel permeation chromatography) under the following conditions. The calibration curve was made by the use of standard polystyrene.

(Measuring Conditions)

Apparatus: 150-CV (manufactured by Waters Corporation), column: Shodex™ AD-80M/S (manufactured by Showa Denko K.K.), measuring temperature: 135° C., solvent: orthodichlorobenzene, sample concentration: 8 mg/4 ml, flow rate: 1 ml/min The resin (B) usually has a melt flow rate (MFR, JIS K-6721, 230° C., load of 2.16 kg) of 0.1 to 100 g/10 min, preferably 0.2 to 50 g/10 min.

Examples of the crystalline olefin resins (B) include low-density, medium-density or high-density polyethylene, high-pressure low-density polyethylene, isotactic polypropylene, syndiotactic polypropylene, poly-1-butene, poly-4-methyl-1-pentene, poly-3-methyl-1-pentene, an ethylene/α-olefin random copolymer, a propylene/α-olefin random copolymer, a 1-butene/α-olefin random copolymer, a cyclic olefin copolymer, chlorinated polyolefin, a vinyl acetate copolymer, an ethylene.methacrylic acid/acrylate copolymer, an ionomer and an ethylene/vinyl alcohol copolymer. From the viewpoints of mechanical properties, heat resistance and molding processability, preferred are isotactic polypropylene, syndiotactic polypropylene, poly-4-methyl-1-pentene, polyethylene and polybutene-1, and from the viewpoint of a balance between mechanical properties, heat resistance and molding processability, more preferred is polypropylene, such as isotactic polypropylene or syndiotactic polypropylene. It is also preferable that the resin (B) is polypropylene (B1).

Polypropylene (B) is a propylene homopolymer or a random or block copolymer of propylene and an α-olefin of 2 to 20 carbon atoms (other than propylene), such as a propylene/ethylene block copolymer, a propylene/ethylene random copolymer or a propylene/ethylene/1-butene random copolymer, and contains constituent units derived from propylene usually in amounts of not less than 50% by mol, preferably not less than 60% by mol, more preferably not less than 80% by mol, in 100% by mol of the total amount of constituent units derived from propylene and constituent units derived from an α-olefin of 2 to 20 carbon atoms (other than propylene). The structure of stereoregularity may be any of an isotactic structure and a syndiotactic structure.

The melting point of the polypropylene (B1), as obtained by a differential scanning calorimetry (DSC), is usually in the range of 110 to 170° C., preferably 120 to 167° C., more preferably 125 to 165° C. When the melting point of the polypropylene (B1) is in the above range, the polypropylene has an excellent balance between heat resistance and mechanical properties, so that such a melting point is preferable.

The melt tension $MT_{(B1)}$ of the polypropylene (B1) at 230° C. is usually 1 to 200 (mN), preferably 1 to 100 (mN).

When heat resistance and mechanical properties of the resulting molded product or foamed product are taken into account, the polypropylene (B1) is preferably a propylene homopolymer or a propylene/ethylene block copolymer.

The above crystalline olefin resins can be used singly or in combination of two or more kinds. The preparation process for these crystalline olefin resins is not specifically restricted, and the resins can be prepared using various catalysts and using various preparation processes publicly known.

The quantity of heat of fusion of the whole crystalline olefin resin (B) is desirably not less than 1 J/g, more desirably not less than 30 J/g. The upper limit of the quantity of heat of fusion is not specifically restricted, but the quantity of heat of fusion is usually not more than 300 J/g, preferably not more than 100 V/g.

[Other Resins]

The copolymer composition of the present invention may contain other thermoplastic resins within limits not detrimental to the object of the present invention. Examples of the thermoplastic resins include polyamide, polyester, polyurethane, polystyrene, polyimide and polyether.

[Other Components (Additives)]

To the propylene-based copolymer and the propylene-based copolymer composition of the present invention (sometimes also referred to as "the copolymer or the composition" hereinafter), additives, such as weathering stabilizer, heat stabilizer, antistatic agent, anti-slip agent, anti-blocking agent, anti-fogging agent, lubricant, pigment, dye, plasticizer, anti-aging agent (stabilizer), hydrochloric acid absorbing agent, antioxidant and secondary antioxidant, may be added when needed, within limits not detrimental to the object of the present invention. Although the amounts added are not specifically restricted, the additives are each added usually in an amount of about 0.001 to 10 parts by weight, preferably about 0.05 to 1 part by weight, based on 100 parts by weight of the copolymer or the composition.

Further, other components (additives), such as blowing agent, blowing aid, nucleating agent, vulcanizing agent, vulcanizing accelerator, vulcanizing aid, reinforcing agent, filler, softener, processing aid, activator, moisture absorbing agent, crosslinking agent, co-crosslinking agent, crosslinking aid, (pressure-sensitive) adhesive, flame retardant and release agent, can be added, when needed.

These components (additives) may be used singly, or may be used in combination of two or more kinds.

(Blowing Agent)

Examples of the blowing agents include inorganic blowing agents, such as sodium bicarbonate, sodium carbonate, ammonium hydrogencarbonate, ammonium carbonate and ammonium nitrite; and organic blowing agents, e.g., nitroso compounds, such as N,N'-dinitrosopentamethylenetetramine and N,N'-dinitrosoterephthalamide, azo compounds, such as azodicarbonamide and azobisisobutyronitrile, hydrazide compounds, such as benzenesulfonyl hydrazide and 4,4'-oxybis(benzenesulfonyl hydrazide), and azide compounds, such as calcium azide and 4,4'-diphenyldisulfonyl azide. Examples of commercial products thereof include CELLMIC™ MB1023 (trade name, available from Sankyo Kasei Co., Ltd.), Vinyfor AC-2F (trade name, available from Eiwa Chemical Ind. Co., Ltd.), Vinyfor AC#LQ (trade name, available from Eiwa Chemical Ind. Co., Ltd., azodicarbonamide (abbreviation: ADCA)), NEOCELLBORN™ N#1000SW (trade name, available from Eiwa Chemical Ind. Co., Ltd., 4,4'-oxybis(benzenesulfonyl hydrazide) (abbreviation: OBSH)) and CELLULAR D™ (trade name, available from Eiwa Chemical Ind. Co., Ltd., N,N'-dinitrosopentamethylenetetramine (abbreviation: DPT)).

From the viewpoint of the amount of a blowing gas generated, it is desirable that the amount of the blowing agent added is usually 1 to 70 parts by weight, preferably 3 to 60 parts by weight, based on 100 parts by weight of the propylene-based copolymer. In the case of the copolymer composition, the amount of the blowing agent added is usually 1 to 70 parts by weight, preferably 3 to 60 parts by weight, based on 100 parts by weight of the total amount of the copolymer (A) and the crystalline olefin resin (B).

(Blowing Aid)

In the present invention, a blowing aid may be added in addition to the blowing agent, when needed. The blowing aid exhibits a function to lower a decomposition temperature of the blowing agent, a function to accelerate decomposition or a function to make cells uniform.

Examples of the blowing aids include metal compounds, such as zinc, calcium, lead, iron and barium, organic acids or salts thereof, such as salicylic acid, phthalic acid, stearic acid, oxalic acid and citric acid, inorganic fine particles, such as talc, barium sulfate and silica, and urea or derivatives thereof. Further, there can be also mentioned mixtures of polycarboxylic acids, such as citric acid, oxalic acid, fumaric acid, phthalic acid, malic acid, tartaric acid, lactic acid, cyclohexane-1,2-dicarboxylic acid, camphoric acid, ethylenediaminetetraacetic acid, triethylenetetraminehexaacetic acid and nitrilo acid, and inorganic carbonic acid compounds, such as sodium hydrogencarbonate, sodium aluminum hydrogencarbonate and potassium hydrogencarbonate; intermediates produced by these reactions, e.g., salts of polycarboxylic acids, such as sodium dihydrogen citrate and potassium oxalate, etc. Examples of commercial products thereof include Cellpaste K5 (trade name, available from Eiwa Chemical Ind. Co., Ltd., urea) and FE-507 (trade name, available from Eiwa Chemical Ind. Co., Ltd., sodium bicarbonate).

Although the amount of the blowing aid added is not specifically restricted, it is usually 0.1 to 5 parts by weight, preferably 0.5 to 4 parts by weight, based on 100 parts by weight of the copolymer or the composition.

The blowing agent or the blowing aid may be dry blended before extrusion molding for forming a foam molded product so that the blowing agent or the blowing aid may be decomposed during extrusion molding, or may be melt blended with pellets in advance.

(Nucleating Agent)

As the nucleating agent, any of various nucleating agents publicly known can be properly used within limits not detrimental to the effects of the present invention. Examples of commercial products thereof include GELALL™ MD (available from New Japan Chemical Co., Ltd.), ADKSTAB™ NA-11 (trade name, Adeka Corporation), Millad 3988 (trade name, available from Milliken) and NC-4 (trade name, available from Mitsui Chemicals, Inc.)

The amount of the nucleating agent added is not specifically restricted as far as the effects of the present invention are exerted, but it is usually 0.01 to 5 parts by weight based on 100 parts by weight of the copolymer or the composition.

(Reinforcing Agent and Filler)

For the purpose of improving mechanical properties, such as tensile strength, tear strength and abrasion resistance, a reinforcing agent, an inorganic filler, an organic filler, etc. may be properly added in the present invention, when need.

Examples of the reinforcing agents include carbon black, such as Asahi #55G, Asahi #50HG and Asahi #60G (trade names, available from Asahi Carbon Co., Ltd.) and Shiest (SRF, GPF, FEF, MAF, HAF, ISAF, SAF, FT and MT) (available from Tokai Carbon Co., Ltd.); products obtained by surface-treating these carbon black with silane-coupling agents; silica; activated calcium carbonate; and finely powdered talc and finely powdered silicic acid. Of these, Asahi #55G, Asahi #50HG, Shiest HAF, etc. are preferable.

Specific examples of silica include fumed silica and precipitated silica. Such silica may have been surface-treated with reactive silane, such as hexamethyldisilazane, chlorosilane or alkoxysilane, low-molecular weight siloxane, or the like. The specific surface area (BED method) of such silica is preferably not less than 50 $m^2/g$, more preferably 100 to 400 $m^2/g$.

Examples of the inorganic fillers include light calcium carbonate, heavy calcium carbonate, talc and clay. Of these, heavy calcium carbonate is preferable. As the heavy calcium carbonate, for example, WHITON™ SB (trade name, available from Shiraishi Calcium Kaisha, Ltd.) that is on the market is employable.

Examples of the organic fillers include polystyrene, polymethyl methacrylate, phenolic resin, boron fiber, silicon carbide fiber, polyethylene fiber, polypropylene fiber, polyester fiber, polyamide fiber, high styrenes, lignin and reclaimed rubber.

The amount of the reinforcing agent or the filler added is usually 30 to 200 parts by weight, preferably 50 to 180 parts by weight, more preferably 70 to 160 parts by weight, based on 100 parts by weight of the copolymer or the composition.

When the amount of the reinforcing agent or the filler added is in the above range, the copolymer or the composition is excellent in kneading processability, and the resulting molded product is excellent in mechanical properties such as strength.

(Softener)

Examples of the softeners include petroleum-based softeners, such as process oil (e.g., DIANA™ Process Oil PS-430 (trade name, available from Idemitsu Kosan Co., Ltd.)), lubricating oil, paraffinic oil, liquid paraffin, petroleum asphalt and vaseline; coal tar-based softeners, such as coal tar and coal tar pitch; fatty oil-based softeners, such as castor oil, linseed oil, rapeseed oil, soybean oil and coconut oil; waxes, such as bees wax, carnauba wax and lanoline; fatty acids or salts thereof, such as ricinolic acid, palmitic acid, stearic acid, barium stearate, calcium stearate and zinc laurate; naphthenic acid, pine oil and rosin, or derivatives thereof; synthetic high-molecular substances, such as terpene resin, petroleum resin, atactic polypropylene and coumarone indene resin; ester-based softeners, such as dioctyl phthalate, dioctyl adipate and dioctyl sebacate; and other softeners, such as microcrystalline wax, liquid polybutadiene, modified liquid polybutadiene, liquid thiokol, hydrocarbon-based synthetic lubricating oil, tall oil and rubber substitute (factice). Of these, petroleum-based softeners are preferable, and process oil is particularly preferable. The softeners may be used singly, or may be used in combination of two or more kinds.

Although the amount of the softener added can be properly selected according to the use purpose, it is usually 200 parts by weight, preferably 150 parts by weight, more preferably 130 parts by weight, at most, based on 100 parts by weight of the copolymer and the composition.

(Anti-Aging Agent (Stabilizer))

By the use of an anti-aging agent in the present invention, the product life can be lengthened, so that use of it is preferable.

As the anti-aging agents, hitherto publicly known anti-aging agents, such as amine-based anti-aging agents, phenol-based anti-aging agents and sulfur-based anti-aging agents can be mentioned. Specific examples thereof include aromatic secondary amine-based anti-aging agents, such as phenylbutylamine and N,N'-di-2-naphthyl-p-phenylenediamine; phenol-based anti-aging agents, such as dibutylhydroxytoluene and tetrakis[methylene(3,5-di-t-butyl-4-hydroxy)hydrocinnamate]methane; thioether-based anti-aging agents, such as bis[2-methyl-4-(3-n-alkylthiopropionyloxy)-5-t-butylphenyl]sulfide; dithiocarbamate-based anti-aging agents, such as nickel dibutyldithiocarbamate; zinc salts of 2-mercaptobenzoylimidazole and 2-mercaptobenzimidazole; and sulfur-based anti-aging agents, such as dilauryl thiodipropionate and distearyl thiodipropionate. These anti-aging agents may be used singly, or may be used in combination of two or more kinds.

The amount of the anti-aging agent added is usually 0.3 to 10 parts by weight, preferably 0.5 to 7.0 parts by weight, more preferably 0.7 to 5.0 parts by weight, based on 100 parts by weight of the copolymer or the composition.

(Processing Aid)

As the processing aids, compounds generally added to rubbers as processing aids can be widely used. Specific examples thereof include ricinolic acid, palmitic acid, lauric acid, stearic acid, stearic acid esters, barium stearate, zinc stearate and calcium stearate. Of these, stearic acid is preferable.

The amount of the processing aid added is usually not more than 10 parts by weight, preferably not more than 8.0 parts by weight, more preferably not more than 5.0 parts by weight, based on 100 parts by weight of the copolymer or the composition.

(Activator)

Examples of the activators include amines, such as di-n-butylamine, dicyclohexylamine, monoethanolamine, Acting B (trade name, available from Yoshitomi Pharmaceutical Industries, Ltd.) and Acting SL (trade name, available from Yoshitomi Pharmaceutical Industries, Ltd.); activators, such as diethylene glycol, polyethylene glycol (e.g., PEG#4000 (trade name, available from Lion Corporation)), lecithin, triallylate mellitate, and zinc compounds of aliphatic and aromatic carboxylic acids (e.g., Struktol™ activator 73, Struktol™ IB 531 and Struktol™ FA 541 (trade names, available from Scill & Seilacher)); zinc peroxide product, such as ZEONET™ ZP (trade name, available from Nippon Zeon Co., Ltd.); octadecyltrimethyl ammonium bromide; synthetic hydrotalcite; and special quaternary ammonium compounds (e.g., Arquad 2HF (trade name, available from Lion Akzo Co., Ltd)). Of these, polyethylene glycol (e.g., PEG#4000 (trade name, available from Lion Corporation)) and Arquad 2HF are preferable. These activators may be used singly, or may be used in combination of two or more kinds.

The amount of the activator added is usually 0.2 to 10 parts by weight, preferably 0.3 to 5 parts by weight, more preferably 0.5 to 4 parts by weight, based on 100 parts by weight of the copolymer or the composition.

(Moisture Absorbing Agent)

Examples of the moisture absorbing agents include calcium oxide, silica gel, sodium sulfate, molecular sieves, zeolite and white carbon. Of these, calcium oxide is preferable. The moisture absorbing agent can be properly selected according to the use purpose, and can be used singly or by mixing two or more kinds.

The amount of the moisture absorbing agent added is usually 0.5 to 15 parts by weight, preferably 1.0 to 12 parts by weight, more preferably 1.0 to 10 parts by weight, based on 100 parts by weight of the copolymer or the composition.

(Crosslinking Agent and Crosslinking Aid)

In the case of crosslinking of the copolymer, the crosslinking agent in the crosslinking foaming is, for example, an organic peroxide, sulfur, a sulfur compound or a silane compound (SiH group-containing compound). In the case of crosslinking of the composition, the crosslinking agent is, for example, an organic peroxide, sulfur, a sulfur compound, a silane compound or a phenol-based vulcanizer such as phenol resin. An organic peroxide is preferable.

It is preferable to properly select the crosslinking agent according to the apparatus used for the crosslinking reaction and the desired crosslinking mode. When the crosslinking agent is used, the amount thereof is 0.005 to 10 parts by weight, preferably 0.01 to 8 parts by weight, based on 100 parts by weight of the copolymer or the composition. When the crosslinking agent is used in the above amount, properties of a blowing agent can be obtained in the crosslinking foaming, so that use of a crosslinking agent is preferable.

In the case of crosslinking of the copolymer, the temperature for the crosslinking is preferably 100 to 180° C. when an organic peroxide, sulfur or a sulfur compound is used as the crosslinking agent, and it is preferably 20 to 180° C. when a silane compound is used as the crosslinking agent. In the case of crosslinking of the composition, the temperature for the crosslinking is 120 to 250° C., preferably 150° to 230° C. The kneading time is usually 1 to 20 minutes, preferably 1 to 10 minutes.

Examples of the organic peroxides include dicumyl peroxide, di-t-butyl peroxide, 2,5-dimethyl-2,5-di(t-butylperoxy)hexane, 2,5-dimethyl-2,5-di(t-butylperoxy)hexyne-3,1,3-bis(t-butylperoxyisopropyl)benzene, 1,1-bis(t-butylperoxy)-3,3,5-trimethylcyclohexane, n-butyl-4,4-bis(t-butylperoxy)valerate, benzoyl peroxide, p-chlorobenzoyl peroxide, 2,4-dichlorobenzoyl peroxide, t-butylperoxybenzoate, t-butylperbenzoate, t-butylperoxyisopropyl carbonate, diacetyl peroxide, lauroyl peroxide and t-butylcumyl peroxide. Of these, 2,5-dimethyl-2,5-di(t-butylperoxy)hexane, 2,5-dimethyl-2,5-di(t-butylperoxy)hexyne-3,1,3-bis(t-butylperoxyisopropyl)benzene, 1,1-bis(t-butylperoxy)-3,3,5-trimethylcyclohexane and n-butyl-4,4-bis(t-butylperoxy)valerate are preferable, and 2,5-dimethyl-2,5-di(t-butylperoxy)hexane, 2,5-dimethyl-2,5-di(t-butylperoxy)hexyne-3 and 1,3-bis(t-butylperoxyisopropyl)benzene are particularly preferable, from the viewpoints of odor and scorch stability.

When crosslinking is carried out using an organic peroxide, crosslinking aids, such as sulfur, p-quinonedioxime, p,p'-dibenzoyl quinonedioxime, N-methyl-N,4-dinitrosoaniline, nitrobenzene, diphenylguanidine and trimethylolpropane-N,N'-m-phenylene dimaleimide, polyfunctional methacrylate monomers, such as divinylbenzene, triallyl cyanurate, ethylene glycol dimethacrylate, diethylene glycol dimethacrylate, polyethylene glycol dimethacrylate, trimethylolpropane trimethacrylate and allyl methacrylate, and polyfunctional vinyl monomers, such as vinyl butyrate and vinyl stearate, can be contained. When such a compound is contained, uniform and mild crosslinking reaction can be expected.

The compound, such as the above-mentioned crosslinking aid or polyfunctional vinyl monomer, is used usually in an amount of not more than 5 parts by weight, preferably 0.3 to 3 parts by weight, based on 100 parts by weight of the copolymer or the composition.

In order to accelerate decomposition of the organic peroxide, decomposition accelerators, e.g., tertiary amines, such as triethylamine, tributylamine and 2,4,6-tri(dimethylamino)phenol, and naphthenic acid salts of aluminum, cobalt, vanadium, copper, calcium, zirconium, manganese, magnesium, lead, mercury, etc. may be used.

Examples of the sulfur compounds include low-molecular disulfide compounds, such as morpholine disulfide, alkylphenol disulfide, tetramethylthiuram disulfide, tetraethylthiuram disulfide, tetrabutylthiuram disulfide, dipentamethylenethiuram disulfide, N,N'-dimethyl-N,N'-diphenylthiuram disulfide, N,N'-diethyl-N,N'-diphenylthiuram disulfide and dibenzothiazyl disulfide.

The molecular structure of the silane compound (SiH group-containing compound or hydrosilyl group-containing compound) is not specifically restricted provided that the silane compound contains hydrogen atoms directly bonded to two or more silicon atoms, preferably three or more silicon atoms, namely, SiH groups, and any of silane compounds hitherto prepared, such as a resin-like substance of a linear, cyclic or branched structure, or a three-dimensional network structure, can be used.

The silane compound is used usually in an amount of 0.1 to 100 parts by weight, preferably 0.1 to 75 parts by weight, more preferably 0.1 to 50 parts by weight, still more preferably 0.2 to 30 parts by weight, particularly preferably 0.2 to 20 parts by weight, based on 100 parts by weight of the copolymer or the composition. When the amount of the silane compound is in the above range, a rubber composition capable of forming a crosslinked rubber molded product not only showing excellent compression set resistance but also having proper crosslink density, excellent strength properties and excellent elongation properties can be obtained. Use of the silane compound in an amount exceeding 100 parts by weight is undesirable because of disadvantageous cost.

As specific examples of the silane compounds, the paragraphs [0073] to [0116] of Japanese Patent Laid-Open Publication No. 2003-128851 can be referred to.

Examples of the phenol-based vulcanizers include phenol resin, alkylphenol formaldehyde resin, triazine-formaldehyde resin, and melamine-formaldehyde resin.

(Release Agent)

Examples of the release agents include fatty acid amide, silicon oil, glycerol and wax. The amount of the release agent added is usually 0.1 to 0.5 part by weight based on 100 parts by weight of the copolymer or the composition.

[Graft Modified Product]

In the present invention, at least a part or all of the propylene-based copolymer and the crystalline olefin resin may have been graft modified with a polar monomer.

For example, a part or all of the copolymer (A) may have been graft modified, or a part or all of the resin (B) may have been graft modified, or a part or all of each of the copolymer (A) and the resin (B) may have been graft modified.

Examples of such polar monomers include a hydroxyl group-containing ethylenically unsaturated compound, an amino group-containing ethylenically unsaturated compound, an epoxy group-containing ethylenically unsaturated compound, an aromatic vinyl compound, an unsaturated carboxylic acid or its derivative, a vinyl ester compound, vinyl chloride and a carbodiimide compound. In particular, an unsaturated carboxylic acid or its derivative is preferable. Examples of the unsaturated carboxylic acids or their derivatives include an unsaturated compound having one or more carboxylic acid groups, an ester of a compound having a carboxylic acid group and an alkyl alcohol, and an unsaturated compound having one or more carboxylic anhydride groups. Examples of the unsaturated groups include vinyl group, vinylene group and unsaturated cyclic hydrocarbon group.

Specific examples thereof include unsaturated carboxylic acids, such as acrylic acid, maleic acid, fumaric acid, tetrahydrophthalic acid, itaconic acid, citraconic acid, crotonic acid, isocrotonic acid and Nadic acid [trademark] (endocis-bicyclo[2.2.1]hept-5-ene-2,3-dicarboxylic acid), and their derivatives, such as acid halide, amide, imide, anhydride and ester. Specific examples of the derivatives include malenyl chloride, maleimide, maleic anhydride, citraconic anhydride, monomethyl maleate, dimethyl maleate and glycidyl maleate.

These unsaturated carboxylic acids and/or their derivatives can be used singly, or can be used in combination of two or more kinds. Of these, unsaturated dicarboxylic acids or acid anhydrides thereof are preferable, and in particular, maleic acid, Nadic acid or acid anhydrides thereof are preferably used.

Modification is carried out by graft polymerizing the polar monomer onto the modification target. In the graft polymerization of such a polar monomer as above onto the modification target, the polar monomer is used usually in an amount of 1 to 100 parts by weight, preferably 5 to 80 parts by weight, based on 100 parts by weight of the modification target. The graft polymerization is carried out usually in the presence of a radical initiator.

As the radical initiator, an organic peroxide, an azo compound or the like can be used.

Although the radical initiator can be used by mixing it as it is with the modification target and the polar monomer, it can be also used after dissolved in a small amount of an organic solvent. As the organic solvent, an organic solvent capable of dissolving the radical initiator can be used without specific limitation.

In the graft polymerization of the polar monomer onto the modification target, a reducing substance may be used. When the reducing substance is used, the degree of grafting of the polar monomer can be enhanced.

The graft modification of the modification target with the polar monomer can be carried out by a method hitherto publicly known, and for example, the graft modification can be carried out by dissolving the modification target in an organic solvent, then adding a polar monomer, a radical initiator, etc. to the solution and performing reaction usually at 70 to 200° C., preferably 80 to 190° C., usually for 0.5 to 15 hours, preferably 1 to 10 hours.

By allowing the modification target to react with the polar monomer using an extruder or the like, a polymer composition containing a modified product can be also prepared. This reaction is carried out usually at a temperature of not lower than the melting point of the modification target, and specifically, when the resin (B) is modified, the reaction is desirably carried out usually at a temperature of 120 to 300° C., preferably 120 to 250° C., usually for 0.5 to 10 minutes. When the copolymer (A) is modified, the reaction is desirably carried out usually at a temperature of 160 to 300° C., preferably 180 to 250° C., usually for 0.5 to 10 minutes.

The degree of modification (degree of grafting of the polar monomer) of the modified product obtained as above is usually 0.1 to 50% by weight, preferably 0.2 to 30% by weight, more preferably 0.2 to 10% by weight, based on 100% by weight of the modified product.

In the present invention, the copolymer composition can be also obtained by kneading the modified product with at least one unmodified substance selected from the copolymer (A) and the resin (B).

Although the content of the polar monomer is not specifically restricted, it is preferably 0.001 to 50% by weight, more preferably 0.001 to 10% by weight, still more preferably 0.001 to 5% by weight, most preferably 0.01 to 3% by weight, based on 100% by weight of the copolymer composition. The content of the polar monomer can be readily designed by, for example, properly selecting the grafting conditions according to the purpose.

When the modified product is used, the copolymer composition sometimes becomes excellent in adhesion to other resins and compatibility with them, and besides, wettability of the surface of the resulting molded product is sometimes improved.

By the use of the modified product, compatibility with other materials or adhesion to them can be sometimes imparted to the copolymer composition.

Since the content of the polar monomer, such as unsaturated carboxylic acid and/or its derivative, is in the above range, the copolymer or the composition of the present invention exhibits high adhesive strength to polar group-containing resins (e.g., polyester, polyvinyl alcohol, ethylene/vinyl alcohol copolymer, polyamide, PMMA and polycarbonate).

In the present invention, other polymers, such as thermoplastic resins or elastomers, can be properly added within limits not detrimental to the properties of the modified product. The addition of them may be carried out during the graft modification or after the modification.

In the present invention, it is also possible to properly add publicly known processing stabilizer, heat stabilizer, thermal aging resisting agent, filler, (pressure-sensitive) adhesive, etc. within limits not detrimental to the properties of the modified product. Examples of these additives include the aforesaid other components.

[Preparation Process for Propylene-Based Copolymer Composition]

The propylene-based copolymer composition of the present invention can be prepared by adopting an arbitrary process publicly known, and for example, the composition can be prepared by adopting a process comprising mixing the propylene-based copolymer, the crystalline olefin resin, and other components and a modified product that are added if desired, using publicly known various means, such as Henschel mixer, V-blender, ribbon blender and tumbler blender, or a process comprising mixing them, melt kneading the mixture by a single screw extruder, a twin-screw extruder, a kneader, a Banbury mixer, a roll or the like and then granulating or pulverizing the kneadate.

For preparing the propylene-based copolymer of the present invention, a process similar to the above process can be properly adopted.

<Propylene-Based Copolymer Composition (Y)>

The propylene-based copolymer composition (Y) of the present invention (also described as a "composition (Y)" hereinafter) is obtained from the propylene-based copolymer (A) of the present invention (also described as a "copolymer (A)" hereinafter), an ethylene-based copolymer (C) having an ethylene content of more than 50% by mol (also described as a "copolymer (C)" hereinafter) and a crystalline propylene-based polymer (D) (also described as a "polymer D" hereinafter), and is obtained through a step of dynamically heat-treating at least the copolymer (C) in the presence of a crosslinking agent (E).

It is preferable to carry out the dynamic heat treatment of the copolymer (C) in the presence of the crystalline propylene-based polymer (D).

It is thought that when the step of dynamic heat treatment is carried out using, for example, the copolymer (A), the copolymer (C), the copolymer (D) and the crosslinking agent (E), an ethylene-based copolymer wherein at least a part of the ethylene-based copolymer (C) has been crosslinked or a propylene-based copolymer wherein at least a part of the propylene-based copolymer (A) has been crosslinked is formed.

(Ethylene-Based Copolymer (C) Having Ethylene Content of More than 50% by Mol)

The ethylene content in the copolymer (C) is more than 50% by mol, preferably not less than 55% by mol, more preferably not less than 60% by mol.

The intrinsic viscosity [η] of the copolymer (C), as measured in decalin (decahydronaphthalene) at 135° C., is usually 0.8 to 6.0 dl/g, preferably 1.0 to 5.0 dl/g, more preferably 1.1 to 4.0 dl/g.

The copolymer (C) is preferably at least one olefin-based rubber selected from an ethylene/α-olefin/non-conjugated polyene copolymer rubber (c1) (also described as a "copolymer rubber (c1)" hereinafter) obtained from more than 50% by mol of ethylene, an α-olefin of 3 to 20 carbon atoms and a non-conjugated polyene and an ethylene/α-olefin copolymer rubber (c2) obtained from more than 50% by mol of ethylene and an α-olefin of 3 to 20 carbon atoms, or an olefin-based rubber wherein at least a part of the above olefin-based rubber has been crosslinked. In these copolymer rubbers, the number of carbon atoms of the α-olefin is preferably 3 to 20, more preferably 3 to 10. Specific examples of the α-olefins include propylene, 1-butene, 4-methyl-1-pentene, 1-hexene and 1-octene. The α-olefins may be used singly, or may be used in combination of two or more kinds. Of these, propylene, 1-butene and 1-octene are preferable. As the non-conjugated polyene, a cyclic or chain non-conjugated polyene is used. Examples of the cyclic non-conjugated polyenes include 5-ethylidene-2-norbornene, dicyclopentadiene, 5-vinyl-2-norbornene, norbornadiene and methyltetrahydroindene. Examples of the chain non-conjugated polyenes include 1,4-hexadiene, 7-methyl-1,6-octadiene, 8-methyl-4-ethylidene-1,7-nonadiene and 4-ethylidene-1,7-undecadiene. The non-conjugated polyenes may be used singly, or may be used in combination of two or more kinds. Of these, 5-ethylidene-2-norbornene, dicyclopentadiene and 5-vinyl-2-norbornene are preferable, and 5-ethylidene-2-norbornene is more preferable.

Of the copolymer rubbers, preferable is an ethylene/α-olefin/non-conjugated polyene copolymer rubber, more preferable is an ethylene/propylene/non-conjugated polyene copolymer rubber, and still more preferable is an ethylene/propylene/ethylidene norbornene copolymer, because a foamed product having a proper crosslinked structure is obtained.

Above all, the copolymer rubber (c1) is preferable, and an ethylene/propylene/non-conjugated polyene copolymer rubber is more preferable, because a foamed product having a proper crosslinked structure is obtained. Here, the non-conjugated polyene is preferably, for example, 5-ethyliene-2-norbornene or 5-vinyl-2-norbornene. In particular, an ethylene/propylene/ethylidene norbornene copolymer rubber is preferable. The copolymers (C) can be used singly or in combination of two or more kinds.

In the ethylene/α-olefin/non-conjugated polyene copolymer rubber, the degree of copolymerization of the non-conjugated polyene is preferably 3 to 50, more preferably 5 to 45, particularly preferably 8 to 40, in terms of an iodine value. In order to optimize the value of effective network chain concentration ν to thereby improve compression set, the iodine value is desirably more than 10.

That the olefin-based rubber has been crosslinked can be confirmed by the measurement of a gel content. Actually, by dissolving the rubber in paraxylene at 140° C. for 24 hours and measuring a gel fraction through fractionation using a #350 mesh, it can be seen that the olefin-based rubber has been crosslinked in a proportion of 70 to 100%, though it depends upon the degree of crosslinking.

A specific method to measure a gel content is described below.

[Measurement of Gel Content]

About 100 mg of a sample of a composition is weighed, then the sample is cut into small chips of 0.5 mm×0.5 mm×0.5 mm, and subsequently, the resulting small chips are immersed in 30 ml of cyclohexane in a closed container at 23° C. for 48 hours.

Next, the sample is taken out on a filter paper and dried at room temperature for not shorter than 72 hours until a constant weight is reached. From the weight of the dry residue, the weight of cyclohexane-insoluble components (fibrous filler, filler, pigment, etc.) other than polymer components is subtracted, and the resulting value is taken as a "corrected final weight (Y)".

On the other hand, from the weight of the sample, the weight of cyclohexane-soluble components (e.g., softener) other than polymer components and the weight of cyclohexane-insoluble components (fibrous filler, filler, pigment, etc.) other than polymer components are subtracted, and the resulting value is taken as a "corrected initial weight (X)". The gel content (cyclohexane-insoluble components) is determined by the following formula.

Gel content[% by weight]=[corrected final weight($Y$)/corrected initial weight($X$)]×100

When at least a part of the copolymer (C) has been crosslinked in the present invention, the gel content determined as above becomes usually 70 to 100%, though it depends upon the degree of crosslinking. Thus, the copolymer (C) is thought to have been crosslinked in a proportion of 70 to 100%.

The copolymer (C) can be prepared by, for example, a hitherto publicly known process described in "Porima Seizou Purosesu (Polymer production process)" (published by Kogyo Chosakai Publishing Co., Ltd.), pp. 309-330, or the like.

(Crystalline Propylene-Based Polymer (D))

The polymer (D) is an olefin-based resin having properties that by mixing the polymer with an organic peroxide and kneading the mixture under heating, the polymer is decomposed to increase fluidity, and is also referred to as an "organic peroxide non-crosslinking type olefin-based polymer". It is thought that when the polymer is subjected to thermal reaction with an organic peroxide, decomposition reaction and crosslinking reaction occur, but as a result of predominance of the decomposition reaction, the apparent molecular weight of the polymer is decreased in the dynamically heat-treated product. In the present invention, the polymer (D) is different from the crystalline olefin resin (B), but the crystalline olefin resin (B) may be used as the polymer (D) as far as the effects of the present invention are exerted.

Examples of the polymers (D) include a propylene homopolymer, a propylene-based copolymer and an ethylene-based copolymer. The polymers (D) may be used singly, or may be used in combination of two or more kinds. Of these, a propylene homopolymer or a propylene-based copolymer is preferably used.

The propylene-based copolymer preferably contains 50 to 99% by mass of constituent units derived from propylene and 50 to 1% by mass of constituent units derived from ethylene and an α-olefin of 4 to 20 carbon atoms. This copolymer may be a random copolymer or may be a block copolymer.

The number of carbon atoms of the α-olefin used for the propylene-based copolymer is preferably 4 to 20, more preferably 4 to 10. Specific examples of the α-olefins include 1-butene, 4-methyl-1-pentene, 1-hexene and 1-octene. The α-olefins may be used singly, or may be used in combination of two or more kinds. Of these, ethylene, 1-butene or 1-octene is preferable as a monomer copolymerized with propylene.

The ethylene-based copolymer preferably contains more than 50% by mass but not more than 99% by mass of constituent units derived from ethylene and less than 50% by mass but not less than 1% by mass of constituent units derived from an α-olefin of 3 to 20 carbon atoms. This copolymer may be a random copolymer or may be a block copolymer.

The number of carbon atoms of the α-olefin used for the ethylene-based copolymer is preferably 3 to 20, more preferably 3 to 10. Specific examples of the α-olefins include propylene, 1-butene, 4-methyl-1-pentene, 1-hexene and 1-octene. The α-olefins may be used singly, or may be used in combination of two or more kinds. Of these, propylene, 1-butene or 1-octene is preferable.

It is desirable that the melt flow rate (ASTM D-1238-65T, 230° C., load of 2.16 kg) of the polymer (D) is preferably in the range of 0.05 to 80 g/10 min, more preferably 0.1 to 20 g/10 min.

Such a propylene homopolymer, a propylene-based copolymer and an ethylene-based copolymer as above are prepared by processes hitherto publicly known.

Although the amount of a component derived from the polymer (D) in the composition (Y) is not specifically restricted, it is preferably 1 to 200 parts by weight, more preferably 10 to 200 parts by weight, still more preferably 10 to 100 parts by weight, much more preferably 20 to 100 parts by weight, particularly preferably 20 to 95 parts by weight, based on 100 parts by weight of the total amount of the components derived from the copolymer (C). In the composition (Y), the component derived from the polymer (D) may be composed of only the polymer (D) used in the step of dynamic heat treatment of the copolymer (C), or may further contain the polymer (D) added in the later step, as described later.

(About Propylene-Based Copolymer (A) in the Composition (Y))

In the composition (Y), the component derived from the copolymer (A) may be present in any of the sea phase and the island phase of the composition, and has a function to improve melt tension of the composition.

The non-conjugated polyene in the copolymer (A) is preferably, for example, 5-ethylidene-2-norbornene or 5-vinyl-2-norbornene.

Although the amount of the component derived from the copolymer (A) in the composition (Y) is not specifically restricted, it is preferably 1 to 50 parts by weight, more preferably 3 to 30 parts by weight, based on 100 parts by weight of the total amount of the components derived from the copolymer (C).

(Crosslinking Agent (E))

As the crosslinking agent, an organic peroxide is specifically used.

Examples of the organic peroxides include dicumyl organic peroxide, di-tert-butyl organic peroxide, 2,5-dimethyl-2,5-di(tert-butylperoxy)hexane, 2,5-dimethyl-2,5-di(tert-butylperoxy)hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl organic peroxide, p-chlorobenzoyl peroxide, 2,4-dichlorobenzoyl organic peroxide, tert-butylperoxy benzoate, tert-butyl perbenzoate, tert-butyl peroxyisopropyl carbonate, diacetyl organic peroxide, lauroyl organic peroxide and tert-butylcumyl organic peroxide. The organic peroxides may be used singly, or may be used in combination of two or more kinds.

Of these, 2,5-dimethyl-2,5-di(tert-butylperoxy)hexane, 2,5-dimethyl-2,5-di(tert-butylperoxy)hexyne-3,1,3-bis(tert-butylperoxyisopropyl)benzene, 1,1-bis(tert-butylperoxy)-3,3,5-trimethylcyclohexane and n-butyl-4,4-bis(tert-butylperoxy)valerate are more preferably used, and 1,3-bis(t-butylperoxyisopropyl)benzene is still more preferably used, from the viewpoints of odor and scorch stability.

In the present invention, the organic peroxide is used preferably in an amount of 0.05 to 10 parts by weight based on 100 parts by weight of the copolymer (C) used for the dynamic heat treatment.

In the crosslinking treatment using the above organic peroxide in the present invention, there can be added, as crosslinking aids, peroxy crosslinking aids, such as sulfur, p-quinonedioxime, p,p'-dibenzoyl quinonedioxime, N-methyl-N-4-dinitrosoaniline, nitrosobenzene, diphenylguanidine and trimethylolpropane-N,N'-m-phenylene dimaleimide, polyfunctional methacrylate monomers, such as divinylbenzene, triallyl cyanurate, ethylene glycol dimethacrylate, diethylene glycol dimethacrylate, polyethylene glycol dimethacrylate, trimethylolpropane trimethacrylate and allyl methacrylate, and polyfunctional vinyl monomers, such as vinyl butyrate and vinyl stearate. The crosslinking aids may be used singly, or may be used in combination of two or more kinds.

By the use of such a compound as above, uniform and mild crosslinking reaction can be expected. In particular, divinylbenzene is preferably used in the present invention. Divinylbenzene has ease of handling, has good compatibility with the copolymer (C) and the polymer (D), has a function to solubilize the organic peroxide, and acts as a dispersing agent for the organic peroxide. On this account, uniform crosslinking effects are obtained, and a dynamically heat-treated product that is well balanced between fluidity and properties is obtained.

The crosslinking aid is used preferably in an amount of 0.05 to 10 parts by weight based on 100 parts by weight of the copolymer (C) used for the dynamic heat treatment. When the amount of the crosslinking aid is in the above range, a foamed product having small compression set and good molding properties is finally obtained.

(Softener (F))

The composition (Y) may further contain a softener (F). Although the amount of the softener is not specifically restricted, it is preferably 1 to 200 parts by weight based on 100 parts by weight of the total amount of the component derived from the copolymer (A), the component derived from the copolymer (C) and the component derived from the polymer (D) in the composition (Y). The softener not only facilitates processing in the preparation of the composition but also helps dispersing of carbon black or the like. The softener may be present in any of the island phase and the sea phase.

Examples of the softeners (F) include mineral oil-based softeners, such as process oil, lubricating oil, paraffin, liquid paraffin, petroleum asphalt and vaseline, coal tar-based softeners, such as coal tar and coal tar pitch, fatty oil-based softeners, such as castor oil, rapeseed oil, soybean oil and coconut oil, waxes, such as tall oil, bees wax, carnauba wax and lanoline, fatty acids or metal salts thereof, such as ricinolic acid, palmitic acid, stearic acid, barium stearate and calcium stearate, naphthenic acid or its metallic soap, pine oil, rosin or its derivative, synthetic high-molecular substances, such as terpene resin, petroleum resin, coumarone indene resin and atactic polypropylene, ester-based softeners, such as dioctyl phthalate, dioctyl adipate and dioctyl sebacate, carbonate ester softeners, such as diisododecyl carbonate, and other softeners, such as microcrystalline wax, rubber substitute (factice), liquid polybutadiene, modified liquid polybutadiene, liquid thiocol and hydrocarbon-based synthetic lubricating oil. The softeners (F) may be used singly, or may be used in combination of two or more kinds. Of these, petroleum-based softeners and hydrocarbon-based synthetic lubricating oil are preferable.

The softener (F) may be contained in the copolymers (A) and (C) having been oil-extended in advance.

(Fluorine-Based Resin (G))

The composition (Y) may further contain a fluorine-based resin (G) (also described as a "resin (G)" hereinafter). Although the amount of the fluorine-based resin (G) is not specifically restricted, it is preferably 0.05 to 20 parts by weight based on 100 parts by weight of the total amount of the component derived from the copolymer (A), the component derived from the copolymer (C) and the component derived from the polymer (D) in the composition (Y). The resin (G) is used for increasing melt tension of the composition when a foamed product is produced from the composition. The resin (G) is usually present in the sea phase.

(Other Resins)

The composition (Y) may further contain the aforesaid other resins, other than the copolymer (A) of the present invention, the copolymer (C) and the polymer (D), within limits not detrimental to the object of the present invention. When other resins are contained, the amount of the other resins is usually more than 0 part by weight but not more than 50 parts by weight based on 100 parts by weight of the total amount of the component derived from the copolymer (A) and the component derived from the copolymer (C) in the composition (Y). Such a resin (rubber) may be present in any of the island phase and the sea phase.

(Additives)

The composition (Y) may contain publicly known additives, such as filler, heat stabilizer, anti-aging agent, weathering stabilizer, antistatic agent, metallic soap, lubricant (e.g., wax), pigment, dye, nucleating agent, flame retardant, antiblocking agent and antioxidant, within limits not detrimental to the object of the present invention. These additives may be used singly or in combination of two or more kinds, and can be properly selected.

When the filler is contained, the amount of the filler is not specifically restricted, but it is usually more than 0 part by weight but not more than 120 parts by weight, preferably 2 to 100 parts by weight, based on 100 parts by weight of the total amount of the component derived from the copolymer (A), the component derived from the copolymer (C) and the component derived from the polymer (D) in the composition (Y).

When the antioxidant is contained, the amount of the antioxidant is not specifically restricted, but it is usually 0.01 to 10 parts by weight based on 100 parts by weight of the total amount of the component derived from the copolymer (A), the component derived from the copolymer (C) and the component derived from the polymer (D) in the composition (Y). The additives may be present in any of the island phase and the sea phase.

<Preparation Process for Propylene-Based Copolymer Composition (Y)>

The composition (Y) is obtained through the below-described step [I] and is preferably obtained through the step [I-a] or [I-b].

[Step [I]]

In the step [I], the copolymer (A), the copolymer (C) and the polymer (D) are used, and at least the copolymer (C) is dynamically heat-treated in the presence of the crosslinking agent (E). It is preferable to carry out the dynamic heat treatment in the presence of the polymer (D). It is thought that by carrying out the dynamic heat treatment, at least a part of the copolymer (C) is crosslinked. In this case, a sea-island structure wherein the component derived from the copolymer (C) has become an island phase and the component derived from the polymer (D) has become a sea phase is formed.

(Step [I-a])

The composition (Y) of the present invention is preferably obtained through a step [I-a] of dynamically heat treating the copolymer (A), the copolymer (C) and the polymer (D) in the presence of the crosslinking agent (E). It is thought that in this case, at least apart of the copolymer (A) is crosslinked. It is thought that at least a part of the copolymer (C) is also crosslinked. It is thought that in this case, the composition (Y) takes a sea-island structure wherein the component derived from the copolymer (C) has become an island phase and the component derived from the polymer (D) has become a sea phase. The component derived from the copolymer (A) may be present in any of the sea phase and the island phase. A part of the copolymer (A) may be co-crosslinked together with the copolymer (C), and it is thought that this contributes to the interaction at the interface between the sea phase and the island phase.

(Step [I-b])

The composition (Y) of the present invention can be also obtained by adding the copolymer (A) to a dynamically heat-treated product obtained in the step [I-b] of dynamically heat-treating the copolymer (C), the polymer (D) and the crosslinking agent (E). The step of adding the copolymer (A) may be carried out simultaneously with the later-described step [II].

The copolymers (A) and (C) are each an olefin-based resin rubber having properties that by mixing the rubber with an organic peroxide and kneading the mixture under heating, the rubber is crosslinked to lower fluidity or lose fluidity, and is also referred to as an "organic peroxide crosslinking type olefin-based copolymer". It is thought that when the copolymers (A) and (C) are subjected to thermal reaction with an organic peroxide, decomposition reaction and crosslinking reaction occur, but as a result of predominance of crosslinking reaction, the apparent molecular weight of the copolymers (A) and (C) is increased in the dynamically heat-treated product.

The step [I] is specifically described below.

In the step [I], it is preferable to dynamically heat treating the copolymer (C) and the polymer (D) in the presence of the crosslinking agent (E) and if necessary a crosslinking aid.

The composition (Y) is particularly preferably a composition obtained through the step [I-a].

The above dynamic heat treatment means kneading of the above components in a molten state. The dynamic heat treatment is carried out using a kneading apparatus, such as an open type mixing roll, a non-open type Banbury mixer, a kneader, a single screw or twin-screw extruder or a continuous mixer, but it is preferably carried out in a non-open type kneading apparatus. The dynamic heat treatment is preferably carried out in an atmosphere of an inert gas such as nitrogen or carbonic acid gas.

Kneading is desirably carried out at a temperature at which the half-life of the organic peroxide used becomes less than one minute. The kneading temperature is usually 150 to 280° C., preferably 170 to 240° C., and the kneading time is usually 1 to 20 minutes, preferably 1 to 5 minutes.

The above dynamic heat treatment may be carried out by adding the softener (F). The softener (F) can be generally used as an additive for softening the material, and by blending it with the copolymer in advance, the softening effect is increased. Further, shear applied to the material in the extruder can be reduced to facilitate kneading, and besides, the softener sometimes helps dispersing of other additives. On the other hand, when the copolymer is subjected to roll processing, the softener weakens intermolecular force of the rubber to facilitate processing, and besides, the softener helps dispersing of carbon block or the like. In this stage, the softener is preferably used in such an amount that the total amount of the softener and softeners used in other stages becomes 1 to 200 parts by weight based on 100 parts by weight of the total amount of the component derived from the copolymer (A), the component derived from the copolymer (C) and the component derived from the polymer (D), as previously described.

The above dynamic heat treatment may be carried out by further adding a rubber other than the copolymer (C) within limits not detrimental to the object of the present invention. Examples of such rubbers include diene-based rubbers, such as styrene-butadiene rubber (SBR), nitrile rubber (NBR) and natural rubber (NR), and silicon rubber. As the rubber, polyisobutylene, butyl rubber, a propylene/ethylene copolymer rubber or a propylene/1-butene copolymer rubber having a propylene content of not less than 70% by mol, or the like may be used. Such rubbers may be used singly, or may be used in combination of two or more kinds. Of these, a propylene/ethylene copolymer rubber, polyisobutylene, butyl rubber or silicon rubber is preferable from the viewpoints of performance and handling. Such a rubber preferably has a Mooney viscosity [ML (1+4100°) C.] of not more than 60 from the viewpoint of improvement in fluidity of the composition. This rubber is preferably used so that the aforesaid amount of the rubber may be contained in the finally obtained composition. For example, the rubber is preferably added in an amount of more than 0 part by weight but not more than 50 parts by weight based on 100 parts by weight of the copolymer (C).

The dynamic heat treatment may be carried out by further adding publicly known additives, such as filler, heat stabilizer, anti-aging agent, weathering stabilizer, antistatic agent, metallic soap, lubricant (e.g., wax), pigment, dye, nucleating agent, flame retardant, anti-blocking agent and antioxidant, within limits not detrimental to the object of the present invention.

As the filler, a filler usually used for rubbers is preferable, and specific examples thereof include carbon black, calcium carbonate, calcium silicate, clay, kaolin, talc, silica, diatomaceous earth, mica powder, asbestos, barium sulfate, aluminum sulfate, calcium sulfate, magnesium carbonate, molybdenum disulfide, glass fiber, glass bead, Shirasu balloon, graphite and alumina. The fillers may be used singly, or may be used in combination of two or more kinds. Of these, carbon black is preferably used when a black foamed product is intended to be produced from the composition.

Examples of the heat stabilizers, the anti-aging agents, the weathering stabilizers and the antioxidants include phenol-based, sulfite-based, phenylalkane-based, phosphite-based and amine-based stabilizers.

It is thought that by the dynamic heat treatment of the step (I), the copolymer (C) becomes, for example, a copolymer at least a part of which has been crosslinked. Through the step, a dynamically heat-treated product containing the component derived from the copolymer (C) and the component derived from the polymer (D) and usually having a sea-island structure is prepared. It is presumed that in the component derived from the copolymer (C), at least a part of molecules of the olefin-based rubber are crosslinked with molecules of another olefin-based rubber or are crosslinked in molecules of another olefin-based rubber by the dynamic heat treatment.

The dynamically heat-treated product has, for example, a sea-island structure comprising a sea phase and an island phase, and the island phase containing the component derived from the copolymer (C) is usually dispersed in the sea phase containing the component derived from the polymer (D). Specifically, it is thought that, of the copolymer (C), a crosslinked particle portion formed by crosslinking is usually present mainly in the island phase, and the polymer (D) is dispersed mainly in the sea phase. The sea-island structure can be confirmed by subjecting a slice of a pellet obtained from the dynamically heat-treated product to dyeing treatment with a heavy metal such as ruthenium and observing it by an electron microscope such as a transmission electron microscope.

After the dynamically heat-treated product obtained in the step [I] is taken out of the kneading apparatus, it may be molded into a molded product such as pellet.

[Step [II]]

The step [II] is a step that is carried out when needed, and the dynamically heat-treated product having a sea-island structure obtained in the step [I] and if necessary additional components are kneaded similarly to the step [I].

As an additional polymer, a polymer (D) can be mentioned. As the polymer (D) for use in this step, the same polymer as in the step [I] is used, and the preferred range is also the same. In the polymer (D) added in the step [I], molecules decomposed by the dynamic heat treatment are sometimes contained. If the decomposed molecules are also contained as above, melt tension of the composition is usually lowered. However, when the polymer (D) is added also in the step [II], the melt tension of the composition can be adjusted to the preferred range. The step of adding the polymer (D) is sometimes particularly referred to as a "step [II-D]".

The polymer (D) may be used in the step [I] only, or may be used in both of the step [I] and the step [II], as described above. In either case, it is enough just to use the polymer (D) so that the aforesaid amount of the polymer (D) may be contained in the finally obtained composition (Y). For example, in the case where preparation of the composition (Y) is completed by the step [I] only, the polymer (D) is used preferably in an amount of 1 to 200 parts by weight, more preferably 10 to 200 parts by weight, still more preferably 10 to 100 parts by weight, particularly preferably 20 to 100 parts by weight, and may be used in an amount of 20 to 95 parts by weight, based on 100 parts by weight of the copolymer (C) used in the step [I]. In the case where the polymer (D) is used in both of the step [I] and the step [II], the total amount of the polymers (D) in the steps [I] and [II] is 1 to 200 parts by weight, preferably 10 to 200 parts by weight, more preferably 10 to 100 parts by weight, particularly preferably 20 to 100 parts by weight, and may be 20 to 95 parts by weight, based on 100 parts by weight of the copolymer (C) (i.e., component derived from the copolymer (C)) used in the step [I].

The weight ratio of the polymer (D) used in the step [I] to the polymer (D) used in the step [II] is not specifically restricted, but when the step [II-D] is carried out, the ratio of the polymer (D) used in the step [I]/the polymer (D) used in the step [II] is, for example, 99/1 to 1/99.

In the step [II], the dynamically heat-treated product obtained in the step [I] and if necessary the polymer (D) are kneaded (preferably melt kneaded).

The kneading is carried out using a kneading apparatus, such as an open type mixing roll, a non-open type Banbury mixer, a kneader, a single screw or twin-screw extruder or a continuous mixer, but it is preferably carried out in a non-open type kneading apparatus.

When the twin-screw extruder is used, the kneading temperature is usually 50 to 300° C., and the kneading time is usually 1 to 20 minutes.

The above kneading treatment may be carried out by further adding a softener (F). When the rubber is subjected to roll processing, the softener (F) weakens intermolecular force of the rubber to facilitate processing, and besides, the softener helps dispersing of carbon block or the like. As the softener (F), the same softener as in the step [I] is used, and the preferred range is also the same.

The softener (F) may be used in the step [I] only or the step [II] only, or may be used in both of the step [I] and the step [II], as previously described. In either case, it is enough just to use the softener (F) so that the aforesaid amount of the softener (F) may be contained in the finally obtained composition. For example, when the softener (F) is used in the step [I] only or the step [II] only, the softener (F) is preferably added so that the amount of the softener (F) in the step [I] or the step [II] may become 1 to 200 parts by weight based on 100 parts by weight of the total amount of the copolymer (A), the copolymer (C) and the polymer (D) used in the steps [I] and [II]. When the softener (F) is used in both of the step [I] and the step [II], the softener (F) is preferably added so that the total amount of the softeners (F) in the steps [I] and [II] may become 1 to 200 parts by weight based on 100 parts by weight of total amount of the copolymer (A), the copolymer (C) and the polymer (D) used in the step [I] and the step [II].

When the step [II] is carried out, the weight ratio of the softener (F) used in the step [I] to the softener (F) used in the step [II] is not specifically restricted, but the ratio of the softener (F) used in the step [I]/the softener (F) used in the step [II] is, for example, 99/1 to 1/99.

The above kneading treatment may be carried out by further adding a fluorine-based resin (G). When the resin (G) is used, melt tension of the composition is increased and breakage of foamed cells can be inhibited in the production of a foamed product from the composition. As the resin (G), polytetrafluoroethylene is preferably used.

It is enough just to use the resin (G) so that the aforesaid amount of the resin (G) may be contained in the finally obtained composition. For example, the resin (G) is preferably added in an amount of not less than 0.05 part by weight but not more than 20 parts by weight based on 100 parts by weight of the total amount of the copolymer (A), the copolymer (C) and the polymer (D) used in the steps [I] and [II].

Further, the above kneading treatment may be carried out by further adding publicly known additives, such as filler, heat stabilizer, anti-aging agent, weathering stabilizer, antistatic agent, metallic soap, lubricant (e.g., wax), pigment, dye, nucleating agent, flame retardant, anti-blocking agent and antioxidant, within limits not detrimental to the object of the present invention. As the additives, the same additives as in the step [I] are used, and the preferred ranges are also the same. Carbon black as the filler is preferably used in the step [II] rather than in the step [I].

The filler may be used in the step [I] only or the step [II] only, or may be used in both of the step [I] and the step [II], as previously described. In either case, it is enough just to use the filler so that the aforesaid amount of the filler may be contained in the finally obtained composition. For example, when the filler is used in the step [I] only or the step [II] only, the filler is preferably added so that the amount of the filler in the step [I] or the step [II] may become more than 0 part by weight but not more than 120 parts by weight based on 100 parts by weight of the total amount of the copolymer (A), the copolymer (C) and the polymer (D) used in the steps [I] and [II]. When the filler is used in both of the step [I] and the step [II], the filler is preferably added so that the total amount of the fillers in the steps [I] and [II] may become more than 0 part by weight but not more than 120 parts by weight based on 100 parts by weight of total amount of the copolymer (A), the copolymer (C) and the polymer (D) used in the step [I] and the step [II]. When the step [II] is carried out, the weight ratio of the filler used in the step [I] to the filler used in the step [II] is not specifically restricted, but the ratio of the filler used in the step [I]/the filler used in the step [II] is, for example, 99/1 to 1/99.

The antioxidant may be used in the step [I] only or the step [II] only, or may be used in both of the step [I] and the step [II], as previously described. In either case, it is enough just to use the antioxidant so that the aforesaid amount of the antioxidant may be contained in the finally obtained composition. For example, when the antioxidant is used in the step [I] only or the step [II] only, the antioxidant is preferably added so that the amount of the antioxidant in the step [I] or the step [II] may become 0.01 to 10 parts by weight based on 100 parts by weight of the total amount of the copolymer (A), the copolymer (C) and the polymer (D) used in the steps [I] and [II]. When the antioxidant is used in both of the step [I] and the step [II], the antioxidant is preferably added so that the total amount of the antioxidants in the steps [I] and [II] may become 0.01 to 10 parts by weight based on 100 parts by weight of total amount of the copolymer (A), the copolymer (C) and the polymer (D) used in the step [I] and the step [II].

Through such steps [I] and [II] as above, such a composition as above is obtained.

The sea-island structure can be confirmed by subjecting a slice of a pellet obtained from the composition to dyeing treatment with a heavy metal such as ruthenium and observing it by an electron microscope such as a transmission electron microscope. It is thought that the component derived from the copolymer (C) is present mainly in the island phase and the component derived from the polymer (D) is dispersed mainly in the sea phase.

It is thought that at least a part of the copolymer (C) has been crosslinked. That the copolymer has been thus crosslinked can be confirmed by the measurement of a gel content, as described in the step [I]. It is thought that in the case where the composition is obtained through the step [I-a], a part of the copolymer (A) has been crosslinked. Presence of the crosslinked copolymer (A) can be indirectly confirmed by that the melt tension of the composition is increased as compared with the case of carrying out the step [I-a] using, instead of the copolymer (A), a propylene-based polymer containing no constituent unit derived from a non-conjugated polyene.

As previously described, the polymer (D) is added not only in the step [I] but also in the step [II], when needed. Molecules of the polymer (D) are sometimes decomposed by, for example, kneading of the step [I]. In the finally obtained composition, therefore, molecules of the polymer (D) decomposed by the kneading can be also contained.

By the way, if decomposed molecules are contained in a composition as above, melt tension of the composition is usually lowered. However, it is thought that since the component derived from the copolymer (A) is present in the composition (Y), melt tension of the composition is increased, and the island phase-sea phase interfacial strength is also increased. On this account, when a foamed product is produced from the composition using a blowing agent, breakage of foamed cells is inhibited. That is to say, fine foamed cells are uniformly dispersed, and hence, weight lightening of a foamed product can be realized, and the resulting foamed product is excellent also in appearance. Moreover, this foamed product is excellent also in balance between specific gravity, appearance and mechanical properties.

As for the composition of the present invention, the crystallization time wherein the composition is expanded and becomes a foamed product is shortened. By virtue of this, a state wherein fine foamed cells uniformly dispersed in the composition can be maintained also in the foamed product. Further, the foamed product exhibits excellent mechanical properties.

After the composition is taken out of the kneading apparatus, it may be molded into a molded product such as pellet. Thus, the molded product of the present invention is composed of the composition (Y).

The composition (Y) prepared as above has advantages of high melt tension and high crystallization rate.

Preferred embodiments of the composition (Y) of the present invention are described below.

(1) A propylene-based copolymer composition (Y) obtained from the propylene-based copolymer (A), the ethylene-based copolymer (C) having an ethylene content of more than 50% by mol and the crystalline propylene-based polymer (D), and is obtained through a step of dynamically heat-treating at least the copolymer (C) in the presence of the crosslinking agent (E).

(2) The propylene-based copolymer composition as stated in (1), which is obtained through a step [I-a] of dynamically heat-treating the ethylene-based copolymer (C), the crystalline propylene-based polymer (D), the propylene-based copolymer (A) and the crosslinking agent (E).

(3) The propylene-based copolymer composition as stated in (1) or (2), which is obtained through a step [II-D] of adding the crystalline propylene-based polymer (D) to the component obtained through the step [I-a].

(4) The propylene-based copolymer composition as stated in any one of (1) to (3), which contains the component derived from the crystalline propylene-based polymer (D) in an amount of 1 to 200 parts by weight and the component derived from the propylene-based copolymer (A) in an amount of 1 to 50 parts by weight, based on 100 parts by weight of the component derived from the ethylene-based copolymer (C).

(5) The propylene-based copolymer composition as stated in (1), which is obtained through a step of adding the propylene-based copolymer (A) to the component obtained through the step [I-b] of dynamically heat-treating the ethylene-based copolymer (C), the crystalline propylene-based polymer (D) and the crosslinking agent (E).

(6) The propylene-based copolymer composition as stated in (1) or (5), which is obtained through a step of further adding the crystalline propylene-based polymer (D).

(7) The propylene-based copolymer composition as stated in (5) or (6), which contains the component derived from the crystalline propylene-based polymer (D) in an amount of 1 to 200 parts by weight and the component derived from the propylene-based copolymer (A) in an amount of 1 to 50 parts by weight, based on 100 parts by weight of the component derived from the ethylene-based copolymer (C).

(8) The propylene-based copolymer composition as stated in any one of (1) to (7), wherein at least a part of the component derived from the ethylene-based copolymer (C) has been crosslinked.

(9) The propylene-based copolymer composition as stated in any one of (1) to (8), wherein at least a part of the component derived from the propylene-based copolymer (A) has been crosslinked.

<Propylene-Based Copolymer Composition (Z) for Foaming and Foamed Product>

The propylene-based copolymer composition (Z) for foaming of the present invention (also described as a "composition (Z)" hereinafter) is obtained by blending the composition (Y) with a blowing agent (H). From this composition (Z), a foamed product can be also obtained.

(Blowing Agent (H))

The blowing agent (H) is, for example, an inorganic or organic thermal decomposition type chemical blowing agent or a physical blowing agent.

Examples of the inorganic thermal decomposition type chemical blowing agents include inorganic carbonates, such as sodium hydrogencarbonate, sodium carbonate, ammonium hydrogencarbonate and ammonium carbonate, and nitrites, such as ammonium nitrite. The inorganic thermal decomposition type chemical blowing agents may be used singly, or may be used in combination of two or more kinds.

Examples of the organic thermal decomposition type chemical blowing agents include nitroso compounds, such as N,N'-dimethyl-N,N'-dinitrosoterephthalamide and N,N'-dinitrosopentamethylenetetramine; azo compounds, such as azodicarbonamide, azobisisobutylonitrile, azocyclohexylnitrile, azodiaminobenzene and barium azodicarboxylate; sulfonyl hydrazide compounds, such as benzenesulfonyl hydrazide, toluenesulfonyl hydrazide, p,p'-oxybis(benzenesulfonyl hydrazide) and diphenylsulfone-3,3'-disulfonyl hydrazide; and azide compounds, such as calcium azide, 4,4'-diphenyldisulfonyl azide and p-toluenesulfonyl azide. The organic thermal decomposition type chemical blowing agents may be used singly, or may be used in combination of two or more kinds.

As the physical blowing agent, an inert gas containing carbon dioxide, nitrogen or a mixture of carbon dioxide and nitrogen as a main component can be mentioned. The physical blowing agents may be used singly, or may be used in combination of two or more kinds. When carbon dioxide or nitrogen is used, it is preferable to mix it in a supercritical state with the composition from the viewpoints of rapid and uniform mixing and fining of cells.

The amount of the blowing agent (H) is not specifically restricted, but the blowing agent is preferably added in an amount of 0.1 to 30 parts by weight based on 100 parts by weight of the composition (Z).

To the composition (Z), a foam nucleating agent, a wetting agent, etc. may be added.

Examples of the foam nucleating agents include metal compounds of zinc, calcium, lead, iron, barium and the like, higher fatty acids such as stearic acid and metallic salts thereof, fine inorganic particles, such as talc, barium sulfate, silica, zeolite, boron nitride, aluminum oxide and zirconium oxide, a tetrafluoroethylene-based resin fine powder, a silicon rubber powder; mixtures of polyvalent carboxylic acids, such as citric acid, oxalic acid, fumaric acid, phthalic acid, malic acid, tartaric acid, lactic acid, cyclohexane-1,2-dicarboxylic acid, camphoric acid, ethylenediaminetetraacetic acid, triethylenetetraminehexaacetic acid and nitrilo acid, with inorganic carbonic acid compounds, such as sodium hydrogencarbonate, sodium aluminum hydrogencarbonate and potassium hydrogencarbonate, and intermediates formed by these reactions, such as polycarboxylic acids salts of sodium dihydrogencitrate and potassium oxalate; nitroso compounds, such as N,N'-dimethyl-N,N'-dinitrosoterephthalamide and N,N'-dinitrosopentamethylenetetramine; azo compounds, such as azodicarbonamide, azobisisobutyronitrile, azocyclohexylnitrile, azodiaminobenzene and barium azodicarboxylate; sulfonyl hydrazide compounds, such as benzenesulfonyl hydrazide, toluenesulfonyl hydrazide, p,p'-oxybis (benzenesulfonyl hydrazide) and diphenylsulfone-3,3'-disulfonyl hydrazide; and azide compounds, such as calcium azide, 4,4'-diphenyldisulfonyl azide and p-toluenesulfonyl azide. Of these, calcium stearate and a tetrafluoroethylene-based resin fine powder are particularly preferable.

The amount of the foam nucleating agent and the amount of the wetting agent are each preferably 0.01 to 10 parts by weight, more preferably 0.02 to 5 parts by weight, based on 100 parts by weight of the composition (Z).

Preparation of a foamed product using the thermal decomposition type chemical blowing agent is carried out by, for example, the following process. The composition in the form of pellets, the thermal decomposition type chemical blowing agent in the form of a powder or pellets obtained by using a resin as a binder, and if necessary, the foam nucleating agent and the wetting agent are once mixed by a tumbler type Brabender, a V type Brabender, a ribbon blender, a Henschel mixer or the like, and then, if necessary, kneaded by an open type mixing roll, a non-open type Banbury mixer, an extruder, a kneader, a continuous mixer or the like at a temperature of not higher than the decomposition temperature of the blowing agent, to prepare a composition (Z).

Subsequently, the resulting composition is fed to an extruder and heated to a temperature that is not lower than the melting point of the composition and the decomposition temperature of the blowing agent in a barrel to uniformly disperse a gas generated by decomposition of the blowing agent, in the composition while pressurizing the extruder.

Subsequently, the molten composition (Z), in which the gas generated by decomposition of the blowing agent has been uniformly dispersed, is transferred to a die fixed to the tip of the extruder and preset at an optimum foaming temperature, and then extruded into the atmosphere or water from the die, whereby the pressure is abruptly lowered to foam the composition, and the composition is cooled and solidified by the succeeding cooling apparatus to produce a desired foamed product. The temperature of the composition (Z) during extruding is preferably in the range of 120 to 280° C.

On the other hand, in the preparation of a foamed product using carbon dioxide or nitrogen, the composition (Z) and if necessary the foam nucleating agent and the wetting agent are once kneaded by a tumbler type Brabender, a V type Brabender, a ribbon blender, a Henschel mixer or the like and then melted at 130 to 300° C. in a resin plastifying cylinder to form a molten composition (Z) in which the composition and carbon dioxide or nitrogen are compatible with each other. From the viewpoints of compatibility and uniformity of foamed cells, carbon dioxide or nitrogen is preferably dissolved in a supercritical state in the composition in the resin plastifying cylinder.

Subsequently, the molten composition is transferred to a die fixed to the tip of the extruder and preset at an optimum foaming temperature, and then extruded into the atmosphere from the die, whereby the pressure is abruptly lowered to gasify carbon dioxide or nitrogen and to thereby foam the composition, and the composition is cooled and solidified by the succeeding cooling apparatus to produce a desired foamed product. The temperature of the composition during extruding is preferably in the range of 120 to 280° C.

For preparing a foamed product from the composition obtained as above, not only the above-mentioned extrusion molding but also molding methods having been hitherto used to obtain foam molded products, such as press molding, injection molding and calendering, may be adopted.

Thus, the molded product of the present invention, specifically a foamed product, is obtained from the aforesaid composition. Since the foamed product of the present invention is obtained from the aforesaid composition, weight lightening can be attained, and the appearance is also excellent. Moreover, the foamed product is excellent also in balance between specific gravity, appearance and mechanical properties. The foamed product of the present invention can attain weight lightening while maintaining mechanical properties, and also has excellent appearance, as compared with foamed products obtained from conventional compositions.

<Molded Product>

The propylene-based copolymer or the propylene-based copolymer composition of the present invention can be widely applied to hitherto publicly known polyolefin uses. For example, the copolymer or the composition can be utilized by molding it into sheets, unstretched or stretched films, filaments and other molded products of various shapes. By using the copolymer or the composition of the present invention for a part of a molded product, a multilayer laminate can be produced and used. The multilayer laminate is a laminate at least one layer of which is a layer comprising the copolymer or the composition, and examples thereof include a multilayer film or sheet, a multilayer container, a multilayer tube and a multilayer coating film laminate in which the copolymer or the composition is contained as one constitutional component of an aqueous coating material.

The molded product can be obtained by publicly known thermoforming (thermal molding) processes, such as extrusion molding, injection molding, inflation molding, blow molding, extrusion blow molding, injection blow molding, press molding, vacuum forming, calendering, foam molding and powder slush molding.

The extrusion molded product is not specifically restricted on its shape and the type of a manufactured article, and examples thereof include sheet, film (unstretched), pipe, hose, wire coating and tube. Specifically, there can be mentioned sheet (skin material), film, tube, catheter, monofilament and nonwoven fabric. For the extrusion molding, a hitherto publicly known extrusion apparatus and molding conditions can be adopted. For example, using a single screw extruder, a kneading extruder, a ram extruder, a gear extruder or the like, a molten copolymer or composition is extruded from a specific die, whereby a molded product of a desired shape can be produced.

The stretched film can be obtained by stretching such an extruded sheet or extruded film (unstretched) as above by a publicly known stretching method, such as tentering method (lengthwise-crosswise stretching, crosswise-lengthwise stretching), simultaneous biaxial orientation method or monoaxial stretching method. The stretch ratio in the stretching of a sheet or an unstretched film is usually about 20 to 70 times in the case of biaxial stretching, and is usually about 2 to 10 times in the case of monoaxial stretching. It is desirable to obtain a stretched film having a thickness of 1 to 500 μm, preferably 5 to 200 μm, by carrying out stretching.

As a molded product in the form of a film, an inflation film can be also produced. During inflation molding, drawdown rarely occurs.

The molded product in the form of a sheet or a film is rarely electrostatically charged, is excellent in rigidity such as tensile modulus, heat resistance, stretchability, impact resistance, aging resistance, transparency, see-through, gloss and heat sealing properties, and can be widely used as a packaging film, etc. In this case, the molded product in the form of a sheet or a film may be a multilayer molded product.

The filament molded product can be produced by extruding a molten copolymer or composition through a spinneret. The filament thus obtained may be further stretched. This stretching has only to be carried out to such a degree that the filament is molecular-orientated in at least monoaxial direction, and it is desirable to carry out stretching usually in a stretch ratio of about 5 to 10 times. The filament is rarely electrostatically charged and is excellent in transparency, rigidity, heat resistance, impact resistance and stretchability. The nonwoven fabric can be specifically produced by the use of a spun bond method or a melt blown method.

The injection molded product can be produced by injection molding the copolymer or the composition to various shapes using a hitherto publicly known injection molding apparatus and adopting publicly known conditions. The injection molded product is rarely electrostatically charged, is excellent in transparency, rigidity, heat resistance, impact resistance, surface gloss, chemical resistance, abrasion resistance, etc., and can be widely used for automotive interior trim, automotive exterior trim, housings of household appliances, containers, etc.

The blow molded product can be produced by blow molding the copolymer or the composition using a hitherto publicly known blow molding apparatus and adopting publicly known conditions. In this case, the blow molded product may be a multilayer molded product.

In the extrusion blow molding, for example, the copolymer or the composition is extruded in a molten state from a die at a resin temperature of 100° C. to 300° C. to form a tubular parison, then the parison is held in a mold of a desired shape, and thereafter, air is blown into the mold to bring the parison into close contact with the mold at a resin temperature of 130° C. to 300° C., whereby a hollow molded product can be produced. The stretch (blow) ratio is desirably about 1.5 to 5 times in the crosswise direction.

In the injection blow molding, the copolymer or the composition is injected into a parison mold at a resin temperature of 100° C. to 300° C. to form a parison, then the parison is held in a mold of a desired shape, and thereafter, air is blown into the mold to bring the parison into close contact with the mold at a resin temperature of 120° C. to 300° C., whereby a hollow molded product can be produced. The stretch (blow) ratio is desirably 1.1 to 1.8 times in the lengthwise direction and 1.3 to 2.5 times in the crosswise direction.

The blow molded product is excellent not only in transparency, rigidity (or flexibility), heat resistance and impact resistance but also in moisture resistance.

As the press molded product, a mold stamping product can be mentioned, and for example, when a base material and a skin material are simultaneously press molded to subject them to composite integral molding (mold stamping), the copolymer or the composition can be used as the base material. Specific examples of the mold stamping products include automotive interior trim, such as door trim, rear package trim, sheet back garnish and instrument panel. The press molded product is rarely electrostatically charged and is excellent in rigidity (or flexibility), heat resistance, transparency, impact resistance, aging resistance, surface gloss, chemical resistance, abrasion resistance, etc.

In the present invention, vacuum forming products, e.g., interior skin materials such as instrument panel and door trim of automobiles, can be also produced. Such vacuum forming products are rarely electrostatically charged and are excellent in flexibility, heat resistance, impact resistance, aging resistance, surface gloss, chemical resistance, abrasion resistance, etc.

Powder slush molded products, such as automotive parts, household appliance parts, toys and general merchandise, can be also produced. Such molded products are rarely electrostatically charged and are excellent in flexibility, heat resistance, impact resistance, aging resistance, surface gloss, chemical resistance, abrasion resistance, etc.

As the molded product of the present invention, a laminate having at least one layer composed of the copolymer or the composition can be also mentioned.

The copolymer or the composition is suitable for, for example, containers or nonwoven fabrics. Examples of the containers include food containers, such as cold storage container and retort pouch, and bottle containers. Further, medical containers, transfusion bags, etc. can be also mentioned.

As described above, the copolymer or the composition can be widely used for transfusion bags, medical containers, automotive interior and exterior trim, beverage bottles, clothes cases, food packaging materials, food containers, retort containers, PET substitutes, pipes, transparent substrates, transparent sealants, laminates, etc.

<Foamed Product>

The foamed product obtained by the use of the propylene-based copolymer or the propylene-based copolymer composition of the present invention is produced with a high expansion ratio, has good injection molding properties, is excellent in expansion ratio and cell uniformity during foaming and has high rigidity and material strength.

The process to produce the foamed product of the present invention is not specifically restricted, and the foamed product can be produced by extrusion molding, press molding, injection molding, blow molding, extrusion blow molding, injection blow molding, inflation molding, stamping molding, compression molding, bead molding or the like, using a molding machine that is used in a publicly known resin processing method.

For producing the foamed product, a process comprising bringing the copolymer or the composition into contact with a high-pressure gas and mixing them may be used, in addition to the publicly known processes.

Specifically, by bringing the copolymer or the composition into contact with a high-pressure gas, the copolymer or the composition (raw material) can be impregnated with the high-pressure gas. When the raw material is brought into contact with the high-pressure gas, the raw material may be in the form of a molded product such as a film or a sheet, or may be a molten raw material. However, a film or a sheet is preferable. In order to bring the raw material and the high-pressure gas into contact with each other, it is possible that a molded product is placed in a pressure container and a high-pressure gas is injected thereinto, or it is also possible that a molten raw material is placed in a pressure container, an extrusion molding machine, an injection molding machine or the like and a high-pressure gas is injected thereinto.

Examples of the high-pressure gases include carbon dioxide, nitrogen, argon, hydrogen, oxygen, butane, propane and water vapor. If desired, two or more kinds of them can be used. Air can be also used. Of these, carbon dioxide is preferable from the viewpoints of inertness to the raw material, solubility in the raw material and handling properties. When carbon dioxide is used, its concentration is usually not less than 80% by volume.

The pressure of the high-pressure gas that is brought into contact with the raw material is usually not less than 1 MPa, preferably not less than 20 MPa. The upper limit is not specifically restricted, but from the viewpoints of economy and operation properties, the pressure is usually not more than 50 MPa. As the pressure is increased, cell diameter of the resulting foamed product is decreased, so that a higher pressure is preferable.

The temperature of the high-pressure gas is properly selected according to the form of the raw material, and is usually not higher than 300° C., preferably not higher than 200° C. The lower limit is not specifically restricted, but from the viewpoints of economy and operation properties, the temperature is usually not lower than 0° C. As the temperature is lowered, cell diameter of the resulting foamed product is decreased, so that a lower temperature is preferable.

The time for contact of the raw material with the high-pressure gas is properly selected according to the form of the raw material. When a molten raw material is used, the contact time is usually not less than 1 second, preferably not less than 1 minute. When a molded product in the form of a film or a sheet is used, the contact time is usually not less than 1 hour, preferably not less than 3 hours. The upper limit is not specifically restricted, but after the high-pressure gas sufficiently penetrates into the raw material and is so diffused that the dissolved gas in the raw material reaches saturated solubility, the effect corresponding to the time is poor. Therefore, from the viewpoint of production efficiency, the contact time is usually not more than 100 hours.

Although the state of the high-pressure gas is a supercritical state or a liquid state, the high-pressure gas is preferably in a supercritical state. The expression that the high-pressure gas is in a supercritical state means that the temperature and the pressure of the high-pressure gas are each not lower than the critical point, and in this state, density, viscosity, diffusion coefficient, etc. can be broadly changed from those close to a gas to those close to a liquid by changing the pressure. The critical point of the high-pressure gas varies depending upon the type of the high-pressure gas. For example, in the case of carbon dioxide, the critical temperature is 304.2 K, and the critical pressure is 7.4 MPa. In the case of nitrogen, the critical temperature is 126.2 K, and the critical pressure is 3.4 MPa. In the case of a mixed gas of two or more kinds, the critical point exists according to the types of the gas components and the mixing ratio thereof.

The raw material or the molded product in the form of a sheet or a film, which has been brought into contact with the high-pressure gas and impregnated therewith, can be foamed by lowering the ambient pressure usually down to about normal pressure, that is, by reducing pressure. During the pressure reduction, a part of the dissolved gas in the raw material is released outside and undergoes Joule-Thomson expansion, whereby the raw material is cooled. The pressure reduction rate has only to be properly adjusted, but as the pressure reduction rate is lowered, the quantity of the dissolved gas released outside from the raw material is increased, and the number of cells in the foamed product is decreased. Usually within 1 hour, preferably within 5 minutes, after completion of the pressure reduction, the following low-temperature holding is carried out.

The raw material thus foamed is then held at a temperature of not higher than 15° C., preferably not higher than 10° C., more preferably not higher than 5° C. By carrying out such low-temperature holding, a foamed product of high transparency can be obtained. The lower limit of the holding temperature is not specifically restricted, but from the viewpoint of operation properties, the holding temperature is usually not higher than 0° C.

For the purpose of sufficiently releasing the dissolved gas outside, the time for the low-temperature holding is usually not less than 1 minute, preferably not less than 5 minutes, more preferably not less than 1 hour. The upper limit of the holding time is not specifically restricted, but from the viewpoint of operation properties, the holding time is usually not more than 24 hours. Examples of media used for the holding include liquids, such as cold water and oil, and gasses, such as fluorocarbons, and it is enough just to bring such a medium into direct or indirect contact with the raw material.

As another example, there is a process for producing a foamed product by press molding. That is to say, the aforesaid chemical blowing agent and pellets of the copolymer or the composition are introduced into a heated mold of a press molding machine, and with or without applying a molding pressure, the copolymer or the composition is melted and then foamed to produce a foamed product. In this case, the temperature of the mold is preferably in the range of 110 to 250° C.

Further, a process for producing a foamed product by injection molding is given as an example. That is to say, there is a process wherein the copolymer or the composition is heated and melted by an injection molding machine and then injected into a mold so that the copolymer or the composition may be foamed at the nozzle tip, whereby a foamed product is produced. During the injection, the resin temperature is preferably in the range of 110 to 250° C.

Through the above-mentioned foaming processes, the foamed product of the present invention can be obtained.

When foaming is carried out usually at a foaming temperature of 100 to 170° C., preferably 120 to 165° C., more preferably 140 to 165° C., the expansion ratio of the foamed product is preferably 1.5 to 50 times, more preferably 2 to 50 times, most preferably 2 to 30 times. The expansion ratio can be determined by dividing the density of the resulting foamed product by the density of the raw material.

The mean cell diameter of the foamed product of the present invention is usually 0.1 to 100 μm, preferably 0.5 to 50 μm, more preferably 0.5 to 20 μm.

The foamed product of the present invention may be used by laminating it with a polyolefin-based resin base material or the like.

<Uses>

The propylene-based copolymer or the propylene-based copolymer composition of the present invention is excellent in lightweight properties, flexibility (or rigidity), impact resistance, mechanical properties, toughness, high breakdown voltage properties, chemical resistance, etc., and therefore, it can be preferably applied to the aforesaid or the following various uses.

Examples of Automotive Members Include:

cushioning materials for automotive members, such as bumper core, sheet core cushioning material and floor spacer in trunk; and automotive interior trim, such as door rim, console box, sheet bag garnish, instrument panel, ceiling material, sheet pad, ceiling cushioning material, sound absorbing material, soundproofing material, head rest, arm rest, floor mat, trunk mat, floor spacer, door trim, instrument panel, door mirror packing, pillar garnish, engine sound absorbing material, fuel tank safety foam, in-filter material, element material, side collision pad, door panel, sheet back cover, instrument panel skin, insulated van, freezer, tank lorry, steering wheel (including semi-rigid product), automotive air conditioner insulating material, instrument panel lining material, trunk mat, floor mat cowl side, ceiling material, wheel house cover, sheet back, sun visor, molding door, pillar trim, door trim and wiring protector.

Further, there can be mentioned:

parts of railroads, ships, aircrafts and motorcycles, such as seat pad, sheet cushion, floor soundproofing material, helmet lining, oil filter and saddle;

parts of ships, such as buoyancy materials of refrigerator ship, freezing ship, LPG ship, LNG ship, boat and yacht, FRP board core material, and steering filler; and parts of aircrafts and railroads, such as floor, ceiling, wall, freezer container, guard soundproofing material and liquid fuel tank for launch vehicle to launch artificial satellites.

Examples of building, constructional and electric materials include:

building materials and industrial materials, such as roof deck, rooftop heat insulating waterproofing sheet, various packing materials, unit bath heat insulating material, roof heat insulating waterproofing material, unevenness adjusting material, roof deck material, various joint fillers, long roof heat insulating/dew condensation-preventive material, carpet underlay, water/hot water pipe heat retaining material, bath heat retaining material, sink dew condensation-preventive material, soft lay constructional material and sash joint filling material;

bedding, furniture and interior goods, such as sofa, bed, office chair, mattress, cushion, coverlet, pillow, mattress for health, floor chair, legless chair, cushion and carpet packing;

electric appliances, such as filter for air conditioner, microphone cover, headphone ear pad, speaker grille, cleaner filter, filter for copy machine toner mending and iron;

building materials and constructional materials, such as wooden house, reinforced concrete-based building, concrete-based warehouse/factory (roof, ceiling, wall, bedding material for floor, cover for water pipe or the like, sliding door, siding board, partition core material, bath tub, joint filling material, etc.), joint filling material, backup material, material for rooftop heat insulating work, sea/river wall, soundproofing wall, concrete sleeper sound absorbing material, heat insulating material for wooden house and pipe cover;

materials for heat insulating equipment, such as material for refrigerator, vending machine interior board material, and material for clean room;

materials for plant facilities, such as material for storage tank of LNG, LPG or the like, material for other industrial cold retaining storage tanks, heat retention material for heavy oil tank, and pipe cover;

heat insulating and industrial materials, such as heat insulating material for air conditioning facility, air seal, material for air conditioner, sound absorbing/heat insulating material for railroad and automobile, anti-freezing material, material for constant temperature device and floor heating mat;

refrigerating and cooling media, such as heat retaining material for air conditioner pipe, heat retaining material for freezing air conditioning equipment, medium for central heating, medium for freezer/refrigerator, and medium for low-temperature warehouse;

water pipes for water supply piping, hot water supply piping and cold district;

materials for precision equipments, such as those for FA/OA equipment, sound equipment and optical product;

electric and electronic parts, such as electric device parts and LCD peripheral members; and materials for household appliances, such as material for cooling/heating equipment, refrigerator heat insulating material, heat insulating material for energy saving equipment, electric part tray and pipe cover.

Examples of packaging and cushioning materials include:

food containers, such as food containers for microwave oven;

physical distribution and industrial materials, such as automotive parts, household appliance parts, those for precision equipments, those for optical instruments, precision equipment cases, reusable shipping cartons for automotive parts, containers, partition plates, lightweight truck mats and printed advertising boards;

equipment cushioning and packaging materials for industrial equipments, precision equipments, electrical products (notebook type PC, flat panel television), etc.;

packing materials for alcoholic drinks (Japanese sake, whisky, shochu liquor, domestic wine, etc.), toiletries (pump type bottles for shampoo, treatment, liquid detergent, etc.), etc.;

packaging and packing materials, such as flat TV surface protective/cushioning materials, surface protective materials for household appliances, furniture, musical instruments, cameras, glasses, pottery, etc., underfloor storage cases, and those for display panels;

packaging and packing materials, such as protective nets for apples, melons, pears, etc.;

packaging and cushioning protective materials, such as (pressure-sensitive) adhesive tape base, medical tape base, various gaskets, and those for electric products, precision equipments, industrial parts, furniture and glass products;

cushioning materials, such as ski carrier cushioning materials, baby carriage cushioning materials, reinforcing bar covers, and cushions for crushing; and other packing and packaging materials (for cosmetics, semiconductors, etc.), floor materials, blind sheets, cushioning materials for glass transportation/carriage, interior finishing materials, dielectric/antistatic uses, food trays, and expanded leather cloth.

As others, there can be mentioned:

general merchandise, such as kitchen sponge, scrubbing blush, cleaning sponge, cosmetic puff, roller brush, medical mask, hemostatic material, diaper, shoe insole, shoe sole, slipper padding material, inner boots for skiing, protector, packing material for instrument, joint carpet, toy, health-care equipment, scrubbing blush, mop, glass cleaner, ink pad, grip, septic tank filter, head gear and flooring tatami mat, and stationary/office supplies, such as binder and file;

household goods, such as door, sandal, chair padding, ceiling panel, table, frame, wall, tatami mat padding, fusuma sliding screen padding, toy and shoe sole;

miscellaneous goods and sporting goods, such as leisure mat, board, corner pad, cupboard sheet, ice cream refrigerating material, agricultural curing sheet, camera, lens, spectacles, and chemicals/cosmetics;

electric bulbs, in-house work boxes, bottles of foreign liquors and wine, and flower vases;

fillers, such as tunnel filler and shield filler;

partition plates, such as partition plates for physical distribution and transportation;

semiconductor lead frame spacers, and lead frames for steel pipe cover, sign/notice board, agricultural/gardening heat retaining material, paddy rice raising planting material and constructional water stop sheet;

various padding materials, such as brim, bag padding material, show sole material, belt padding material, obi sash padding, and slipper/sandal padding material; and packing, cassette tape case, bath mat, kitchen mat, desk mat, swimming bead board, pool cover, gymnastic mat, life jacket, toy, teaching material, cutting sticker, stationary kit case, under pad for artificial turf, kickboard, padding material, special insole, electric wire bobbin, container, flowerpot and fishing boat interior finishing material.

In the present invention, the copolymer or the composition can be preferably used particularly in the fields of automobiles, foods and building materials.

Examples of uses of the foamed products obtained from the propylene-based copolymer compositions (Y) and (Z) of the present invention include automotive parts, such as automotive interior trim skin material, weather strip sponge, body panel, steering wheel and side shield; constructional and building materials, such as soil improving sheet, stop water plate and noise prevention wall; industrial parts; shoe sole, and footwear such as sandal; electric and electronic parts, such as wire coating, connector and cap plug; sporting/leisure goods, such as golf club grip, baseball bat grip, swimming fin and swimming goggles; and general merchandise, such as gasket, waterproofing cloth, garden hose, belt, drain sheet and cosmetic puff.

EXAMPLES

The present invention is further described with reference to the following examples, but it should be construed that the present invention is in no way limited to those examples. In the present invention, properties were evaluated in the following manner.

[Various Measuring Conditions for Examples]

[Comonomer Composition]

Contents of propylene, an α-olefin and a non-conjugated polyene in the propylene-based copolymer were measured by $^{13}$C-NMR and $^1$H-NMR using the following apparatus under the following conditions.

Determination of propylene and an α-olefin was carried out using a JECX400P type nuclear magnetic resonance apparatus manufactured by JEOL Ltd. and using an orthodichlorobenzene/deuterated benzene (80/20% by volume) mixed solvent as a solvent under the conditions of a sample concentration of 60 mg/0.6 ml, a measuring temperature of 120° C., an observation nucleus of $^{13}$C (100 MHz), sequence of single pulse proton decoupling, a pulse width of 4.62 μsec (45° pulse), a repetition time of 5.5 seconds and a cumulative number of 8000. The measurement was carried out using 29.73 ppm as a reference value of chemical shift.

Further, the quantity of double bonds at the ends and inside was measured by $^1$H-NMR. The measurement was carried out using an ECX400P type nuclear magnetic resonance apparatus manufactured by JEOL Ltd. and using orthodichlorobenzene as a solvent under the conditions of a sample concentration of 20 mg/0.6 ml, a measuring temperature of 120° C., an observation nucleus of $^1$H (400 MHz), sequence of single pulse proton decoupling, a pulse width of 6.00 μsec (45° pulse), a repetition time of 7.0 seconds and a cumulative number of 512 or more. The measurement was carried out using 7.1 ppm as a reference value of chemical shift.

(Apparent Iodine Value Derived from Non-Conjugated Polyene)

An apparent iodine value of the propylene-based copolymer derived from a non-conjugated polyene was determined by the intensity measurement using a $^1$H-NMR spectrometer and a $^{13}$C-NMR spectrometer and by the following formulas.

The amounts (% by weight) of structural units of propylene, an α-olefin and a non-conjugated polyene were determined by the above method using $^{13}$C-NMR. The "% by weight" of the structural units was converted from "% by mol" of the structural units determined by $^{13}$C-NMR. For the conversion, calculation was carried out by taking a molecular weight of ethylene, a molecular weight of propylene and a molecular weight of ENB or VNB to be 28.05, 42.08 and 120.2, respectively.

Subsequently, an integral value of peaks derived from ENB and an integral value of peaks derived from vinyl groups of VNB were determined in the following manner using a $^1$H-NMR spectrometer.

[Integral value of peaks derived from ENB]: $(a)$, {(total of plural peaks in the vicinity of 4.7 to 5.3 ppm)$-2\times(c)$}    (1)

In the plural peaks in the vicinity of 4.7 to 5.3 ppm, a peak (a) and a peak (b) are detected together, and therefore, the peak (a) is calculated by the above formula.

[Integral value of peaks derived from vinyl groups of VNB]: (c), total of peaks in the vicinity of 5.5 to 6.0 ppm    (2)

(a), (b) and (c) in the formulas (1) and (2) indicate (a), (b) and (c) in the following formulas (X) and (Y), respectively.

[Chem. 7]

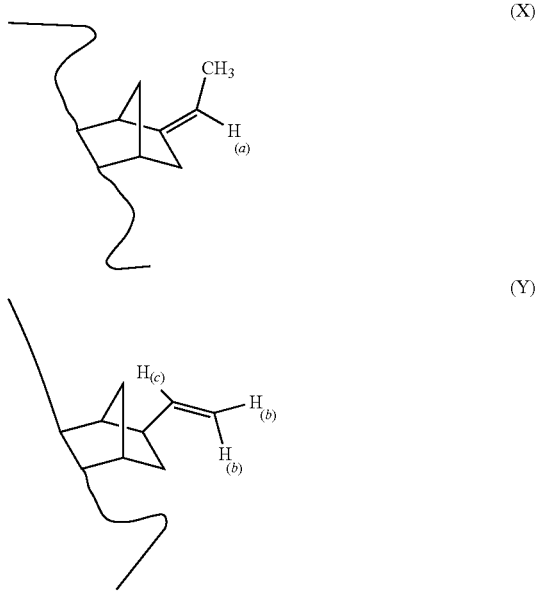

Using the resulting integral values, an apparent iodine value derived from VNB (non-conjugated polyene) (molecular weight: 120.2) was calculated from the following formula. The molecular weight of iodine was 253.81.

Apparent iodine value derived from VNB (non-conjugated polyene)=[integral value of peaks derived from vinyl groups of VNB (non-conjugated polyene)]/[integral value of peaks derived from ENB]×[% by weight of ENB determined by $^{13}$C-NMR spectrometer]×253.81/120.2

[Intrinsic Viscosity [η]]

An intrinsic viscosity [η] was measured at 135° C. using a decalin solvent. Specifically, about 20 mg of a polymerization powder, pellets or a mass of resin was dissolved in 15 ml of decalin, and a specific viscosity ηsp was measured in an oil bath at 135° C. To this decalin solution, 5 ml of a decalin solvent was added to dilute it, and a specific viscosity ηsp was measured in the same manner as above. This dilution operation was further repeated twice, and a value of ηsp/C given when the concentration (C) was extrapolated to 0 was determined as an intrinsic viscosity (see the following formula).

[η]=lim(η$sp$/C)(C→0)

[molecular weight (Mn, Mw, Mz), molecular weight distribution (Mw/Mn, Mz/Mw)]

A molecular weight and a molecular weight distribution of the propylene-based copolymer were measured using a liquid chromatograph (Alliance/GPC2000 model manufactured by Waters Corporation) in which, as columns, 2 columns of TSKgel GMH$^6$-HT and 2 columns of TSKgel GMH$^6$HTL (each column size: diameter: 7.5 mm, length: 300 mm) were connected in series. The measurement was carried out using o-dichlorobenzene as a mobile phase medium and BHT (available from Takeda Pharmaceutical Co., Ltd.) of 0.025% by weight as an antioxidant under the conditions of a sample concentration of 0.15% (V/W), a flow rate of 1.0 ml/min and a temperature of 140° C. As standard polystyrene having a molecular weight of 500 to 20,600,000, polystyrene available from Tosoh Corporation was used. By analyzing the resulting chromatogram through a publicly known method using data processing software EMPOWER™ 2 manufactured by Waters Corporation and using a calibration curve obtained by the use of a standard polystyrene sample, Mn, Mw, Mz, Mw/Mn and Mz/Mw were calculated.

[MFR (g/10 min)]

MFR was measured at 230° C. under a load of 2.16 kg and at 230° C. under a load of 10 kg in accordance with JIS K-6721.

From the measurement results, a ratio (MFR$_{10}$/MFR$_{2.16}$) was calculated.

[Gel Fraction]

A sample of about 100 mg was weighed and wrapped in a screen of 325 meshes. In a closed container, to these pellets was added p-xylene of 30 ml that is a sufficient amount for the pellets, and the pellets were immersed for 24 hours at 140° C. Next, this sample was taken out on a filter paper and dried at 80° C. for 2 hours until a constant weight was reached. Then, a gel fraction was calculated based on the following formula.

Gel fraction [% by weight]=[sample dry weight after immersion in $p$-xylene/sample weight before immersion in $p$-xylene]×100

[Glass Transition Point (Tg)]

A glass transition point (Tg) of the propylene-based copolymer was measured using a DSC220C apparatus manufactured by Seiko Instruments Inc. as a differential scanning calorimeter (DSC). A sample of 5 to 10 mg was placed in an aluminum pan, and the aluminum pan was sealed. As a temperature profile, the temperature was raised up to 200° C. from room temperature at 50° C./min, then maintained at 200° C. for 5 minutes, then lowered down to −100° C. at 10° C./min, maintained at −100° C. for 5 minutes and further raised up to 200° C. at 10° C./min. From a chart in the temperature rise of the second time, a glass transition point (Tg) was obtained.

[Melting Point (Tm)]

An exothermic/endothermic curve was determined by a differential scanning calorimeter (DSC220C apparatus), and the temperature at the maximum melting peak position in the temperature rise was taken as Tm. In the measurement, a sample of about 5 mg was placed in an aluminum measuring pan, then (i) the sample was heated up to 200° C. at 100° C./min, then the sample was maintained at 200° C. for 5 minutes, thereafter (ii) the sample was cooled down to −150° C. at 10° C./min, then (iii) the sample was heated up to 200° C. at 10° C./min, and the resulting endothermic curve was analyzed to determine a melting point.

[Process for Preparing Pressed Sheets for Various Measurements for Polymer]

Using a hydraulic hot press (manufactured by SHINTO Metal Industries Corporation) preset at 230° C., a pressed sheet was produced at 10 MPa. In the case of a sheet having a thickness of 2 to 5 mm (shape of spacer: 80×80×2-5 mm on a plate of 240×240×2 (thickness) mm, four-shot molding), the remaining heat time was about 5 to 7 minutes, and application of pressure was carried out at 10 MPa for 1 to 2 minutes. Thereafter, using another hydraulic hot press (manufactured by SHINTO Metal Industries Corporation) preset at 20° C., the sheet was compressed at 10 MPa and cooled for about 5 minutes to prepare a test sample. As a hot plate, a brass plate having a thickness of 5 mm was used. The sample prepared by the above process was used for various property evaluations.

[Process 1 for Preparing Samples for Various Measurements for Composition]

To 100 parts by weight of the total amount of the propylene-based copolymers (A), (B) and (C), 0.1 part by weight of tri(2,4-di-t-butylphenyl) phosphate as a secondary antioxidant, 0.1 part by weight of pentaerythritol tetrakis[3-(3,5-di-tert-butyl-4-hydroxyphenyl)propionate] as a heat stabilizer and 0.1 part by weight of calcium stearate as a hydrochloric acid absorbing agent were added. Thereafter, using a laboratory Plastomill (twin-screw batch type melt kneading apparatus) manufactured by Toyo Seiki Seisaku-Sho, Ltd., the mixture was melt kneaded for 5 minutes under the conditions of a preset temperature of 200° C., a charge weight of 40 g (apparatus batch volume: 60 cm$^3$) and 50 rpm, and then taken out. Using a cooling press preset at 20° C., a sheet was prepared, and the sheet was cut to a proper size to prepare a test sample.

[Process 2 for Preparing Samples for Various Measurements for Composition]

To 100 parts by weight of the total amount of the propylene-based copolymers (A), (B) and (C), 0.1 part by weight of tri(2,4-di-t-butylphenyl) phosphate as a secondary antioxidant, 0.1 part by weight of pentaerythritol tetrakis[3-(3,5-di-tert-butyl-4-hydroxyphenyl)propionate] as a heat stabilizer and 0.1 part by weight of calcium stearate as a hydrochloric acid absorbing agent were added. Thereafter, using a kneader-ruder (twin-screw melt kneading apparatus) manufactured by Musashino Kikai Co., Ltd., the mixture was melt kneaded for 5 minutes under the conditions of a preset temperature of 200° C., a charge weight of 1.5 kg and 20 rpm, then pelletized and taken out. Using a cooling press preset at 20° C., a sheet was prepared, and the sheet was cut to a proper size to prepare a test sample.

[Linear Viscoelasticity Measurement]

From a pressed sheet having a thickness of 2 mm, a disk having a diameter of 25 mm was punched to prepare a sample. For the measurement, MCR 301 (rheometer) manufactured by ANTON Paar was used, and as a fixture, a parallel plate having a diameter of 25 mm was used. After the sample was set on the apparatus and heated, the measurement was carried out under the conditions of a gap between fixtures of 1.5 mm, a strain of 5%, a measuring temperature of 190° C. and a frequency of 0.1 to 100 rad/sec.

Using the measurement results, the ratio ($\eta^*_{(\omega=0.1)}/\eta^*_{(\omega=100)}$) of a complex viscosity $\eta^*_{(\omega=0.1)}$ at a frequency ($\omega$=0.1 rad/s) to a complex viscosity $\eta^*_{(\omega=100)}$ at a frequency ($\omega$=100 rad/s) was calculated.

[Melt Tension (MT: mN)]

Using Capirograph 1C (barrel diameter: 9.55 mm) manufactured by Toyo Seiki Seisaku-Sho, Ltd. and using a capillary having a capillary length (L) of 8.0 mm, a capillary diameter (D) of 2.095 mm and L/D of 3.82, measurement was carried out under the conditions of a barrel temperature of 230° C., a piston rate of 15.0 mm/min and a take-up rate of 15.0 mm/min. A mean value of the resulting values was taken as a melt tension.

[Batch Foaming]

A pressed sample of 20×20×5 (thickness) mm was placed in a 1 liter autoclave (inner diameter: 140 mm, height: 90 mm) and heated by a heater, and while injecting carbonic acid gas to pressurize the autoclave, the pressure was adjusted to 25 MPa. While keeping the pressure in the autoclave at 25 MPa, the autoclave was kept at a given temperature for 2 hours, and thereafter, the pressure was released to prepare a foamed sample.

[Chemical Foaming]

Using a single screw extruder (L/D: 26, screw diameter: 20) manufactured by TPIC Co., Ltd., sample extrusion was carried out to obtain a foamed sample. The temperature (° C.) conditions were C1/C2/C3/head die/die/slit die=160/180/230/190/180/180-155. A slit die having a slit width of 14 mm and a slit gap width of 1 mm was used.

[Strand Foaming]

Using a tandem type extruder (screw diameter 30: L/D=32, screw diameter 40: L/D=36) in which single screw extruders of a screw diameter of 30 and a screw diameter of 40 manufactured by San-enji Co., Ltd. have been combined, the sample was impregnated with carbon dioxide gas (25 MPa) by the extruder of a screw diameter of 30 and subjected to strand foaming to obtain a sample of a foamed product. A die having a diameter of 1.2 mm was used.

[Density (g/cm$^3$) and Expansion Ratio]

The resulting molded product and foamed product were each cut to a proper shape, and using an electronic gravimeter (manufactured by Alfa Mirage Co., Ltd., MD-200S), measurement of density was carried out by a water substitution method (in accordance with JIS K7112).

The density of the pressed sheet before foaming was divided by the density of the molded product after foaming, and the resulting value was taken as an expansion ratio.

[SEM Observation]

The section of the foamed sample was cut with a razor, and platinum was deposited on the section by the use of Auto Fine Coater (JFC-1600) manufactured by JEOL Ltd. Thereafter, the section was observed under a scanning electron microscope (JSM-6510LV) manufactured by JEOL Ltd.

[Hardness]

Using ASKER (type C) manufactured by Kobunshi Keiki Co., Ltd., a hardness of the foamed sample was measured. A measuring fixture was placed on the foamed product, and after 10 seconds, a hardness was measured, and the resulting value was taken as a hardness of the sample.

[Compression Hardness and Compression Set]

Using a universal testing machine AG-X manufactured by Shimadzu Corporation, a 25% compression hardness and a compression set of the foamed sample were measured in accordance with JIS K6767.

Example 1

A-1

In a SUS polymerization apparatus having a volume of 1500 ml and equipped with a stirring blade, which had been thoroughly purged with nitrogen, 750 ml of dry hexane of 23° C., 5 ml of 5-vinyl-2-norbornene and 0.75 mmol of triisobutylaluminum (TIBAl) were placed at ordinary temperature, then the internal temperature of the polymerization apparatus was raised to 80° C., and 500 ml of hydrogen was introduced. The polymerization apparatus was pressurized to 0.5 MPa (system pressure) with propylene, and thereafter, the system pressure was adjusted to 0.75 MPa with ethylene. Subsequently, 0.00075 mmol of di(p-chlorophenyl)methylene(cyclopentadienyl)(octamethyloctahydrodibenzofluorenyl)zirconium dichloride and 0.00375 mmol of triphenylcarbenium tetrakis(pentafluorophenyl) borate were introduced into the polymerizer, and polymerization was carried out for 10 minutes while maintaining the internal temperature at 80° C. and the system pressure at 0.75 MPa. Then, 20 ml of methanol was added to terminate the polymerization. After release of pressure, a polymer was precipitated from the polymerization solution in 4 liters of methanol and dried at 130° C. for 12 hours under vacuum. The amount of the resulting polymer was 9.8 g. Properties of the resulting polymer measured are set forth in Table 1.

Example 2

A-2

In a SUS polymerization apparatus having a volume of 1500 ml and equipped with a stirring blade, which had been thoroughly purged with nitrogen, 750 ml of dry hexane of 23° C., 5 ml of 5-vinyl-2-norbornene and 0.75 mmol of triisobutylaluminum (TIBAl) were placed at ordinary temperature, then the internal temperature of the polymerization apparatus was raised to 80° C., and 400 ml of hydrogen was introduced. The polymerization apparatus was pressurized to 0.5 MPa (system pressure) with propylene, and thereafter, the system pressure was adjusted to 0.75 MPa with ethylene. Subsequently, 0.00075 mmol of di(p-chlorophenyl)methylene(cyclopentadienyl)(octamethyloctahydrodibenzofluorenyl)zirconium dichloride and 0.00375 mmol of triphenylcarbenium tetrakis(pentafluorophenyl)borate were introduced into the polymerizer, and polymerization was carried out for 10 minutes while maintaining the internal temperature at 80° C. and the system pressure at 0.75 MPa. Then, 20 ml of methanol was added to terminate the polymerization. After release of pressure, a polymer was precipitated from the polymerization solution in 4 liters of methanol and dried at 130° C. for 12 hours under vacuum. The amount of the resulting polymer was 14.0 g. Properties of the resulting polymer measured are set forth in Table 1.

Example 3

A-3

In a SUS polymerization apparatus having a volume of 1500 ml and equipped with a stirring blade, which had been thoroughly purged with nitrogen, 750 ml of dry hexane of 23° C., 9 ml of 5-vinyl-2-norbornene and 0.75 mmol of triisobutylaluminum (TIBAl) were placed at ordinary temperature, then the internal temperature of the polymerization apparatus was raised to 80° C., and 400 ml of hydrogen was introduced. The polymerization apparatus was pressurized to 0.5 MPa (system pressure) with propylene, and thereafter, the system pressure was adjusted to 0.75 MPa with ethylene. Subsequently, 0.00075 mmol of di(p-chlorophenyl)methylene(cyclopentadienyl)(octamethyloctahydrodibenzofluorenyl)zirconium dichloride and 0.00375 mmol of triphenylcarbenium tetrakis(pentafluorophenyl)borate were introduced into the polymerizer, and polymerization was carried out for 10 minutes while maintaining the internal temperature at 80° C. and the system pressure at 0.75 MPa. Then, 20 ml of methanol was added to terminate the polymerization. After release of pressure, a polymer was precipitated from the polymerization solution in 4 liters of methanol and dried at 130° C. for 12 hours under vacuum. The amount of the resulting polymer was 15.3 g. Properties of the resulting polymer measured are set forth in Table 1.

Example 4

A-4

In a SUS polymerization apparatus having a volume of 1500 ml and equipped with a stirring blade, which had been thoroughly purged with nitrogen, 750 ml of dry hexane of 23° C., 5 ml of 5-vinyl-2-norbornene and 0.75 mmol of triisobutylaluminum (TIBAl) were placed at ordinary temperature, then the internal temperature of the polymerization apparatus was raised to 80° C., and 400 ml of hydrogen was introduced. The polymerization apparatus was pressurized to 0.5 MPa (system pressure) with propylene, and thereafter, the system pressure was adjusted to 0.80 MPa with ethylene. Subsequently, 0.00075 mmol of di(p-chlorophenyl)methylene(cyclopentadienyl)(octamethyloctahydrodibenzofluorenyl)zirconium dichloride and 0.00375 mmol of triphenylcarbenium tetrakis(pentafluorophenyl)borate were introduced into the polymerizer, and polymerization was carried out for 10 minutes while maintaining the internal temperature at 80° C. and the system pressure at 0.80 MPa. Then, 20 ml of methanol was added to terminate the polymerization. After release of pressure, a polymer was precipitated from the polymerization solution in 4 liters of methanol and dried at 130° C. for 12 hours under vacuum. The amount of the resulting polymer was 20.7 g. Properties of the resulting polymer measured are set forth in Table 1.

Example 5

A-5

In a SUS polymerization apparatus having a volume of 1500 ml and equipped with a stirring blade, which had been thoroughly purged with nitrogen, 750 ml of dry hexane of 23° C., 5 ml of 5-vinyl-2-norbornene and 0.75 mmol of triisobutylaluminum (TIBAl) were placed at ordinary temperature, then the internal temperature of the polymerization apparatus was raised to 80° C., and 400 ml of hydrogen was introduced. After the polymerization apparatus was pressurized to 0.5 MPa (system pressure) with propylene, and thereafter, the system pressure was adjusted to 0.80 MPa with ethylene. Subsequently, 0.000375 mmol of di(p-chlorophenyl)methylene(cyclopentadienyl)(octamethyloctahydrodibenzofluorenyl)zirconium dichloride and 0.0019 mmol of triphenylcarbenium tetrakis(pentafluorophenyl)borate were introduced into the polymerizer, and polymerization was carried out for 10 minutes while maintaining the internal temperature at 80° C. and the system pressure at 0.80 MPa. Then, 20 ml of methanol was added to terminate the polymerization. After release of pressure, a polymer was precipitated from the polymerization solution in 4 liters of methanol and dried at 130° C. for 12 hours under vacuum. The amount of the resulting polymer was 36.2 g. Properties of the resulting polymer measured are set forth in Table 1.

Example 6

A-6

In a SUS polymerization apparatus having a volume of 1500 ml and equipped with a stirring blade, which had been thoroughly purged with nitrogen, 750 ml of dry hexane of 23° C., 4.5 ml of 5-vinyl-2-norbornene and 0.375 mmol of tri-isobutylaluminum (TIBAl) were placed at ordinary temperature, then the internal temperature of the polymerization apparatus was raised to 80° C., and 300 ml of hydrogen was introduced. The polymerization apparatus was pressurized to 0.5 MPa (system pressure) with propylene, and thereafter, the system pressure was adjusted to 0.80 MPa with ethylene. Subsequently, 0.0075 mmol of (t-butylamido)-dimethyl($\eta$5-2-methyl-s-indacen-1-yl)silane titanium(II) 1,3-pentadiene and 0.0375 mmol of triphenylcarbenium tetrakis(pentafluorophenyl)borate were introduced into the polymerizer, and polymerization was carried out for 3 minutes while maintaining the internal temperature at 80° C. and the system pressure at 0.80 MPa. Then, 20 ml of methanol was added to terminate the polymerization. After release of pressure, a polymer was precipitated from the polymerization solution in 4 liters of methanol and dried at 130° C. for 12 hours under vacuum. The amount of the resulting polymer was 18.7 g. Properties of the resulting polymer measured are set forth in Table 1.

Example 7

A-7

In a SUS polymerization apparatus having a volume of 1500 ml and equipped with a stirring blade, which had been thoroughly purged with nitrogen, 750 ml of dry hexane of 23° C., 4.5 ml of 5-vinyl-2-norbornene and 0.375 mmol of triisobutylaluminum (TIBAl) were placed at ordinary temperature, then the internal temperature of the polymerization apparatus was raised to 80° C., and 300 ml of hydrogen was introduced. The polymerization apparatus was pressurized to 0.5 MPa (system pressure) with propylene, and thereafter, the system pressure was adjusted to 0.80 MPa with ethylene. Subsequently, 0.00375 mmol of (t-butylamido)-dimethyl (η5-2-methyl-s-indacen-1-yl)silane titanium(II) 1,3-pentadiene and 0.0188 mmol of triphenylcarbenium tetrakis(pentafluorophenyl)borate were introduced into the polymerizer, and polymerization was carried out for 20 minutes while maintaining the internal temperature at 80° C. and the system pressure at 0.80 MPa. Then, 20 ml of methanol was added to terminate the polymerization. After release of pressure, a polymer was precipitated from the polymerization solution in 4 liters of methanol and dried at 130° C. for 12 hours under vacuum. The amount of the resulting polymer was 10.4 g. Properties of the resulting polymer measured are set forth in Table 1.

Example 20

A-11

In a SUS polymerization apparatus having a volume of 1500 ml and equipped with a stirring blade, which had been thoroughly purged with nitrogen, 750 ml of dry hexane of 23° C., 10 ml of 5-vinyl-2-norbornene and 0.75 mmol of triisobutylaluminum (TIBAl) were placed at ordinary temperature, then the internal temperature of the polymerization apparatus was raised to 80° C., and 200 ml of hydrogen was introduced. The polymerization apparatus was pressurized to 0.5 MPa (system pressure) with propylene, and thereafter, the system pressure was adjusted to 0.55 MPa with ethylene.

Subsequently, 0.0005 mmol of di(p-chlorophenyl)methylene(cyclopentadienyl)(octamethyloctahydrodibenzofluorenyl)zirconium dichloride and 0.0025 mmol of triphenylcarbenium tetrakis(pentafluorophenyl)borate were introduced into the polymerizer, and polymerization was carried out for 10 minutes while maintaining the internal temperature at 80° C. and the system pressure at 0.55 MPa. Then, 20 ml of methanol was added to terminate the polymerization. After release of pressure, a polymer was precipitated from the polymerization solution in 4 liters of methanol and dried at 130° C. for 12 hours under vacuum. The amount of the resulting polymer was 21.6 g. Properties of the resulting polymer measured are set forth in Table 1.

Example 21

A-12

In a SUS polymerization apparatus having a volume of 1500 ml and equipped with a stirring blade, which had been thoroughly purged with nitrogen, 750 ml of dry hexane of 23° C., 10 ml of 5-vinyl-2-norbornene and 0.75 mmol of triisobutylaluminum (TIBAl) were placed at ordinary temperature, then the internal temperature of the polymerization apparatus was raised to 80° C., and 100 ml of hydrogen was introduced. The polymerization apparatus was pressurized to 0.5 MPa (system pressure) with propylene, and thereafter, the system pressure was adjusted to 0.03 MPa with ethylene.

Subsequently, 0.00067 mmol of di(p-chlorophenyl)methylene(cyclopentadienyl)(octamethyloctahydrodibenzofluorenyl)zirconium dichloride and 0.00335 mmol of triphenylcarbenium tetrakis(pentafluorophenyl)borate were introduced into the polymerizer, and polymerization was carried out for 10 minutes while maintaining the internal temperature at 80° C. and the system pressure at 0.03 MPa. Then, 20 ml of methanol was added to terminate the polymerization. After release of pressure, a polymer was precipitated from the polymerization solution in 4 liters of methanol and dried at 130° C. for 12 hours under vacuum. The amount of the resulting polymer was 11.1 g. Properties of the resulting polymer measured are set forth in Table 1.

Example 22

A-13

In a SUS polymerization apparatus having a volume of 1500 ml and equipped with a stirring blade, which had been thoroughly purged with nitrogen, 750 ml of dry hexane of 23° C., 25 ml of 5-vinyl-2-norbornene and 0.75 mmol of triisobutylaluminum (TIBAl) were placed at ordinary temperature, then the internal temperature of the polymerization apparatus was raised to 80° C., and 200 ml of hydrogen was introduced. The polymerization apparatus was pressurized to 0.5 MPa (system pressure) with propylene, and thereafter, the system pressure was adjusted to 0.05 MPa with ethylene.

Subsequently, 0.00067 mmol of di(p-chlorophenyl)methylene(cyclopentadienyl)(octamethyloctahydrodibenzofluorenyl)zirconium dichloride and 0.00335 mmol of triphenylcarbenium tetrakis(pentafluorophenyl)borate were introduced into the polymerizer, and polymerization was carried out for 20 minutes while maintaining the internal temperature at 80° C. and the system pressure at 0.55 MPa. Then, 20 ml of methanol was added to terminate the polymerization. After release of pressure, a polymer was precipitated from the polymerization solution in 4 liters of methanol and dried at 130° C. for 12 hours under vacuum. The amount of the resulting polymer was 10.8 g. Properties of the resulting polymer measured are set forth in Table 1.

Comparative Example 1

A-8

In a SUS polymerization apparatus having a volume of 1500 ml and equipped with a stirring blade, which had been thoroughly purged with nitrogen, 750 ml of dry hexane of 23° C., 2.5 ml of 5-ethylidene-2-norbornene and 0.75 mmol of triisobutylaluminum (TIBAl) were placed at ordinary temperature, then the internal temperature of the polymerization apparatus was raised to 80° C., and 500 ml of hydrogen was introduced. The polymerization apparatus was pressurized to 0.5 MPa (system pressure) with propylene, and thereafter, the system pressure was adjusted to 0.8 MPa with ethylene. Subsequently, 0.0015 mmol of di(p-chlorophenyl)methylene(cyclopentadienyl)(octamethyloctahydrodibenzofluorenyl)zirconium dichloride and 0.0075 mmol of triphenylcarbenium tetrakis(pentafluorophenyl) borate were introduced into the polymerizer, and polymerization was carried out for 10 minutes while maintaining the internal temperature at 80° C. and the system pressure at 0.8 MPa. Then, 20 ml of methanol was added to terminate the polymerization. After release of pressure, a polymer was precipitated from the polymerization solution in 4 liters of methanol and dried at 130° C. for 12 hours under vacuum. The amount of the resulting polymer was 5.3 g. Properties of the resulting polymer measured are set forth in Table 1.

Comparative Example 2

A-9

In a SUS polymerization apparatus having a volume of 2000 ml and equipped with a stirring blade, which had been thoroughly purged with nitrogen, 750 ml of dry heptane of 23° C., 2 ml of 5-vinyl-2-norbornene and 0.4 mmol of tri-isobutylaluminum (TIBAl) were placed at ordinary temperature, then the internal temperature of the polymerization apparatus was raised to 95° C., and 100 ml of hydrogen was introduced. The polymerization apparatus was pressurized to 1.31 MPa (system pressure) with propylene, and thereafter, the system pressure was adjusted to 1.6 MPa with ethylene. Subsequently, 0.00027 mmol of di(p-chlorophenyl)methylene(cyclopentadienyl)(octamethyloctahydrodibenzofluorenyl)zirconium dichloride and 0.00135 mmol of triphenylcarbenium tetrakis(pentafluorophenyl) borate were introduced into the polymerizer, and polymerization was carried out for 10 minutes while maintaining the internal temperature at 95° C. and the system pressure at 1.6 MPa. Then, 20 ml of methanol was added to terminate the polymerization. After release of pressure, a polymer was precipitated from the polymerization solution in 4 liters of methanol and dried at 130° C. for 12 hours under vacuum. The amount of the resulting polymer was 69.2 g. Properties of the resulting polymer measured are set forth in Table 1.

Comparative Example 3

A-10

In a SUS polymerization apparatus having a volume of 2000 ml and equipped with a stirring blade, which had been thoroughly purged with nitrogen, 750 ml of dry heptane of 23° C., 2 ml of 5-vinyl-2-norbornene and 0.4 mmol of tri-isobutylaluminum (TIBAl) were placed at ordinary temperature, then the internal temperature of the polymerization apparatus was raised to 95° C., and 50 ml of hydrogen was introduced. The polymerization apparatus was pressurized to 1.2 MPa (system pressure) with propylene, and thereafter, the system pressure was adjusted to 1.6 MPa with ethylene. Subsequently, 0.000135 mmol of di(p-chlorophenyl)methylene (cyclopentadienyl)(octamethyloctahydrodibenzofluorenyl) zirconium dichloride and 0.000675 mmol of triphenylcarbenium tetrakis(pentafluorophenyl) borate were introduced into the polymerizer, and polymerization was carried out for 10 minutes while maintaining the internal temperature at 95° C. and the system pressure at 1.6 MPa. Then, 20 ml of methanol was added to terminate the polymerization. After release of pressure, a polymer was precipitated from the polymerization solution in 4 liters of methanol and dried at 130° C. for 12 hours under vacuum. The amount of the resulting polymer was 26.4 g. Properties of the resulting polymer measured are set forth in Table 1.

TABLE 1

|  |  | Ex. 1 (A-1) | Ex. 2 (A-2) | Ex. 3 (A-3) | Ex. 4 (A-4) | Ex. 5 (A-5) | Ex. 6 (A-6) | Ex. 7 (A-7) |
|---|---|---|---|---|---|---|---|---|
| Type of α-olefin | — | ethylene | ethylene | ethylene | ethylene | ethylene | ethylene | ethylene |
| Type of non-conjugated polyene | — | VNB | VNB | VNB | VNB | VNB | VNB | VNB |
| Propylene component | (mol %) | 80.2 | 82.9 | 79.6 | 73.0 | 51.4 | 78.8 | 50.5 |
| α-Olefin component | (mol %) | 18.9 | 16.1 | 19.2 | 26.1 | 47.6 | 20.1 | 48.5 |
| Non-conjugated polyene component | (mol %) | 0.9 | 0.9 | 1.3 | 0.9 | 1.0 | 1.2 | 1.0 |
| Iodine value | (g/100 g) | 8.1 | 8.2 | 17.7 | 7.7 | 9.5 | 9.1 | 13.6 |
| $MFR_{2.16}$ | (g/10 min) | 4.9 | 1.8 | 1.0 | 1.3 | 0.4 | 4.3 | 14.9 |
| $MFR_{10}$ | (g/10 min) | 54 | 23 | 17 | 21 | 8.7 | 55 | 150 |
| $MFR_{10}/MFR_{2.16}$ | — | 11.0 | 12.9 | 17.0 | 15.8 | 19.8 | 12.8 | 10.1 |
| [η] | (dL/g) | 1.4 | 1.7 | 1.6 | 1.6 | 1.6 | 1.1 | 0.91 |
| Gel fraction | (wt %) | <0.5 | <0.5 | <0.5 | <0.5 | <0.5 | <0.5 | <0.5 |
| Mn |  | 6.58E+04 | 8.44E+04 | 6.59E+04 | 8.08E+04 | 8.62E+04 | 7.68E+04 | 6.45E+04 |
| Mw |  | 2.36E+05 | 4.77E+05 | 5.97E+05 | 4.81E+05 | 4.92E+05 | 4.35E+05 | 3.24E+05 |
| Mz |  | 7.86E+05 | 3.50E+06 | 5.23E+06 | 3.89E+06 | 4.03E+06 | 3.48E+06 | 2.65E+06 |
| Mw/Mn | — | 3.6 | 5.6 | 9.1 | 6.0 | 5.7 | 5.7 | 5.0 |
| Mz/Mw |  | 3.3 | 7.3 | 8.8 | 8.1 | 8.2 | 8.0 | 8.2 |
| $\eta^*_{(\omega=0.1)}/\eta^*_{(\omega=100)}$ | — | 11 | 23 | 22 | 25 | 28 | 22 | 40 |
| Tg | ° C. | −20.1 | −17.8 | −17.2 | −27.7 | −48.4 | −21.5 | −49.2 |

|  |  | Ex. 20 (A-11) | Ex. 21 (A-12) | Ex. 22 (A-13) | Comp. Ex. 1 (A-8) | Comp. Ex. 2 (A-9) | Comp. Ex. 3 (A-10) |
|---|---|---|---|---|---|---|---|
| Type of α-olefin | — | ethylene | ethylene | ethylene | ethylene | ethylene | ethylene |
| Type of non-conjugated polyene | — | VNB | VNB | VNB | ENB | VNB | VNB |
| Propylene component | (mol %) | 78.6 | 87.8 | 74.7 | 76.6 | 73.8 | 64.9 |
| α-Olefin component | (mol %) | 19.4 | 10.3 | 23.3 | 23.0 | 25.9 | 34.9 |

TABLE 1-continued

| | | | | | | | |
|---|---|---|---|---|---|---|---|
| Non-conjugated polyene component | (mol %) | 2.0 | 1.9 | 2.0 | 0.4 | 0.2 | 0.2 |
| Iodine value | (g/100 g) | 12.4 | 11.2 | 12.3 | 4.8 | 1.6 | 1.6 |
| $MFR_{2.16}$ | (g/10 min) | 1.0 | 1.9 | 0.3 | 1.9 | 63 | 7.4 |
| $MFR_{10}$ | (g/10 min) | 33 | 28 | 31 | 14 | 440 | 53 |
| $MFR_{10}/MFR_{2.16}$ | — | 33.0 | 14.5 | 103.3 | 7.4 | 7.0 | 7.2 |
| [η] | (dL/g) | 1.58 | 1.60 | 1.42 | 1.9 | 0.93 | 1.4 |
| Gel fraction | (wt %) | 1.20 | <0.5 | 1.20 | <0.5 | <0.5 | <0.5 |
| Mn | | 5.45E+04 | 7.37E+04 | 3.76E+04 | 6.03E+04 | 5.91E+04 | 6.24E+04 |
| Mw | | 3.94E+05 | 5.55E+05 | 2.61E+05 | 2.83E+05 | 1.06E+05 | 1.98E+05 |
| Mz | | 3.68E+06 | 5.08E+06 | 3.00E+06 | 8.92E+05 | 1.78E+05 | 5.86E+05 |
| Mw/Mn | — | 7.2 | 7.5 | 6.9 | 4.7 | 1.8 | 3.2 |
| Mz/Mw | | 9.3 | 9.1 | 11.5 | 3.1 | 1.7 | 3.0 |
| $\eta^*_{(\omega=0.1)}/\eta^*_{(\omega=100)}$ | — | 26 | 19 | 42 | 6 | 1 | 2 |
| Tg | ° C. | -18.6 | -9.7 | -24.2 | -27.5 | -28.2 | -38.4 |

Example 8

X-1

Using 20 parts by weight of the propylene-based copolymer (A-1) obtained in Example 1 and 80 parts by weight of a propylene-based copolymer (B-1) Prime Polypro™ F107 available from Prime Polymer Co., Ltd., MFR (230° C., load of 2.16 kg): 8.8 (g/10 min), MT: 5.4 mN, Tm: 163° C.), a pressed sheet was prepared by the aforesaid process 1 for preparing samples for various measurements for composition, and properties of the pressed sheet were measured. The results of various property measurements are set forth in Table 2.

Example 9

X-2

A pressed sheet was prepared in the same manner as in Example 8, except that 30 parts by weight of the propylene-based copolymer (A-1) and 70 parts by weight of the propylene-based copolymer (B-1) were used. Then, properties of the pressed sheet were measured. The results of various property measurements are set forth in Table 2.

Example 10

X-3

A pressed sheet was prepared in the same manner as in Example 8, except that 50 parts by weight of the propylene-based copolymer (A-1) and 50 parts by weight of the propylene-based copolymer (B-1) were used. Then, properties of the pressed sheet were measured. The results of various property measurements are set forth in Table 2.

Example 11

X-4

A pressed sheet was prepared in the same manner as in Example 8, except that 20 parts by weight of the propylene-based copolymer (A-5) obtained in Example 5 and 80 parts by weight of the propylene-based copolymer (B-1) were used. Then, properties of the pressed sheet were measured. The results of various property measurements are set forth in Table 2.

Example 12

X-5

A pressed sheet was prepared in the same manner as in Example 8, except that 20 parts by weight of the propylene-based copolymer (A-1) and 80 parts by weight of a propylene-based copolymer (B-2) (Prime Polypro™ E-200GP available from Prime Polymer Co., Ltd., MFR (230° C., load of 2.16 kg): 2.2 (g/10 min), MT: 11.9 mN, Tm: 162° C., quantity of heat of fusion: 58.3 J/g) were used. Then, properties of the pressed sheet were measured. The results of various property measurements are set forth in Table 2.

Example 13

X-6

A pressed sheet was prepared in the same manner as in Example 8, except that 20 parts by weight of the propylene-based copolymer (A-2) obtained in Example 2 and 80 parts by weight of the propylene-based copolymer (B-2) were used. Then, properties of the pressed sheet were measured. The results of various property measurements are set forth in Table 2.

Example 14

X-7

A pressed sheet was prepared in the same manner as in Example 8, except that 10 parts by weight of the propylene-based copolymer (A-3) obtained in Example 3 and 90 parts by weight of the propylene-based copolymer (B-2) were used. Then, properties of the pressed sheet were measured. The results of various property measurements are set forth in Table 2.

Example 15

X-8

A pressed sheet was prepared in the same manner as in Example 8, except that 30 parts by weight of the propylene-based copolymer (A-3) and 70 parts by weight of the propylene-based copolymer (B-2) were used. Then, properties of the pressed sheet were measured. The results of various property measurements are set forth in Table 2.

Example 16

X-9

A pressed sheet was prepared in the same manner as in Example 8, except that 20 parts by weight of the propylene-based copolymer (A-4) obtained in Example 4 and 80 parts by weight of the propylene-based copolymer (B-2) were used. Then, properties of the pressed sheet were measured. The results of various property measurements are set forth in Table 2.

Example 17

X-10

A pressed sheet was prepared in the same manner as in Example 8, except that 20 parts by weight of the propylene-based copolymer (A-1) and 80 parts by weight of a propylene-based copolymer (B-3) (Prime Polypro™ J-3000GV available from Prime Polymer Co., Ltd., MFR (230° C., load of 2.16 kg): 36.0 (g/10 min), MT: 1.2 mN, Tm: 163° C.) were used. Then, properties of the pressed sheet were measured. The results of various property measurements are set forth in Table 2.

Example 18

X-11

A pressed sheet was prepared in the same manner as in Example 8, except that 20 parts by weight of the propylene-based copolymer (A-1) and 80 parts by weight of a syndiotactic propylene polymer (B-4) (MFR (230° C., load of 2.16 kg): 5.7 (g/10 min), MT: 4.2 mN, Tm: 154° C./160° C.) obtained in accordance with Synthesis Example 1 of Japanese Patent Laid-Open Publication No. 2009-242667 were used. Then, properties of the pressed sheet were measured. The results of various property measurements are set forth in Table 2.

Comparative Example 4

X-12

A pressed sheet was prepared in the same manner as in Example 8, except that 20 parts by weight of the propylene-based copolymer (A-8) obtained in Comparative Example 1 and 80 parts by weight of the propylene-based copolymer (B-2) were used. Then, properties of the pressed sheet were measured. The results of various property measurements are set forth in Table 3.

Comparative Example 5

X-13

A pressed sheet was prepared in the same manner as in Example 8, except that 80 parts by weight of the propylene-based copolymer (B-1) and 20 parts by weight of low-density polyethylene (C-1) (MIRASON™ M11 available from Prime Polymer Co., Ltd.) were used. Then, properties of the pressed sheet were measured. The results of various property measurements are set forth in Table 3.

Comparative Example 6

X-14

A pressed sheet was prepared in the same manner as in Example 8, except that 20 parts by weight of the propylene-based copolymer (A-10) obtained in Comparative Example 3 and 80 parts by weight of the propylene-based copolymer (B-1) were used. Then, properties of the pressed sheet were measured. The results of various property measurements are set forth in Table 3.

Comparative Example 7

X-15

A pressed sheet was prepared in the same manner as in Example 8, except that 80 parts by weight of the propylene-based copolymer (B-1) and 20 parts by weight of an ethylene/α-olefin copolymer (C-2) TAFMER™A4070 available from Mitsui Chemicals, Inc., MFR (190° C., load of 2.16 kg): 4.0 (g/10 min)) were used. Then, properties of the pressed sheet were measured. The results of various property measurements are set forth in Table 3.

Comparative Example 8

X-16

A pressed sheet was prepared in the same manner as in Example 8, except that 20 parts by weight of the propylene-based copolymer (A-9) obtained in Comparative Example 2 and 80 parts by weight of the propylene-based copolymer (B-3) were used. Then, properties of the pressed sheet were measured. The results of various property measurements are set forth in Table 3.

Example 19

Foamed Product 1

Using the test sample obtained in Example 12, batch foaming was carried out at a foaming temperature of 152° C. or 155° C. to obtain a sample of a foamed product. Then, an expansion ratio of the sample was calculated. The results are set forth in Table 4.

Figure 2:
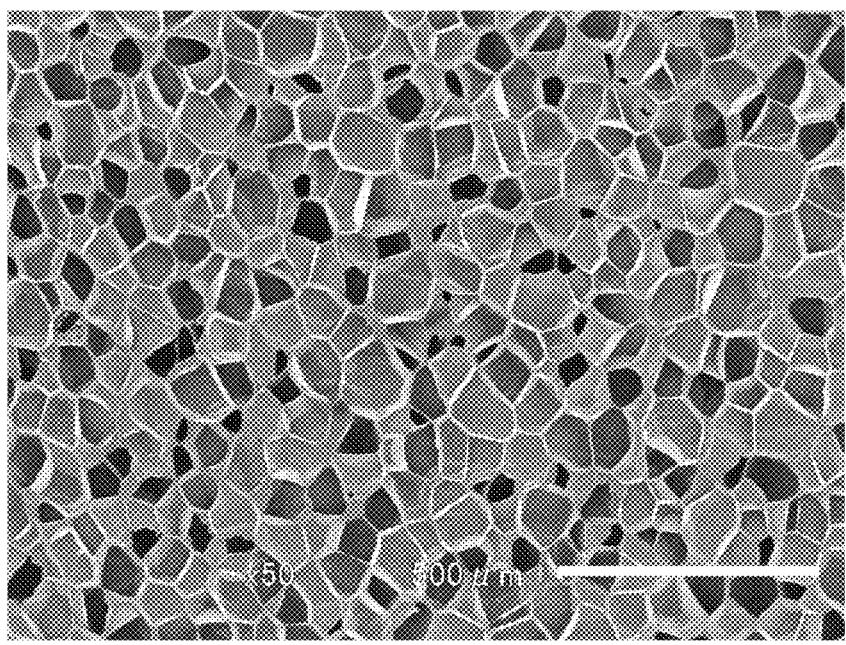
FIG. 2 is a sectional SEM image of a foamed product obtained in Example 19.
Figure 6:
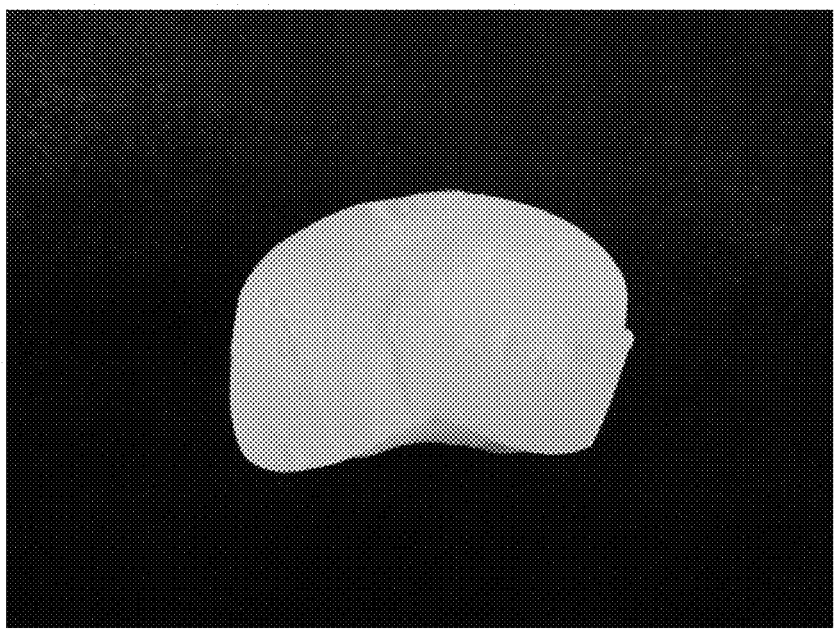
FIG. 6 is a digital image of a foamed product obtained in Example 19.

Further, using the sample obtained at a foaming temperature of 155° C., photographing by a digital camera and observation of the section by SEM were carried out. The results are shown in FIGS. 1, 6 and 2.

Comparative Example 9

Foamed Product 2

Using the test sample obtained in Comparative Example 4, a sample of a foamed product was obtained in a similar manner to that in Example 19. Then, an expansion ratio of the sample was calculated. The results are set forth in Table 4.

Figure 3:
FIG. 3 is a digital image of a foamed product obtained in Comparative Example 8.
Figure 7:
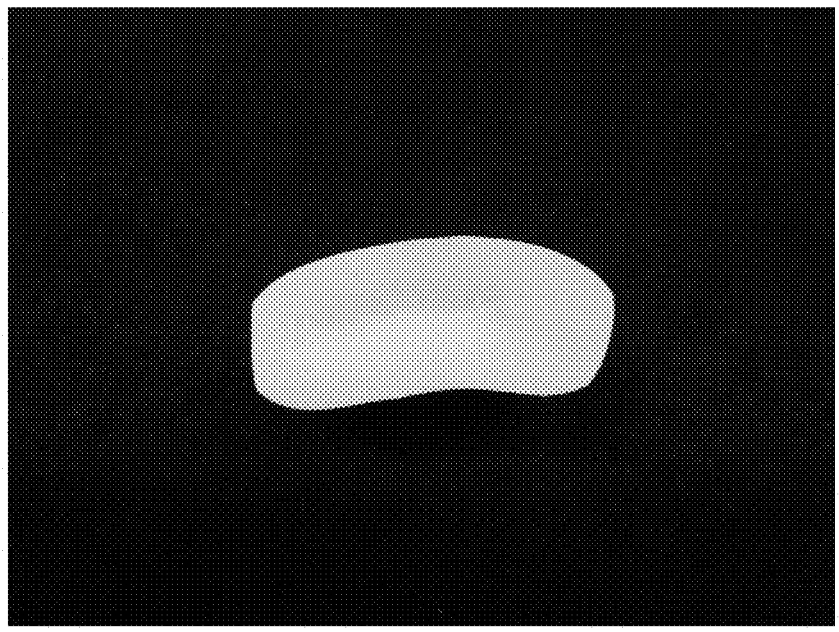
FIG. 7 is a digital image of a foamed product obtained in Comparative Example 8.

Further, using the sample obtained at a foaming temperature of 155° C., photographing by a digital camera and observation of the section by SEM were carried out. The results are shown in FIGS. 3 and 7.

Reference Example 1

Foamed Product 3

Using the propylene-based copolymer (B-2), batch foaming was carried out at a foaming temperature of 152° C., 155° C. or 156° C. in a similar manner to that in Example 19, to obtain a sample of a foamed product. Then, an expansion ratio of the sample was calculated. The results are set forth in Table 4.

Figure 4:
FIG. 4 is a digital image of a foamed product obtained in Reference Example 1.
Figure 5:
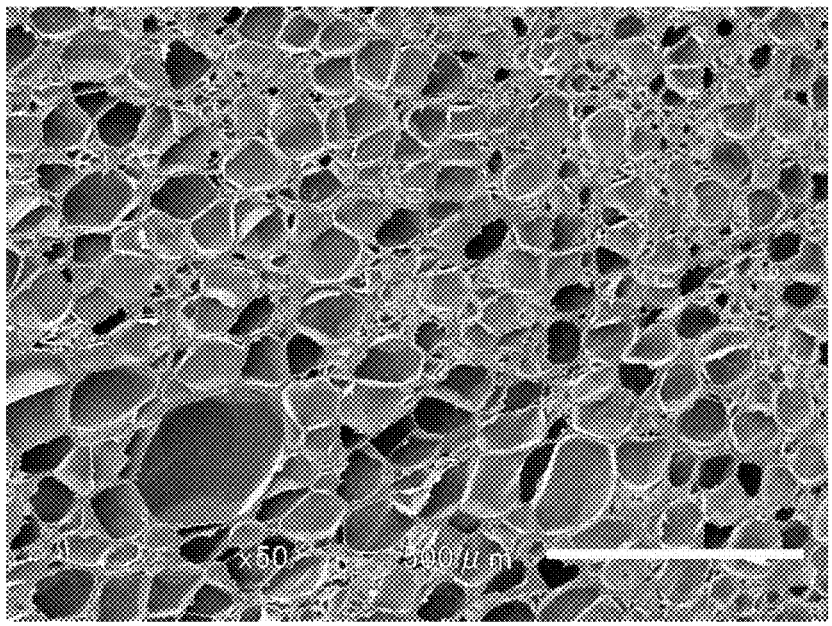
FIG. 5 is a sectional SEM image of a foamed product obtained in Reference Example 1.
Figure 8:
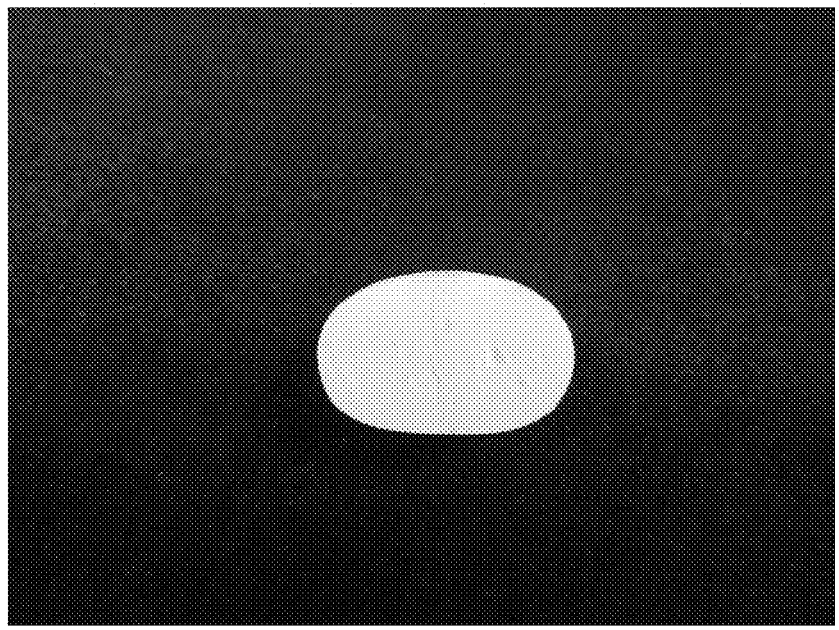
FIG. 8 is a digital image of a foamed product obtained in Reference Example 1.

Further, using the sample obtained at a foaming temperature of 155° C., photographing by a digital camera and observation of the section by SEM were carried out. The results are shown in FIGS. 4, 8 and 5. Moreover, hardness, compression hardness and compression set of the sample obtained by foaming at 156° C. were calculated. The results are set forth in Table 8.

Example 23

X-17

A pressed sheet was prepared in the same manner as in Example 8, except that 20 parts by weight of the propylene-based copolymer (A-11) obtained in Example 20 and 80 parts by weight of the propylene-based copolymer (B-2) were used. Then, properties of the pressed sheet were measured. The results of various property measurements are set forth in Table 2.

Example 24

X-18

A pressed sheet was prepared in the same manner as in Example 8, except that 20 parts by weight of the propylene-based copolymer (A-12) obtained in Example 21 and 80 parts by weight of the propylene-based copolymer (B-2) were used. Then, properties of the pressed sheet were measured. The results of various property measurements are set forth in Table 2.

Example 25

X-19

A pressed sheet was prepared in the same manner as in Example 8, except that 20 parts by weight of the propylene-based copolymer (A-13) obtained in Example 22 and 80 parts by weight of the propylene-based copolymer (B-2) were used. Then, properties of the pressed sheet were measured. The results of various property measurements are set forth in Table 2.

Example 26

X-20

A pressed sheet was prepared in the same manner as in Example 8, except that 20 parts by weight of the propylene-based copolymer (A-11) obtained in Example 20 and 80 parts by weight of a propylene-based copolymer (B-5) (B241 available from Prime Polymer Co., Ltd., MFR (230° C., load of 2.16 kg): 0.7 (g/10 min), MT: 40.0 mN, Tm: 156° C.) were used. Then, properties of the pressed sheet were measured. The results of various property measurements are set forth in Table 2.

Comparative Example 11

X-24

A pressed sheet was prepared in the same manner as in Example 8, except that 20 parts by weight of the propylene-based copolymer (A-9) obtained in Comparative Example 2 and 80 parts by weight of the propylene-based copolymer (B-2) were used. Then, properties of the pressed sheet were measured. The results of various property measurements are set forth in Table 3.

Comparative Example 12

X-25

A pressed sheet was prepared in the same manner as in Example 8, except that 20 parts by weight of a propylene-based copolymer (C-3) (FTS6000 available from Japan Polypropylene Corporation, MFR (230° C., load of 2.16 kg): 3.0 (g/10 min), MT: 44.2 mN, Tm: 164° C.) and 80 parts by weight of the propylene-based copolymer (B-2) were used. Then, properties of the pressed sheet were measured. The results of various property measurements are set forth in Table 3.

Example 27

Foamed Product 4

Using the test sample obtained in Example 23, batch foaming was carried out at a foaming temperature of 155° C. or 156° C. to obtain a sample of a foamed product. Then, an expansion ratio of the sample was calculated. The results are set forth in Table 4. Further, hardness, compression hardness and compression set of the sample obtained by foaming at 156° C. were calculated. The results are set forth in Table 8.

Example 28

Foamed Product 5

Using the test sample obtained in Example 25, batch foaming was carried out at a foaming temperature of 155° C. to obtain a sample of a foamed product. Then, an expansion ratio of the sample was calculated. The result is set forth in Table 4.

Example 29

Foamed Product 6

Using the test sample obtained in Example 26, batch foaming was carried out at a foaming temperature of 139° C. to obtain a sample of a foamed product. Then, an expansion ratio of the sample was calculated. The result is set forth in Table 4.

Comparative Example 13

Foamed Product 15

Using the test sample obtained in Comparative Example 11, batch foaming was carried out at a foaming temperature of 155° C. to obtain a sample of a foamed product. Then, an expansion ratio of the sample was calculated. The result is set forth in Table 4.

Comparative Example 14

Foamed Product 16

Using the test sample obtained in Comparative Example 12, batch foaming was carried out at a foaming temperature of 155° C. to obtain a sample of a foamed product. Then, an expansion ratio of the sample was calculated. The result is set forth in Table 4.

Example 30

Foamed product 7

Using a sample obtained by adding 3.5 parts by weight of an organic blowing agent (CELLMIC™ MB1023 available from Sankyo Kasei Co., Ltd.) to pellets of the composition (X-17) of Example 23, chemical foaming was carried out by the aforesaid method at a foaming temperature of 155° C. to obtain a sample of a foamed product. Then, an expansion ratio of the sample was calculated. The result is set forth in Table 5.

Example 31

X-21

To the total 100 parts by weight of 20 parts by weight of the propylene-based copolymer (A-11) obtained in Example 20 and 80 parts by weight of the propylene-based copolymer (B-2), 0.5 part by weight of GELALL™ MD (available from New Japan Chemical Co., Ltd.) was added as a nucleating agent. Then, a pressed sheet was prepared in accordance with the aforesaid process 2 for preparing samples for various measurements for composition, and properties of the pressed sheet were measured. The results of various property measurements are set forth in Table 2.

Example 32

Foamed Product 8

Using a sample obtained by adding a blowing agent to pellets of the composition (X-21) of Example 31, a sample of a foamed product was obtained in a similar manner to that in Example 30. Then, an expansion ratio of the sample was calculated. The result is set forth in Table 5.

Reference Example 2

Foamed Product 9

Using a sample obtained by adding a blowing agent to the propylene-based copolymer (B-2), a sample of a foamed product was obtained in a similar manner to that in Example 30. Then, an expansion ratio of the sample was calculated. The result is set forth in Table 5.

Example 33

X-22

To the total 100 parts by weight of 20 parts by weight of the propylene-based copolymer (A-11) obtained in Example 20 and 80 parts by weight of a crystalline propylene-based copolymer (B-6) (MFR (230° C., load of 2.16 kg): 1.4 (g/10 min), MT: 20.0 mN), 0.1 part by weight of the secondary antioxidant, 0.1 part by weight of the heat stabilizer and 0.1 part by weight of the hydrochloric acid absorbing agent described in the aforesaid preparation process 1 and 0.3 part by weight of BY27-002 (available from Daw Corning Toray Co., Ltd.) as a release agent were added. Further, 2 parts by weight of an organic blowing agent (CELLMIC™ MB1023) were added, and the mixture was kneaded by a 15-inch mixing roll of No. 19 manufactured by Yasuda Seiki Seisakusho Ltd. to obtain a test sample in the form of a sheet. The results of various property measurements of the sample are set forth in Table 2.

Example 34

Foamed Product 10

The test sample obtained in Example 33 was heated in an oven (230° C.) manufactured by Tabai Espac Corp. for 3 minutes to foam the sample. Then, an expansion ratio of the resulting foamed product was calculated. The result is set forth in Table 6.

Comparative Example 10

Foamed Product 11

Using the composition (B-6), a test sample in the form of a sheet was obtained in a similar manner to that in Example 33. Using the sample, a foamed product was obtained in a similar manner to that in Example 34. Then, an expansion ratio of the resulting foamed product was calculated. The result is set forth in Table 6.

Example 35

Foamed product 12

Using 20 parts by weight of the propylene-based copolymer (A-11) obtained in Example 20 and 80 parts by weight of the propylene-based copolymer (B-2), strand foaming (165° C.) using carbon dioxide gas was carried out to obtain a sample of a foamed product X-17. Then, an expansion ratio of the sample was calculated. The result is set forth in Table 7.

Example 36

X-23

A pressed sheet was prepared in the same manner as in Example 8, except that 20 parts by weight of the propylene-based copolymer (A-11) obtained in Example 20 and 80 parts by weight of a propylene-based copolymer (B-7) (BJS-MU available from Prime Polymer Co., Ltd., MFR (230° C., load of 2.16 kg): 1.6 (g/10 min), MT: 18.2 mN, Tm: 168° C.) were used. Then, properties of the pressed sheet were measured. The results of various property measurements are set forth in Table 2.

Example 37

Foamed Product 13

Using 20 parts by weight of the propylene-based copolymer (A-11) obtained in Example 20 and 80 parts by weight of the propylene-based copolymer (B-7), a sample of a foamed product X-23 was obtained in a similar manner to that in Example 35. Then, an expansion ratio of the sample was calculated. The result is set forth in Table 7.

Reference Example 3

Foamed Product 14

Using the propylene-based copolymer (B-2), a sample of a foamed product was obtained in a similar manner to that in Example 35. Then, an expansion ratio of the sample was calculated. The result is set forth in Table 7.

TABLE 2

|  |  | Ex. 8 (X-1) | Ex. 9 (X-2) | Ex. 10 (X-3) | Ex. 11 (X-4) | Ex. 12 (X-5) | Ex. 13 (X-6) | Ex. 14 (X-7) | Ex. 15 (X-8) | Ex. 16 (X-9) | Ex. 17 (X-10) | Ex. 18 (X-11) |
|---|---|---|---|---|---|---|---|---|---|---|---|---|
| Type of copolymer (A) |  | (A-1) | (A-1) | (A-1) | (A-5) | (A-1) | (A-2) | (A-3) | (A-3) | (A-4) | (A-1) | (A-1) |
| Type of copolymer (B) |  | (B-1) | (B-1) | (B-1) | (B-1) | (B-2) | (B-2) | (B-2) | (B-2) | (B-2) | (B-3) | (B-4) |
| Type of copolymer (C) |  | — | — | — | — | — | — | — | — | — | — | — |
| (A)/(B)/(C) composition ratio | (wt %/wt %/wt %) | 20/80/0 | 30/70/0 | 50/50/0 | 20/80/0 | 20/80/0 | 20/80/0 | 10/90/0 | 30/70/0 | 20/80/0 | 20/80/0 | 20/80/0 |
| $MFR_{2.16}$ | (g/10 min) | 7.4 | 6.9 | 7.3 | 5.1 | 2.8 | 2.4 | 2.2 | 2.3 | 2.2 | 26.3 | 5.2 |
| Melt tension ($MT_{(X1)}$) | (mN) | 11.9 | 16.9 | 22.7 | 12.7 | 24.4 | 31.1 | 26.1 | 39.1 | 32.9 | 3.2 | 10.9 |
| $MT_{(X1)}/MT_{(B1)}$ |  | 2.2 | 3.1 | 4.2 | 2.4 | 2.1 | 2.6 | 2.2 | 3.3 | 2.8 | 2.6 | 2.6 |

|  |  | Ex. 23 (X-17) | Ex. 24 (X-18) | Ex. 25 (X-19) | Ex. 26 (X-20) | Ex. 31 (X-21) | Ex. 33 (X-22) | Ex. 36 (X-23) |
|---|---|---|---|---|---|---|---|---|
| Type of copolymer (A) |  | (A-11) | (A-12) | (A-13) | (A-11) | (A-11) | (A-11) | (A-11) |
| Type of copolymer (B) |  | (B-2) | (B-2) | (B-2) | (B-5) | (B-2) | (B-6) | (B-7) |
| Type of copolymer (C) |  | — | — | — | — | — | — | — |
| (A)/(B)/(C) composition ratio | (wt %/wt %/wt %) | 20/80/0 | 20/80/0 | 20/80/0 | 20/80/0 | 20/80/0 | 20/80/0 | 20/80/0 |
| $MFR_{2.16}$ | (g/10 min) | 2.3 | 2.2 | 2.5 | 0.9 | 2.3 | 1.5 | 1.5 |
| Melt tension ($MT_{(X1)}$) | (mN) | 29.9 | 26.3 | 40.5 | 85.8 | 31.9 | 38.0 | 39.5 |
| $MT_{(X1)}/MT_{(B1)}$ |  | 2.5 | 2.2 | 3.4 | 2.1 | 2.7 | 1.9 | 2.2 |

TABLE 3

|  |  | Comp. Ex. 4 (X-12) | Comp. Ex. 5 (X-13) | Comp. Ex. 6 (X-14) | Comp. Ex. 7 (X-15) | Comp. Ex. 8 (X-16) | Comp. Ex. 11 (X-24) | Comp. Ex. 12 (X-25) |
|---|---|---|---|---|---|---|---|---|
| Type of copolymer (A) |  | (A-8) | — | (A-10) | — | (A-9) | (A-9) | — |
| Type of copolymer (B) |  | (B-2) | (B-1) | (B-1) | (B-1) | (B-3) | (B-2) | (B-2) |
| Type of copolymer (C) |  | — | (C-1) | — | (C-2) | — | — | (C-3) |
| (A)/(B)/(C) composition ratio | (wt %/wt %/wt %) | 20/80/0 | 0/80/20 | 20/80/0 | 0/80/20 | 20/80/0 | 20/80/0 | 0/80/20 |
| $MFR_{2.16}$ | (g/10 min) | 2.3 | 8.8 | 7.8 | 7.2 | 42 | 3.9 | 2.5 |
| Melt tension ($MT_{(X1)}$) | (mN) | 20.7 | 10.0 | 5.5 | 5.5 | 1.1 | 12.0 | 20.5 |
| $MT_{(X1)}/MT_{(B1)}$ |  | 1.7 | 1.8 | 1.0 | 1.0 | 0.9 | 1.0 | 1.7 |

TABLE 4

|  | Foaming temperature | Ex. 19 (X-5): Foamed product 1 | Ex. 27 (X-17): Foamed product 4 | Ex. 28 (X-19): Foamed product 5 | Ex. 29 (X-20): Foamed product 6 | Comp. Ex. 9 (X-12): Foamed product 2 | Comp. Ex. 13 (X-24): Foamed product 15 | Comp. Ex. 14 (X-25): Foamed product 16 | Ref. Ex. 1 PP-based copolymer (B-2): Foamed product 3 |
|---|---|---|---|---|---|---|---|---|---|
| Density (before foaming) | — | 0.894 | 0.895 | 0.898 | 0.889 | 0.894 | 0.893 | 0.905 | 0.902 |
| Density (after foaming) | 139° C. | — | — | — | 0.034 | — | — | — | — |
|  | 152° C. | 0.128 | — | — | — | 0.288 | — | — | 0.469 |
|  | 155° C. | 0.093 | 0.055 | 0.072 | — | 0.173 | 0.186 | 0.106 | 0.249 |
|  | 156° C. | — | 0.039 | — | — | — | — | — | 0.067 |
| Expansion | 139° C. | — | — | — | 26.1 | — | — | — | — |

TABLE 4-continued

| | Foaming temperature | Ex. 19 (X-5): Foamed product 1 | Ex. 27 (X-17): Foamed product 4 | Ex. 28 (X-19): Foamed product 5 | Ex. 29 (X-20): Foamed product 6 | Comp. Ex. 9 (X-12): Foamed product 2 | Comp. Ex. 13 (X-24): Foamed product 15 | Comp. Ex. 14 (X-25): Foamed product 16 | Ref. Ex. 1 PP-based copolymer (B-2): Foamed product 3 |
|---|---|---|---|---|---|---|---|---|---|
| ratio | 152° C. | 7.0 | — | — | — | 3.1 | — | — | 1.9 |
| | 155° C. | 9.6 | 16.3 | 12.5 | — | 5.2 | 4.8 | 8.5 | 3.6 |
| | 156° C. | — | 22.9 | — | — | — | — | — | 13.5 |

TABLE 5

| | Ex. 30 (X-17): Foamed product 7 | Ex. 32 (X-21): Foamed product 8 | Ref. Ex. 2 (B-2): Foamed product 9 |
|---|---|---|---|
| Density (before foaming) | 0.894 | 0.894 | 0.902 |
| Density (after foaming) | 0.444 | 0.401 | 0.499 |
| Expansion ratio | 2.0 | 2.2 | 1.8 |

TABLE 6

| | Ex. 34 (X-22): Foamed product 10 | Comp. Ex. 10 (B-6): Foamed product 11 |
|---|---|---|
| Density (before foaming) | 0.895 | 0.865 |
| Density (after foaming) | 0.270 | 0.465 |
| Expansion ratio | 3.3 | 1.9 |

TABLE 7

| | Ex. 35 (X-17): Foamed product 12 | Ex. 37 (X-23): Foamed product 13 | Ref. Ex. 3 (B-2): Foamed product 14 |
|---|---|---|---|
| Density (before foaming) | 0.895 | 0.886 | 0.902 |
| Density (after foaming) | 0.044 | 0.039 | 0.055 |
| Expansion ratio | 20.3 | 22.7 | 16.4 |

TABLE 8

| | | Ex. 27 (X-17): Foamed product 4 | Ref. Ex. 1 PP-based copolymer (B-2): Foamed product 3 |
|---|---|---|---|
| Hardness (type C) | (—) | | 41.8 | 67 |
| 25% Compression hardness | (MPa) | 0.22 | 0.57 |
| 25% Compression set | (%) | 8.7 | 11.1 |

Next, the propylene-based copolymer compositions (Y) and (Z) of the present invention and foamed products are further described with reference to the following examples, but it should be construed that the present invention is in no way limited to those examples. In the present invention, properties were evaluated in the following manner.

(Test Methods)

(1) Extrusion foam molding apparatus

Figure 9:
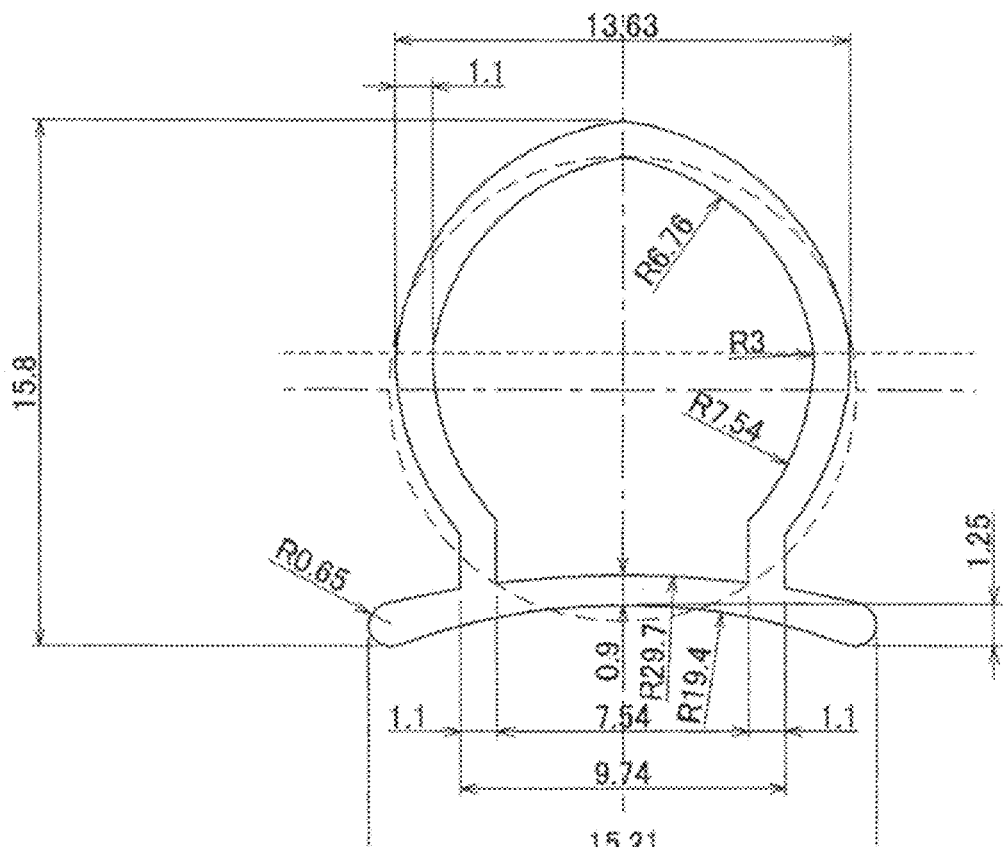
FIG. 9 is a view to explain a shape of a die used in the examples.

Extruder: single screw extruder of 65 mm screw diameter (OSE-65 manufactured by Osada Seisakusho Ltd.)
Cylinder maximum temperature: 150 to 190° C.
Die temperature: 170 to 190° C.
Rotation speed: 25 rpm
Take-off rate: 7.1 m/min
Water tank belt take-off rate: 6.4 m/min
Die: circle-horizontal line The die is a die having such a shape as shown in FIG. 9, that is, a die for long product extrusion, which has such a shape that a horizontal line is present below a circle. Since the composition was extruded from a slit shown in FIG. 9, a hollow long product was obtained. In the present specification, a foam molded product of a circle-horizontal line shape is also referred to as a "circle-horizontal line foamed product".

Carbon dioxide/nitrogen feed apparatus: apparatus manufactured by AKICO Corporation The apparatus was used for foaming utilizing carbon dioxide gas.

(2) Basic Properties

For evaluation of basic properties, a sheet having a thickness of 2 mm was prepared by the use of a press molding apparatus.

Press molding apparatus: 100-ton electric heating automatic press

Heating: temperature: 190° C., preheating time: 6 minutes, heating time: 4 minutes Cooling: temperature: 23° C., cooling time: 5 minutes

[Measurement of Melt Flow Rate (MFR)]

Melt flow rate (MFR) was measured by the method of ASTM D1238-65T at 230° C. under a load of 2.16 kg, 5 kg or 10 kg.

[Measurement of Crystallization Time]

The crystallization time was measured using a DSC apparatus (DSC7, manufactured by PERKIN ELMER).

Heating rate: 320° C./min (from ordinary temperature to 200° C.)

Holding: 5 minutes at 200° C.

Cooling rate: 320° C./min (from 200° C. to 120° C.)

Measuring temperature: 120° C.

[Measurement of Melt Tension]

Melt tension was measured using CAPIROGRAPH (manufactured by Toyo Seiki Seisaku-Sho, Ltd.).

Conditions: L=8.00 mm, D=2.095 mm, L/D=3.82

Temperature: 180° C.

Take-off rate: 500 mm/min

[Measurement of Strength at Break and Elongation at Break]

From a sheet obtained by press molding, 5 dumbbell-shaped No. 3 specimens (specimen having parallel portion reaching specified dimension is passable) described in JIS K6251 were punched, and strength at break and elongation at break were measured by the method described in JIS K6251.

[Measurement of Compression Set]

3 Samples each having a proper size punched from a sheet obtained by press molding were superposed upon each other, and compression set was measured by the method described in JIS K6262.

[Measurement of Hardness]

3 Samples each having a proper size punched from a sheet obtained by press molding were superposed upon each other, and hardness was measured by the method described in JIS K6253.

[Measurement of Specific Gravity of Foamed Product]

Measurement of specific gravity of a foamed product was carried out by cutting a circle-horizontal line foamed product obtained by extrusion foam molding to a proper size. Specifically, the specific gravity can be determined by the method A of JIS K6268 or by using automatic gravimeters sold from various makers, e.g., electronic gravimeter MS-2005 manufactured by Mirage Trading Co., Ltd. In the following examples, the specific gravity was determined by the use of an electronic gravimeter MS-2005 manufactured by Mirage Trading Co., Ltd.

[Measurement of Water Absorption Ratio of Foamed Product]

Water absorption ratio of a foamed product was determined in the following manner. A circle-horizontal line foamed product obtained by extrusion foam molding was cut to a proper size, and the sample weight was measured by a precision balance. Subsequently, the sample was immersed in water in a water tank equipped with a vacuum pump. Then, the pressure was reduced down to −635 mmHg, and the sample was allowed to stand for 3 minutes. Subsequently, the pressure was returned to 0, and the weight of the sample having absorbed water was measured, and the water absorption ratio was determined from a change of weight.

Water absorption ratio=(sample weight after test−weight before test)/weight before test×100 [%]

[Measurement of Compression Stress of Foamed Product]

Compression stress of a foamed product was determined in the following manner. A circle-horizontal line foamed product obtained by extrusion foam molding was cut to a proper size. The sample was held for 30 seconds under the condition of 25% compression, and a stress per unit area applied at that time was calculated. This measurement was carried out under the temperature conditions of 23° C. and −30° C.

[Measurement of Strength at Break and Elongation at Break of Foamed Product]

Strength at break and elongation at break of a foamed product were measured in the following manner. From a circle-horizontal line foamed product obtained by extrusion foam molding, 5 dumbbell-shaped No. 3 specimens (specimen having parallel portion reaching specified dimension is passable) described in JIS K6251 were punched in the direction of extrusion, and the strength at break and the elongation at break were measured by the method described in JIS K6251.

[Measurement of Compression Set of Foamed Product]

Compression set of a foamed product was measured in the following manner. A circle-horizontal line foamed product obtained by extrusion foam molding was cut to a proper size, then the resulting sample was compressed from the head of the circle portion at a temperature of 70° C. under the conditions of 25% compression or 50% compression over a period of 22 hours, and the compression set was measured by the method of JIS K6262.

[Appearance of Foamed Product]

Evaluation of appearance of a foamed product was carried out by observing appearance of a circle-horizontal line foamed product obtained by extrusion molding and judging the appearance in accordance with the following levels.

[Level 5]: The surface of the molded product is smooth.

[Level 4]: The surface of the molded product is almost smooth.

[Level 3]: The surface of the molded product has some protrusions and depressions.

[Level 2]: The surface of the molded product has a large number of protrusions and depressions.

[Level 1]: The shape is unstable.

[Cell Condition of Foamed Product]

Evaluation of cell condition of a foamed product was carried out by observing the cell condition of a circle-horizontal line foamed product obtained by extrusion molding and judging the cell condition in accordance with the following levels.

[Level 4]: The cells are extremely fine and uniform and have a narrow distribution.

[Level 3]: The cells are almost uniform and have a narrow distribution.

[Level 2]: The shapes of the cells are non-uniform, and there is a distribution.

[Level 1]: The shapes of the cells are non-uniform, and there are a number of broken cells.

[Branching Index]

The branching index can be determined by measuring dependence of viscoelasticity of a copolymer on frequency and applying it to the following formula.

$$\text{Branching index} = [\text{Log}(\eta_{0.01}) - \text{Log}(0.116 \times \eta_8)^{1.2367}] \times 10 \quad \text{(II)}$$

In the formula (II), $\eta_{0.01}$ represents a viscosity (Pa·sec) at 0.01 rad/sec and 190° C., and ng represents a viscosity (Pa·sec) at 8 rad/sec and 190° C.

$\eta_{0.01}$ and $\eta_8$ were measured by the use of a viscoelasticity tester (model RDS-2) manufactured by Rheometric Scientific, Inc. Specifically, from a sheet having a thickness of 2 mm obtained by pressing a copolymer at 190° C., a disk having a diameter of 25 mm and a thickness of 2 mm was formed. Using the disk as a sample, measurement was carried out under the following conditions. As data processing software, RSI Orchestrator (available from Rheometric Scientific, Inc.) was used.

Geometry: parallel plate
Measuring temperature: 190° C.
Frequency: 0.01 to 100 rad/sec
Strain ratio: 1.0%

Under such conditions, dependence of viscosity on frequency at a temperature of 190° C. was measured. $\eta^*$(viscosity) at 0.01 rad/sec and $\eta^*$(viscosity) at 8 rad/sec are denoted by $\eta_{0.01}$ and $\eta_8$, respectively.

(Polymerization Example for Propylene-Based Copolymer (AA-1))

To one feed opening of a continuous polymerizer having a volume of 300 liters, dehydrated and purified n-hexane was fed at a rate of 42 l/hr, and to other feed openings were continuously fed a hexane solution of bis(4-chlorophenyl)methylene(cyclopentadienyl) (1,2,3,4,7,8,9,10-octahydro-1,1,4,4,7,7,10,10-octamethyldibenzo(b,h)fluoren-12-yl)zirconium dichloride (0.24 mmol/l) at a rate of 0.21 l/hr, a hexane solution of triisobutylaluminum (10 mmol/l) at a rate of 1.0 l/hr, a hexane slurry of triphenylcarbenium tetrakis(pentafluorophenyl)borate (0.1 mmol/l) at a rate of 2.0 l/hr and vinyl norbornene at a rate of 800 g/hr (total hexane: 45 l/hr). At the same time, to other feed openings were continuously fed ethylene at a rate of 1.2 kg/hr, propylene at a rate of 13 kg/hr and hydrogen at a rate of 1.0 NL/hr, and continuous solution polymerization was carried out under the conditions of a polymerization temperature of 95° C., total pressure of 1.6 MPaG and a residence time of 1.3 hours.

The hexane solution of an ethylene/propylene/diene copolymer formed in the polymerizer was continuously discharged through a discharge opening provided on the side wall of the polymerizer at a flow rate of 67 l/hr, and guided to a connection pipe having a jacket part of 8 kg/cm² and having been heated by steam. By adjusting the opening of a liquid level control valve provided at the end of the connection pipe so that the amount of the solution in the polymerizer might be maintained to be about 100 liters, the hexane solution of an ethylene/propylene/diene copolymer heated to about 170° C. in the connection pipe having a steam jacket was continuously transferred into a flash tank through a double-pipe system inner pipe having been heated by steam of 10 kg/cm². Just behind the liquid level control valve, a feed opening for injecting methanol as a catalyst deactivator was provided, and methanol was injected as a 1.0 vol % hexane dilute solution at a rate of 12 l/hr and joined the hexane solution of the copolymer. In the transfer into the flash tank, the solution temperature and the opening of a pressure control valve were set so that the pressure in the flash tank might be maintained at 0.05 MPaG and the temperature of the vapor portion in the flash tank might be maintained at 180° C. As a result, an ethylene/propylene/diene copolymer was obtained at a production rate of 8.0 kg/hr. The polymerization mileage of the ethylene/propylene/diene copolymer was 159 kg/mmol-Zr, the intrinsic viscosity [η] of the resulting copolymer (AA-1) was 1.36 dl/g, the composition ratio of ethylene/propylene was 17.0/83.0 mol %, and the iodine value was 7.6 g/100 g. The results are set forth in Table 9.

(Polymerization Example for Propylene-Based Copolymer (AA-2))

A copolymer (AA-2) having composition and a branching index shown in Table 1 was obtained in a similar manner to that in the above polymerization example. The results are set forth in Table 9.

TABLE 9

| Polymerization example for propylene-based copolymer (AA) | | |
|---|---|---|
|  | AA-1 | AA-2 |
| Ethylene content (mol %) | 17.0 | 16.9 |
| [η] (dL/g) | 1.36 | 1.36 |
| ENB; iodine value (IV) (g/100 g) | — | — |
| VNB; iodine value (IV) (g/100 g) | 7.6 | 2.2 |
| Branching index | 8.4 | 4.4 |

Example (Y1-1)

(Kneading 1-1) Preparation of propylene-based copolymer composition (Y1-1) (Tables 10 and 11)

A mixture (total amount: 100 parts by weight) consisting 51.3 parts by weight of oil-extended EPT (Mitsui EPT™ 4100E available from Mitsui Chemical, Inc., ethylene: 57.0% by mol, non-conjugated polyene: 5-ethylidene-2-norbornene, iodine value: 20.0 (g/100 g), oil extension: 48 parts by weight), 10.3 parts by weight of polypropylene (F704NP, available from Prime Polymer Co., Ltd.) having a melt flow rate (ASTM D1238-65T, 230° C., load of 2.16 kg) of 2.0 g/10 min, 3.4 parts by weight of the copolymer (AA-1), 7.9 parts by weight of oil-extended EPT (Mitsui EPT™ 3072EPM available from Mitsui Chemical, Inc., ethylene: 64.0% by mol, non-conjugated polyene: 5-ethylidene-2-norbornene, iodine value: 11.5 (g/100 g), oil extension: 40 parts by weight), 2.7 parts by weight of butyl rubber (11R065, available from Exxon Chemical Company), 1.2 parts by weight of polypropylene (Prime Polypro™ E111G, available from Prime Polymer Co., Ltd.), 2.0 parts by weight of silicon oil (BY27-002, available from Daw Corning Toray Co., Ltd.) and 21.2 parts by weight of paraffinic oil (PW-100, DIANA™ Process Oil available from Idemitsu Kosan Co., Ltd.) was mixed with 2.08 parts by weight of a mixed solution consisting of 1.04 parts by weight of a crosslinking agent (1,3-bis(tert-butylperoxyisopropyl)benzene, Perhexa 25B), 0.42 part by weight of a crosslinking aid (divinylbenzene, DVB-810) and 0.62 part by weight of paraffinic oil (PW-100), and 0.1 part by weight of a phenol-based antioxidant (tetrakis[methylene-3-(3',5'-di-tert-butyl-4'-hydroxyphenyl)propionate] methane, Irganox 1010) by a 75-liter Henschel mixer (FM75-J, manufactured by Mitsui Mining Co., Ltd.) to obtain a propylene-based copolymer composition (Y).

Subsequently, the composition (Y) and 21 parts by weight of paraffinic oil (PW-100) were subjected to melt kneading (that is, dynamic thermal crosslinking treatment) by the use of a twin-screw mixing extruder (Hyper KTX-46 manufactured by Kobe Steel, Ltd.) under the conditions of a cylinder temperature of 120 to 200° C., a die temperature of 200° C., a rotation speed of 400 rpm and an extrusion rate of 60 kg/hr to obtain a dynamically heat-treated product 1 (partially crosslinked propylene-based copolymer (Y1-1) wherein particles of crosslinked EPT were uniformly dispersed in PP).

<(Kneading 2-1) Preparation of Propylene-Based Copolymer Composition (Y-2) (Table 1)>

Subsequently, to 93.6 parts by weight of the dynamically heat-treated product 1 (partially crosslinked propylene-based copolymer composition) obtained above, 0.7 part by weight of polypropylene (propylene-based copolymer, B241 available from Prime Polymer Co., Ltd.) having a melt flow rate of 0.5 g/10 min, 2.4 parts by weight of polypropylene (propylene-based copolymer, VP103W available from Prime Polymer Co., Ltd.) having a melt flow rate of 3.0 g/10 min and 3.3 parts by weight of a carbon black masterbatch (PE4993, available from CABOT Corporation) were added, and further, 1.15 parts by weight of a fluorine-based resin (polytetrafluoroethylene, Fluon G355, available from Asahi Glass Co., Ltd.), 23.6 parts by weight of paraffinic oil (PW-100) and 0.15 part by weight of an antioxidant (Irganox 1010) were added, and they were melt kneaded by the use of the extruder of the kneading 1 under the same conditions as in the kneading 1 to obtain a propylene-based copolymer composition (Y2-1).

The results of evaluation of this composition are set forth in Table 12.

Example (Y1-2), Comparative Examples (Y1-1) and (Y1-2)

Propylene-based copolymer compositions (Y2-2) to (Y2-4) were obtained in the same manner as in Example (Y1-1), except that formulations were changed as shown in Tables 10 and 11. The evaluation results are set forth in Table 12.

TABLE 10

Kneading (1)

| Raw material [part(s) by weight] | Brand | | Kneading 1-1 (Y1-1) | Kneading 1-2 (Y1-2) | Kneading 1-3 (Y1-3) | Kneading 1-4 (Y1-4) |
|---|---|---|---|---|---|---|
| EPT (oil extension: 48 parts by weight) | 4100E | (C) | 51.3 | 51.3 | 54.7 | |
| Polypropylene | F704NP | (D) | 10.3 | 10.3 | 10.3 | 15 |
| Propylene-based copolymer (AA) | Table 9 | (A) | (AA-1) 3.4 | (AA-2) 3.4 | — | |
| EPT (oil extension: 40 parts by weight) | 3072EPM | (C) | 7.9 | 7.9 | 7.9 | 70 |
| Butyl rubber | IIR065 | | 2.7 | 2.7 | 2.7 | 15 |
| Polypropylene | E111G | | 1.2 | 1.2 | 1.2 | |
| Silicon oil | BY27-002 | | 2.0 | 2.0 | 2.0 | |
| Paraffinic oil | PW-100 | (F) | 21.2 | 21.2 | 21.2 | |
| | | | (Total: 100) | (Total: 100) | (Total: 100) | (Total: 100) |
| Organic peroxide | Perhexa 25B | (E) | 1.04 | 1.04 | 1.04 | 0.30 |
| Divinylbenzene | DVB-810 | (E) | 0.42 | 0.42 | 0.42 | 0.12 |
| Paraffinic oil | PW-100 | (F) | 0.62 | 0.62 | 0.62 | 0.18 |
| Phenol-based antioxidant | Irganox1010 | | 0.1 | 0.1 | 0.1 | 0.1 |

TABLE 11

Kneading (2)

| Raw material [part(s) by weight] | Brand | | Kneading 2-1 (Y2-1) | Kneading 2-2 (Y2-2) | Kneading 2-3 (Y2-3) | Kneading 2-4 (Y2-4) |
|---|---|---|---|---|---|---|
| Composition (Y) | Kneading (1) | | (Y1-1) 93.6 | (Y1-2) 93.6 | (Y1-3) 93.6 | (Y1-4) 97.5 |
| Polypropylene | VP103W | (D) | 24.4 | 2.4 | 2.4 | |
| Polypropylene | B241 | (D) | 0.7 | 0.7 | 0.7 | |
| Carbon black MB | PE4993 | | 3.3 | 3.3 | 3.3 | 2.5 |
| Fluorine-based resin | Fluon | (G) | 1.15 | 1.15 | 1.15 | |
| Paraffinic oil | PW-100 | (F) | 23.6 | 23.6 | 23.6 | 11.0 |
| Antioxidant | Iraganox1010 | | 0.15 | 0.15 | 0.15 | 0.10 |

TABLE 12

Properties (press molding, solid properties)

| Composition (Y2) | | Unit | Ex. (Y1-1) Y2-1 | Ex. (Y1-2) Y2-2 | Comp. Ex. (Y1-1) Y-3 | Comp. Ex. (Y1-2) Y2-4 |
|---|---|---|---|---|---|---|
| MFR | 230° C., 5 kg | g/10 min | 33 | 56 | 60 | |
| | 230° C., 10 kg | g/10 min | | | | 15 |
| Crystallization time | 120° C., isothermal | sec | 135 | 129 | 143 | — |
| Melt tension | 180° C., 50 mm/min | mN | 107 | 119 | 87 | 15 |
| Hardness | Durometer A | | 53 | 53 | 55 | 53 |

Example (Y2-1)

100 Parts by weight of the propylene-based copolymer composition (Y2-1) were dry blended with 3.5 parts by weight of a blowing agent (sodium bicarbonate-based EE385, available from Eiwa Chemical Ind. Co., Ltd.) and 0.1 part by weight of calcium stearate (available from Sankyo Organic Synthesis Co., Ltd.) as a blowing nucleating agent, and the resulting blend was extrusion molded to a circle-horizontal line shape by the use of an extrusion foam molding apparatus (manufactured by Osada Seisakusho Ltd.) under the conditions of a cylinder temperature of 150 to 220° C., a die temperature of 170° C., a rotation speed of 25 rpm, a resin pressure of 12.5 MPa, a take-off rate of 7.1 m/min and an air flow rate of 0.8 l/min, to obtain a foam molded product of circle-horizontal line shape.

Various properties of the foam molded product were evaluated. The results are set forth in Table 13.

Example (Y2-2), Comparative Examples (Y2-1) and (Y2-2)

Using the compositions (Y2-2) to (Y2-4), foam molded products were obtained in a similar manner to that in Example (Y2-1). The evaluation results are set forth in Table 13.

The amounts of the components in the following table are expressed in part(s) by weight.

TABLE 13

Properties (extrusion foam molding, sponge properties)

| | Composition | | Ex. Y2-1 Y2-1 | Ex. Y2-2 Y2-2 | Comp. Ex. Y2-1 Y2-3 | Comp. Ex. Y2-2 Y2-4 |
|---|---|---|---|---|---|---|
| Sponge molding (circle-horizontal line) | | | | | | |
| Blowing agent | sodium bicarbonate-based EE385 | (H) | 3.5 | 3.5 | 3.5 | 3.5 |
| Sponge properties (foamed product) | | | | | | |
| Specific gravity | | g/cm³ | 0.55 | 0.58 | 0.58 | 0.60 |
| Water absorption ratio | | % | 4.9 | 19.3 | 45.6 | immeasurable |
| Compression stress | 23° C. | N/cm³ | 2.7 | 2.6 | 2.8 | immeasurable |
| | −30° C. | N/cm³ | 4.6 | 4.4 | 5.5 | immeasurable |
| Strength at break | | MPa | 1.6 | 1.6 | 1.5 | immeasurable |
| Elongation at break | | % | 220 | 210 | 220 | immeasurable |
| Compression set | 25% compression | % | 27 | 26 | 35 | immeasurable |
| Sponge appearance | | visual observation | level 5 | level 4 | level 3 | level 1 |
| Condition of sponge cell | | visual observation | level 4 | level 3 | level 2 | level 1 |

The invention claimed is:

1. A propylene-based copolymer (A) comprising 50 to 95% by mol of constituent units [i] derived from propylene, 4.9 to 49.9% by mol of constituent units [ii] derived from an α-olefin of 2 to 10 carbon atoms other than propylene and 0.1 to 10% by mol of constituent units [iii] derived from a non-conjugated polyene (with the proviso that the total amount of the constituent units [i], [ii] and [iii] is 100% by mol), and satisfying the following requirements (a) and (c):

(a) the intrinsic viscosity [η], as measured in decalin at 135° C., is 0.1 to 5.0 (dL/g.), and (c) the ratio ($MFR_{10}$/$MFR_{2.16}$) of $MFR_{10}$, as obtained at 230° C. under a load of 10 kg in accordance with JIS K-6721, to $MFR_{2.16}$, as obtained at 230° C. under a load of 2.16 kg in accordance with JIS K-6721, is 8.0 to 150.0.

2. The propylene-based copolymer (A) as claimed in claim 1, further satisfying the following requirements (b) and (d):

(b) the ratio (Mz/Mw) of a z-average molecular weight (Mz), as measured by gel permeation chromatography (GPC), to a weight-average molecular weight (Mw), as measured by the same, is 3.0 to 20.0, and (d) the ratio ($\eta^*_{(\omega=0.1)}$/$\eta^*_{(\omega=100)}$) of a complex viscosity $\eta^*_{(\omega=0.1)}$ at a frequency (ω=0.1 rad/s), as obtained by a linear viscoelasticity measurement (190° C.) using a rheometer, to a complex viscosity $\eta^*_{(\omega=100)}$ at a frequency (ω=100 rad/s), as obtained by the same, is 5 to 100.

3. The propylene-based copolymer (A) as claimed in claim 1, wherein the ratio ($MFR_{10}$/$MFR_{2.16}$) in the requirement (c) is 8.0 to 50.0.

4. A propylene-based copolymer composition (X) comprising 5 to 95 parts by weight of the propylene-based copolymer (A) as claimed in claim 1 and 5 to 95 parts by weight of a crystalline olefin resin (B) (with the proviso that the total amount of the components (A) and (B) is 100 parts by weight).

5. The propylene-based copolymer composition (X) as claimed in claim 4, wherein the crystalline olefin resin (B) is at least one substance selected from polypropylene, poly-4-methyl-1-pentene, polyethylene and polybutene-1.

6. A propylene-based copolymer composition (X1) comprising:

5 to 80 parts by weight of a propylene-based copolymer (A1) which satisfies the following requirements (a) to (d) and comprises 50 to 95% by mol of constituent units [i] derived from propylene, 4.9 to 49.9% by mol of constituent units [ii] derived from at least one α-olefin selected from ethylene, 1-butene, 4-methylpentene-1, 1-hexene and 1-octene and 0.1 to 10% by mol of constituent units [iii] derived from 5-vinyl-2-norbornene (with the proviso that the total amount of the constituent units [i], [ii] and [iii] is 100% by mol), and 95 to 20 parts by weight of polypropylene (B1) (with the proviso that the total amount of the components (A1) and (B1) is 100 parts by weight), said composition satisfying the following requirement (xa), (a) the intrinsic viscosity [η], as measured in decalin at 135° C., is 0.1 to 5.0 (dL/g.), (b) the ratio (Mz/Mw) of a z-average molecular weight (Mz), as measured by gel permeation chromatography (GPC), to a weight-average molecular weight (Mw), as measured by the same, is 3.0 to 20.0, (c) the ratio ($MFR_{10}$/$MFR_{2.16}$) of $MFR_{10}$, as obtained at 230° C. under a load of 10 kg in accordance with JIS K-6721, to $MFR_{2.16}$, as obtained at 230° C. under a load of 2.16 kg in accordance with JIS K-6721, is 8.0 to 150.0, (d) the ratio ($\eta^*_{(\omega=0.1)}$/$\eta^*_{(\omega=100)}$) of a complex viscosity $\eta^*_{(\omega=0.1)}$ at a frequency (ω=0.1 rad/s), as obtained by a linear viscoelasticity measurement (190° C.) using a rheometer, to a complex viscosity $\eta^*_{(\omega=100)}$ at a frequency (ω=100 rad/s), as obtained by the same, is 5 to 100, and (xa) the ratio ($MT_{(X1)}$/$MT_{(B1)}$) of a melt tension $MT_{(X1)}$ of the propylene-based copolymer composition (X1) at 230° C. to a melt tension $MT_{(B1)}$ of the polypropylene (B1) at 230° C. is 2.0 to 10.0.

7. The propylene-based copolymer composition (X1) as claimed in claim 6, wherein the ratio ($MFR_{10}$/$MFR_{2.16}$) in the requirement (c) is 8.0 to 50.0.

8. A foamed product obtained by crosslinking-foaming the propylene-based copolymer (A) as claimed in claim 1.

9. A molded product comprising the propylene-based copolymer composition (X) as claimed in claim 4.

10. A molded product comprising the propylene-based copolymer composition (X1) as claimed in claim 6.

11. A foamed product obtained by foaming the propylene-based copolymer composition (X1) as claimed in claim 6.

12. A propylene-based copolymer composition (Y) obtained from:
the propylene-based copolymer (A) as claimed in claim 1,
an ethylene-based copolymer (C) having an ethylene content of more than 50% by mol, and
a crystalline propylene-based polymer (D), and
obtained through a step of dynamically heat-treating at least the copolymer (C) in the presence of a crosslinking agent (E).

13. The propylene-based copolymer composition (Y) as claimed in claim 12, which is obtained through a step [I-a] of dynamically heat-treating the ethylene-based copolymer (C), the crystalline propylene-based polymer (D), the propylene-based copolymer (A) and the crosslinking agent (E).

14. The propylene-based copolymer composition (Y) as claimed in claim 12, which is obtained through a step [II-D] of adding the crystalline propylene-based polymer (D) to a component obtained through the step [I-a].

15. The propylene-based copolymer (Y) as claimed in claim 12, which contains a component derived from the crystalline propylene-based polymer (D) in an amount of 10 to 200 parts by weight and a component derived from the propylene-based copolymer (A) in an amount of 1 to 50 parts by weight, based on 100 parts by weight of a component derived from the ethylene-based copolymer (C).

16. The propylene-based copolymer composition (Y) as claimed in claim 12, which is obtained through a step [I-b] of dynamically heat-treating the ethylene-based copolymer (C), the crystalline propylene-based polymer (D) and the crosslinking agent (E) and a step of further adding the propylene-based copolymer (A).

17. The propylene-based copolymer composition (Y) as claimed in claim 12, which is obtained through a step of further adding the crystalline propylene-based polymer (D).

18. The propylene-based copolymer composition (Y) as claimed in claim 16, which contains a component derived from the crystalline propylene-based polymer (D) in an amount of 1 to 200 parts by weight and a component derived from the propylene-based copolymer (A) in an amount of 1 to 50 parts by weight, based on 100 parts by weight of a component derived from the ethylene-based copolymer (C).

19. The propylene-based copolymer composition (Y) as claimed in claim 12, which further comprises a blowing agent.

20. A foamed product obtained from the propylene-based copolymer composition as claimed in claim 12.

21. An automotive part comprising the propylene-based copolymer composition as claimed in claim 12.

22. A constructional/building material, an industrial part, an electric/electronic part, sporting/leisure goods or general merchandise, comprising the propylene-based copolymer composition as claimed in claim 12.

* * * * *